United States Patent
Okada et al.

(10) Patent No.: US 10,557,766 B2
(45) Date of Patent: Feb. 11, 2020

(54) TORQUE SENSOR FOR DETECTING OCCURRENCE OF METAL FATIGUE IN AN ELASTIC BODY

(71) Applicant: TRI-FORCE MANAGEMENT CORPORATION, Saitama-ken (JP)

(72) Inventors: Kazuhiro Okada, Saitama-ken (JP); Miho Okada, Saitama-ken (JP)

(73) Assignee: TRI-FORCE MANAGEMENT CORPORATION, Saitama-Ken (JP)

( * ) Notice: Subject to any disclaimer, the term of this patent is extended or adjusted under 35 U.S.C. 154(b) by 0 days.

(21) Appl. No.: 15/761,713

(22) PCT Filed: Jul. 20, 2016

(86) PCT No.: PCT/JP2016/071307
§ 371 (c)(1),
(2) Date: Mar. 20, 2018

(87) PCT Pub. No.: WO2018/016036
PCT Pub. Date: Jan. 25, 2018

(65) Prior Publication Data
US 2018/0348074 A1 Dec. 6, 2018

(51) Int. Cl.
*G01L 5/22* (2006.01)
*G01L 3/10* (2006.01)
(Continued)

(52) U.S. Cl.
CPC ............ *G01L 3/106* (2013.01); *G01L 3/1442* (2013.01); *G01L 25/003* (2013.01)

(58) Field of Classification Search
CPC ....... G01L 1/14; G01L 3/1442; G01L 5/0076; G01L 5/165; G01L 1/2206; G01L 3/1457;
(Continued)

(56) References Cited

U.S. PATENT DOCUMENTS 8,966,996 B2    3/2015  Okada et al.
2009/0241693 A1  10/2009  Maehara
(Continued)

FOREIGN PATENT DOCUMENTS

JP    2000-19035 A    1/2000
JP    2006-292423 A   10/2006
(Continued)

OTHER PUBLICATIONS

International Search Report (ISR) and Written Opinion (WO) dated Aug. 23, 2016 for International Application No. PCT/JP2016/071307.
(Continued)

*Primary Examiner* — Brandi N Hopkins
(74) *Attorney, Agent, or Firm* — Ladas & Parry LLP

(57) ABSTRACT

A torque sensor includes: an annular deformation body; first and second displacement electrodes which cause displacement by elastic deformation of the annular deformation body; first and second fixed electrodes arranged at positions opposite the first and second displacement electrodes; and a detection circuit that outputs an electric signal indicating a torque based on a variation amount of capacitance values of first and second capacitive elements each of which is configured of the displacement electrode and the fixed electrode. The annular deformation body includes a high elastic portion and a low elastic portion having a spring constant smaller than a spring constant of the high elastic portion. The detection circuit determines whether the torque sensor functions normally based on a ratio between first and second electric signals.

46 Claims, 22 Drawing Sheets

(51) Int. Cl.
*G01L 3/14* (2006.01)
*G01L 25/00* (2006.01)

(58) Field of Classification Search
CPC ....... G01L 5/161; G01L 3/106; G01L 3/1428; G01L 3/14; G01L 1/2231; G01L 3/1435; G01L 5/16; G01L 3/10
See application file for complete search history.

(56) References Cited

U.S. PATENT DOCUMENTS

| | | | | |
|---|---|---|---|---|
| 2011/0005338 A1* | 1/2011 | Okada | ................... | G01L 5/0061 73/862.043 |
| 2013/0167661 A1* | 7/2013 | Nishioki | ................... | G01L 3/10 73/862.337 |
| 2013/0319135 A1* | 12/2013 | Okada | ................... | G01L 1/14 73/862.043 |
| 2016/0041049 A1* | 2/2016 | Okada | ................... | G01L 1/142 73/862.626 |
| 2017/0191882 A1* | 7/2017 | Okada | ................... | G01L 1/04 |

FOREIGN PATENT DOCUMENTS

| | | |
|---|---|---|
| JP | 2007-24641 A | 2/2007 |
| JP | 2009-58338 A | 3/2009 |
| JP | 2009-244134 A | 10/2009 |
| JP | 2012-37300 A | 2/2012 |
| JP | 4963138 B1 | 5/2012 |

OTHER PUBLICATIONS

English translation of JP 2009-58338 A.
English translation of JP 2007-24641 A.
English translation of JP 2009-244134 A.
English translation of JP 2006-292423 A.
English translation of JP 2000-19035 A.
International Preliminary Report on Patentability (IPRP) dated Jan. 22, 2019 for Application No. PCT/JP2016/071307.
English translation of Written Opinion dated Aug. 23, 2016 for Application No. PCT/JP2016/071307.

\* cited by examiner

| TORQUE +Mz | | | | | | |
|---|---|---|---|---|---|---|
| DETECTION POINT | DETECTION PORTION | DISPLACEMENT ELECTRODE | FIXED ELECTRODE | CAPACITIVE ELEMENT | STRESS | VARIATION AMOUNT |
| Q1 | D1 | E501 | E201 | C1 | STRETCHING f2 | − |
| Q2 | D2 | E502 | E202 | C2 | COMPRESSIVE f1 | + |
| Q3 | D3 | E503 | E203 | C3 | STRETCHING f2 | − |
| Q4 | D4 | E504 | E204 | C4 | COMPRESSIVE f1 | + |
| ARITHMETIC EXPRESSION | | $Mz = -C1 + C2 - C3 + C4$ | | | | |

US 10,557,766 B2

TORQUE SENSOR FOR DETECTING OCCURRENCE OF METAL FATIGUE IN AN ELASTIC BODY

RELATED APPLICATION

This application is an application under 35 U.S.C. 371 of International Application No. PCT/JP2016/071307 filed on Jul. 20, 2016, the entire contents of which are incorporated herein by reference.

TECHNICAL FIELD

The present invention relates to a torque sensor, and particularly to a sensor having a function of outputting a torque acting around a predetermined rotation axis as an electric signal.

BACKGROUND ART

Torque sensors configured to detect a torque acting around a predetermined rotation axis have been widely used for a variety of transport machinery and industrial machinery. For example, the following Patent Literature 1 discloses a torque sensor of a type in which mechanical deformation caused by action of a torque is detected by a strain gauge. In addition, Patent Literature 2 discloses a sensor which detects a torque acting on a shaft by forming a magnetostrictive film through plating on a shaft surface and measuring a change in magnetic properties of the magnetostrictive film. Meanwhile, Patent Literature 3 discloses a torque sensor of a type in which a magnetic force generating part is provided at an end portion of a torsion bar, and a change in magnetic flux density of a magnetic force generated by the magnetic force generating part is detected using a magnetic collecting ring, and Patent Literature 4 discloses a torque sensor of a type in which a large number of magnets are arranged in a cylindrical shape such that N poles and S poles are alternately arranged in the circumferential direction and a magnetic field generated by these magnets is detected. Further, Patent Literature 5 discloses a torque sensor in which a link mechanism that deforms a shape of an annular member in a radial direction by action of a torque is prepared and a force applied in the radial direction caused by deformation of the annular member is detected by a load sensor. In addition, Cited Document 6 discloses a torque sensor of a capacitance type that detects a torque based on a variation amount of a capacitance value of a capacitive element caused by deformation generated in an annular elastic ring by action of a torque.

In recent years, the application of these torque sensors to life supporting robots has spread, and there is a demand for high safety. However, a current capacitance type torque sensor is provided with a mechanism including a torque detection portion, a CV conversion circuit, and an electronic circuit including a microcomputer, for example, and is likely to malfunction due to condensation, an impact, an overload, or a contamination that is mixed between a pair of parallel flat plates to provide the capacitance. In particular, a torque detection portion of the torque sensor has flexibility, and thus, metal fatigue is caused by the overload or a repeated load. As a result, a crack or the like may be generated in an elastic body forming the torque detection portion, and there is a risk that the elastic body may be eventually broken.

As a simple method of determining whether a torque sensor malfunctions, disclosed is a method of arranging a plurality of (for example, three) torque sensors described in Cited Document 6 in parallel along a rotation axis of a torque, which is an object to be detected, and evaluating a difference between output signals of the respective torque sensors. In this method, three output signals are compared two by two, and when a difference between output signals of two torque sensors falls within a predetermined range, it is determined that the torque sensors normally function. On the other hand, when the difference does not fall within the predetermined range, it is determined that the torque sensors do not normally function (malfunction).

CITATION LIST

Patent Literature

Patent Literature 1: JP 2009-058388 A
Patent Literature 2: JP 2007-024641 A
Patent Literature 3: JP 2009-244134 A
Patent Literature 4: JP 2006-292423 A
Patent Literature 5: JP 2000-019035 A
Patent Literature 6: JP 2012-037300 A However, cost increases depending on the number of torque sensors in the case of adopting the method of determining whether the torque sensor normally functions using the plurality of torque sensors. Further, space required to install the torque sensors also increases, which is a problem. It is a matter of course that it is possible to determine whether a torque sensor normally functions by detaching the torque sensor attached to a robot or the like and performing malfunction diagnosis. However, it is troublesome to detach the torque sensor that has been once attached, and thus, there is a demand for a torque sensor capable of more easily performing the malfunction diagnosis.

The present invention has been made in view of the problems described above. That is, an object of the present invention is to provide a torque sensor capable of detecting occurrence of metal fatigue in an elastic body before breakage of the elastic body forming a torque detection portion and diagnosing malfunction of the torque detection portion.

SUMMARY OF INVENTION

The present invention provides a torque sensor that detects a torque around a Z axis in an XYZ three-dimensional coordinate system, the torque sensor including: an annular deformation body made of a material elastically deformable by action of a torque to be detected and having a through opening through which the Z axis passes; a first supporting body connected to the annular deformation body at two first portions where the annular deformation body meets an XZ plane; a second supporting body connected to the annular deformation body at two second portions where the annular deformation body includes the Z axis and meets a plane different from the XZ plane, the second supporting body being rotatable around the Z axis with respect to the first supporting body; a displacement electrode that is arranged to the annular deformation body and causes displacement by elastic deformation of the annular deformation body; a fixed electrode arranged at a position opposing the displacement electrode in the first supporting body; and a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode in which the annular deformation body includes a high elastic portion and a low elastic portion having a spring constant smaller than a spring constant of the high elastic portion, the capacitive element includes a first capacitive element and a second capacitive element. The first capacitive element is configured of the displacement electrode and the fixed electrode which are arranged at a first position in the high elastic portion where a spacing distance between the annular deformation body and the first supporting body changes when the torque around the Z axis acts, the second capacitive element is configured of the displacement electrode and the fixed electrode which are arranged at a second position in the low elastic portion where the spacing distance between the annular deformation body and the first supporting body changes when the torque around the Z axis acts, and the detection circuit outputs a first electric signal corresponding to a capacitance value of the first capacitive element and a second electric signal corresponding to a capacitance value of the second capacitive element as electric signals indicating the acting torque, and determines whether the torque sensor functions normally based on a ratio between the first electric signal and the second electric signal.

According to the present invention, a ratio between the first electric signal and the second electric signal changes along with metal fatigue caused first in the low elastic portion than in the high elastic portion. Focusing on this fact, it is possible to provide the torque sensor capable of diagnosing the malfunction of the torque detection portion by detecting that the metal fatigue occurs in the elastic body before breakage of the elastic body forming the torque detection portion.

Each of the fixed electrodes and the displacement electrodes forming the first and second capacitive elements can be individually formed for each of the capacitive elements. Alternatively, one of each fixed electrode and each displacement electrode may be configured of a common electrode. That is, each displacement electrode of the first and second capacitive elements may be configured of the common electrode, or each fixed electrode of the first and second capacitive elements may be configured of the common electrode.

Preferably, the area of one of the displacement electrode and the fixed electrode of each of the first and second capacitive elements is set to be larger than the area of the other electrode such that each effective opposing area of each pair of electrodes forming the first and second capacitive elements does not change even when a relative position of the displacement electrode with respect to the fixed electrode changes as a result of action of the torque around the Z axis.

In this case, the effective opposing area of each pair of electrodes forming the first and second capacitive elements does not change even when the torque around the Z axis acts, and thus, it is possible to improve accuracy in torque detection and accuracy in determination on whether the torque sensor functions normally.

In the torque sensor described above, it is preferable that the second supporting body be connected to the annular deformation body in two regions where the annular deformation body meets a YZ plane. In this case, the deformation of the annular deformation body caused by the acting torque is symmetric with respect to an origin O, and thus, it is easy to measure the torque.

Preferably, when a V axis and a W axis passing through the origin O and forming an angle of 45° with respect to the X axis and the Y axis, respectively, are defined on the XY plane, both the first capacitive element and the second capacitive element are arranged on the V axis or on the W axis as viewed from the Z axis direction.

In this case, the first and second capacitive elements exhibit behavior opposite to each other regarding a change in capacitance value of each capacitive element. Thus, it is easy to measure the torque based on the change in the capacitance value of each capacitive element and to perform a process for the malfunction diagnosis of the torque sensor.

Alternatively, the present invention provides a torque sensor that detects a torque around a Z axis in an XYZ three-dimensional coordinate system, the torque sensor including: an annular deformation body made of a material elastically deformable by action of a torque to be detected and having a through opening through which the Z axis passes; a first supporting body connected to the annular deformation body at two first portions where the annular deformation body meets an XZ plane; a second supporting body connected to the annular deformation body at two second portions where the annular deformation body includes the Z axis and meets a plane different from the XZ plane, the second supporting body being rotatable around the Z axis with respect to the first supporting body; a displacement electrode that is arranged to the annular deformation body and causes displacement by elastic deformation of the annular deformation body; a fixed electrode arranged at a position opposing the displacement electrode in the first supporting body; and a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode in which, the annular deformation body includes a high elastic portion and a low elastic portion having a spring constant smaller than a spring constant of the high elastic portion, the capacitive element includes a first capacitive element, a second capacitive element, a third capacitive element, and a fourth capacitive element. The first capacitive element and the second capacitive element are configured of the displacement electrodes and the fixed electrodes which are arranged at two first positions, respectively, in the high elastic portion where a spacing distance between the annular deformation body and the first supporting body changes when the torque around the Z axis acts, the third capacitive element and the fourth capacitive element are configured of the displacement electrodes and the fixed electrodes which are arranged at two second positions, respectively, in the low elastic portion where the spacing distance between the annular deformation body and the first supporting body changes when the torque around the Z axis acts, and the detection circuit outputs a first electric signal corresponding to a "difference between a capacitance value of the first capacitive element and a capacitance value of the second capacitive element" and a second electric signal corresponding to a "difference between a capacitance value of the third capacitive element and a capacitance value of the fourth capacitive element" as electric signals indicating the acting torque, and determines whether the torque sensor functions normally based on a ratio between the first electric signal and the second electric signal.

According to the present invention, a ratio between the first electric signal and the second electric signal changes along with metal fatigue caused first in the low elastic portion than in the high elastic portion. When the malfunction diagnosis is performed focusing on this fact, it is possible to provide the torque sensor capable of detecting that the metal fatigue occurs in the elastic body before breakage of the elastic body forming the torque detection portion and diagnosing the malfunction of the torque detection portion. In addition, the two capacitive elements are arranged to the high elastic portion and the low elastic portion, and thus, it is possible to perform difference detection in the present invention. Thus, it is possible to detect the torque with high accuracy.

The respective fixed electrodes and displacement electrodes forming the first to fourth capacitive elements can be individually formed for each capacitive element. Alternatively, one of each fixed electrode and each displacement electrode may be configured of a common electrode. That is, at least two of the respective displacement electrodes of the first to fourth capacitive elements may be configured of the common electrode, or at least two of the respective fixed electrodes of the first to fourth capacitive elements may be configured of the common electrode.

Preferably, the area of one of the displacement electrode and the fixed electrode of each of the first to fourth capacitive elements is set to be larger than the area of the other electrode such that each effective opposing area of each pair of electrodes forming the first to fourth capacitive elements does not change even when a relative position of the displacement electrode with respect to the fixed electrode changes as a result of action of the torque around the Z axis.

In this case, the effective opposing area of each pair of electrodes forming the first to fourth capacitive elements does not change even when the torque around the Z axis acts, and thus, it is possible to improve accuracy in torque detection and accuracy in determination on whether the torque sensor functions normally.

In the torque sensor described above, it is preferable that the second supporting body be connected to the annular deformation body in two regions where the annular deformation body meets a YZ plane. In this case, the deformation of the annular deformation body caused by the acting torque is symmetric with respect to an origin O, and thus, it is easy to measure the torque.

Preferably, when a V axis and a W axis passing through the origin O and forming an angle of 45° with respect to the X axis and the Y axis, respectively, are defined on the XY plane, the first capacitive element is arranged on a positive V axis, the second capacitive element is arranged on a positive W axis, the third capacitive element is arranged on a negative V axis, and the fourth capacitive element is arranged on a negative W axis, as viewed from the Z axis direction.

In this case, the first and third capacitive elements exhibit the same behavior with each other, and the second and fourth capacitive elements exhibit the same behavior with each other regarding the change in the capacitance value of each capacitive element. Thus, it is easy to measure the torque based on the change in the capacitance value of each capacitive element and to perform a process for the malfunction diagnosis of the torque sensor.

Alternatively, the present invention provides a torque sensor that detects a torque around a Z axis in an XYZ three-dimensional coordinate system, the torque sensor including: an annular deformation body made of a material elastically deformable by action of a torque to be detected and having a through opening through which the Z axis passes; a first supporting body connected to the annular deformation body at two first portions where the annular deformation body meets an XZ plane; a second supporting body connected to the annular deformation body at two second portions where the annular deformation body includes the Z axis and meets a plane different from the XZ plane, the second supporting body being rotatable around the Z axis with respect to the first supporting body; a displacement electrode that is arranged to the annular deformation body and causes displacement by elastic deformation of the annular deformation body; a fixed electrode arranged at a position opposing the displacement electrode in the first supporting body; and a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode in which, the annular deformation body is configured such that four high elastic portions and four low elastic portions each of which has a spring constant smaller than a spring constant of the high elastic portion are alternately arranged one by one in a circumferential direction, the capacitive element includes a first capacitive element, a second capacitive element, a third capacitive element, a fourth capacitive element, a fifth capacitive element, a sixth capacitive element, a seventh capacitive element, and an eighth capacitive element, each of the first, third, fifth and seventh capacitive elements is configured of the displacement electrode and the fixed electrode which are arranged at a first position in each of the high elastic portions where a spacing distance between the annular deformation body and the first supporting body changes when the torque around the Z axis acts, each of the second, fourth, sixth and eighth capacitive elements is configured of the displacement electrode and the fixed electrode which are arranged at a second position in each of the low elastic portions where the spacing distance between the annular deformation body and the first supporting body changes when the torque around the Z axis acts, and the detection circuit outputs a first electric signal corresponding to a "difference between a sum of a capacitance value of the first capacitive element and a capacitance value of the fifth capacitive element and a sum of a capacitance value of the third capacitive element and a capacitance value of the seventh capacitive element" and a second electric signal corresponding to a "difference between a sum of a capacitance value of the second capacitive element and a capacitance value of the sixth capacitive element and a sum of a capacitance value of the fourth capacitive element and a capacitance value of the eighth capacitive element" as electric signals indicating the acting torque, and determines whether the torque sensor functions normally based on a ratio between the first electric signal and the second electric signal.

According to the present invention, a ratio between the first electric signal and the second electric signal changes along with metal fatigue caused first in the low elastic portion than in the high elastic portion. When the malfunction diagnosis is performed focusing on this fact, it is possible to provide the torque sensor capable of detecting that the metal fatigue occurs in the elastic body before breakage of the elastic body forming the torque detection portion and diagnosing the malfunction of the torque detection portion. In addition, the four capacitive elements are arranged to the high elastic portion and the low elastic portion, and thus, it is possible to perform the highly accurate difference detection in the present invention. Thus, it is possible to detect the torque with higher accuracy.

In such a torque sensor, the respective fixed electrodes and displacement electrodes forming the first to eighth capacitive elements can be individually formed for each capacitive element. Alternatively, one of each fixed electrode and each displacement electrode may be configured of a common electrode. That is, at least two of the respective displacement electrodes of the first to eighth capacitive elements may be configured of the common electrode, or at least two of the respective fixed electrodes of the first to eighth capacitive elements may be configured of the common electrode.

Preferably, the area of one of the displacement electrode and the fixed electrode of each of the first to eighth capacitive elements is set to be larger than the area of the other electrode such that each effective opposing area of each pair of electrodes forming the first to eighth capacitive elements does not change even when a relative position of the displacement electrode with respect to the fixed electrode changes as a result of action of the torque around the Z axis.

In this case, the effective opposing area of each pair of electrodes forming the first to eighth capacitive elements does not change even when the torque around the Z axis acts, and thus, it is possible to improve accuracy in torque detection and accuracy in determination on whether the torque sensor functions normally.

In the torque sensor described above, it is preferable that the second supporting body be connected to the annular deformation body in two regions where the annular deformation body meets a YZ plane. In this case, the deformation of the annular deformation body caused by the acting torque is symmetric with respect to an origin O, and thus, it is easy to measure the torque.

Preferably, when a V axis and a W axis passing through the origin O and forming an angle of 45° with respect to the X axis and the Y axis, respectively, are defined on the XY plane, the first high elastic portion is arranged in a region partitioned by a positive X axis and a positive V axis, the second high elastic portion is arranged in a region defined by a positive Y axis and a positive W axis, the third high elastic portion is arranged in a region defined by a negative X axis and a negative V axis, the fourth high elastic portion is arranged in a region defined by a negative Y axis and a negative W axis, the first low elastic portion is arranged in a region defined by the positive V axis and the positive Y axis, the second low elastic portion is arranged in a region defined by the positive W axis and the negative X axis, the third low elastic portion is arranged in a region defined by the negative V axis and the negative Y axis, the fourth low elastic portion is arranged in a region defined by the negative W axis and the positive X axis, and the first capacitive element is arranged to the first high elastic portion, as viewed from the Z axis direction.

More specifically, the first capacitive element and the second capacitive element are arranged symmetrically with respect to the V axis as viewed from the Z axis direction, in the vicinity of the positive V axis, the third capacitive element and the fourth capacitive element are arranged symmetrically with respect to the W axis as viewed from the Z axis direction in the vicinity of the positive W axis, the fifth capacitive element and the sixth capacitive element are arranged symmetrically with respect to the V axis as viewed from the Z axis direction in the vicinity of the negative V axis, and the seventh capacitive element and the eighth capacitive element are arranged symmetrically with respect to the W axis as viewed from the Z axis direction in the vicinity of the negative W axis.

In this case, the first and fifth capacitive elements exhibit the same behavior with each other, the second and sixth capacitive elements exhibit the same behavior with each other, the third and seventh capacitive elements exhibit the same behavior with each other, and the fourth and eighth capacitive elements exhibit the same behavior with each other regarding the change in the capacitance value of each capacitive element. Thus, it is easy to measure the torque based on the change in the capacitance value of each capacitive element and to perform a process for the malfunction diagnosis of the torque sensor.

In addition, the high elastic portion and the low elastic portion can be configured in various modes in the above torque sensor. For example, the low elastic portion can be configured to be narrower than the high elastic portion in the radial direction of the annular deformation body. Alternatively, the low elastic portion can be configured to be thinner than the high elastic portion in the Z axis direction.

In addition, it is preferable that the displacement electrode be arranged on a surface of the annular deformation body, more specifically, on an inner circumferential face, an outer circumferential face, or a surface opposing the first supporting body of the annular deformation body. In this case, it is easy to form the capacitive element between the displacement electrode and the fixed electrode.

Alternatively, the present invention provides a torque sensor that detects a torque around a Z axis in an XYZ three-dimensional coordinate system, the torque sensor including: an annular deformation body made of a material elastically deformable by action of a torque to be detected and having a through opening through which the Z axis passes; a first supporting body connected to the annular deformation body at two first portions where the annular deformation body meets an XZ plane; a second supporting body connected to the annular deformation body at two second portions where the annular deformation body includes the Z axis and meets a plane different from the XZ plane, the second supporting body being rotatable around the Z axis with respect to the first supporting body; a displacement electrode that is arranged at a predetermined position of the annular deformation body and causes displacement by elastic deformation of the annular deformation body; a fixed electrode arranged at a position opposing the displacement electrode in the first supporting body; and a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode in which the annular deformation body includes first and second detection portions positioned at two detection points defined on the annular deformation body, and a connection portion connected to both ends of the first and second detection portions, each of the first and second detection portions includes a first deformation portion elastically deformable by action of the torque to be detected, a second deformation portion elastically deformable by action of the torque to be detected, and a displacement portion causing displacement by elastic deformation of the first deformation portion and the second deformation portion, an outer end of the first deformation portion is connected to the connection portion adjacent thereto, an inner end of the first deformation portion is connected to the displacement portion, an outer end of the second deformation portion is connected to the connection portion adjacent thereto. An inner end of the second deformation portion is connected to the displacement portion, the first and second deformation portions of the first detection portion have a spring constant larger than a spring constant of the first and second deformation portions of the second detection portion, the capacitive element includes a first capacitive element and a second capacitive element. Each of the capacitive elements is configured of the displacement electrode and the fixed electrode which are arranged at positions, respectively, corresponding to the displacement portions of the first and second detection portions, and the detection circuit outputs a first electric signal corresponding to a capacitance value of the first capacitive element and a second electric signal corresponding to a capacitance value of the second capacitive element as electric signals indicating the acting torque, and determines whether the torque sensor functions normally based on a ratio between the first electric signal and the second electric signal.

According to the present invention, the metal fatigue is caused in the first and second deformation portions of the second detection portion first and the spring constant thereof decreases as compared to the first and second deformation portions of the first detection portion, and thus, the change occurs in the ratio between the first electric signal and the second electric signal by use for a long period of time. When the malfunction diagnosis is performed focusing on this fact, it is possible to provide the torque sensor capable of detecting that the metal fatigue occurs in the elastic body before breakage of the elastic body forming the torque detection portion and diagnosing the malfunction of the torque detection portion.

Each of the fixed electrodes and the displacement electrodes forming the first and second capacitive elements can be individually formed for each of the capacitive elements. Alternatively, one of each fixed electrode and each displacement electrode may be configured of a common electrode. That is, each displacement electrode of the first and second capacitive elements may be configured of the common electrode, or each fixed electrode of the first and second capacitive elements may be configured of the common electrode.

Preferably, the area of one of the displacement electrode and the fixed electrode of each of the first and second capacitive elements is set to be larger than the area of the other electrode such that each effective opposing area of each pair of electrodes forming the first and second capacitive elements does not change even when a relative position of the displacement electrode with respect to the fixed electrode changes as a result of action of the torque around the Z axis.

In this case, the effective opposing area of each pair of electrodes forming the first and second capacitive elements does not change even when the torque around the Z axis acts, and thus, it is possible to improve accuracy in torque detection and accuracy in determination on whether the torque sensor functions normally.

In addition, it is preferable that the second supporting body be connected to the annular deformation body in two regions where the annular deformation body meets the YZ plane. In this case, the deformation of the annular deformation body caused by the acting torque is symmetric with respect to an origin O, and thus, it is easy to measure the torque.

Preferably, when a V axis and a W axis passing through the origin O and forming an angle of 45° with respect to the X axis and the Y axis, respectively, are defined on the XY plane, the first capacitive element is arranged on a positive V axis, and the second capacitive element is arranged on a positive W axis as viewed from the Z axis direction.

In this case, the first and second capacitive elements exhibit behavior opposite to each other regarding a change in capacitance value of each capacitive element. Thus, it is easy to measure the torque based on the change in the capacitance value of each capacitive element and to perform a process for the malfunction diagnosis of the torque sensor.

The first and second deformation portions of the first detection portion having a relatively large spring constant and the first and second deformation portions of the second detection portion having a relatively small spring constant can be configured in various modes in each of the above torque sensors. For example, the first and second deformation portions of the second detection portion can be configured to be narrower than the first and second deformation portions of the first detection portion in the radial direction of the annular deformation body. Alternatively, the first and second deformation portions of the second detection portion can be configured to be thinner than the first and second deformation portions of the first detection portion in the Z axis direction.

Alternatively, the present invention provides a torque sensor that detects a torque around a Z axis in an XYZ three-dimensional coordinate system, the torque sensor including: an annular deformation body made of a material elastically deformable by action of a torque to be detected and having a through opening through which the Z axis passes; a first supporting body connected to the annular deformation body at two first portions where the annular deformation body meets an XZ plane; a second supporting body connected to the annular deformation body at two second portions where the annular deformation body includes the Z axis and meets a plane different from the XZ plane, the second supporting body being rotatable around the Z axis with respect to the first supporting body; a displacement electrode that is arranged at a predetermined position of the annular deformation body and causes displacement by elastic deformation of the annular deformation body; a fixed electrode arranged at a position opposing the displacement electrode in the first supporting body; and a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode in which, the annular deformation body includes first to fourth detection portions positioned at four detection points defined on the annular deformation body, and a connection portion connected to both ends of the first to fourth detection portions, each of the first to fourth detection portions includes a first deformation portion elastically deformable by action of the torque to be detected, a second deformation portion elastically deformable by action of the torque to be detected, and a displacement portion causing displacement by elastic deformation of the first deformation portion and the second deformation portion, an outer end of the first deformation portion is connected to the connection portion adjacent thereto, an inner end of the first deformation portion is connected to the displacement portion, an outer end of the second deformation portion is connected to the connection portion adjacent thereto, an inner end of the second deformation portion is connected to the displacement portion, the first and second deformation portions of the first and fourth detection portions have a spring constant larger than a spring constant of the first and second deformation portions of the second and third detection portion, the capacitive element includes a first capacitive element, a second capacitive element, a third capacitive element, and a fourth capacitive element, each of the capacitive elements is configured of the displacement electrode and the fixed electrode which are arranged at positions, respectively, corresponding to the displacement portions of the first to fourth detection portions, and the detection circuit outputs a first electric signal corresponding to a "difference between a capacitance value of the first capacitive element and a capacitance value of the fourth capacitive element" and a second electric signal corresponding to a "difference between a capacitance value of the second capacitive element a capacitance value of the third capacitive element" as electric signals indicating the acting torque, and determines whether the torque sensor functions normally based on a ratio between the first electric signal and the second electric signal.

According to the present invention, the metal fatigue is caused in the first and second deformation portions of the second and third detection portions first and the spring constant thereof decreases as compared to the first and second deformation portions of the first and fourth detection portions, and thus, the change occurs in the ratio between the first electric signal and the second electric signal by use for a long period of time. When the malfunction diagnosis is performed focusing on this fact, it is possible to provide the torque sensor capable of detecting that the metal fatigue occurs in the elastic body before breakage of the elastic body forming the torque detection portion and diagnosing the malfunction of the torque detection portion.

In such a torque sensor, the respective fixed electrodes and displacement electrodes forming the first to fourth capacitive elements can be individually formed for each capacitive element. Alternatively, one of each fixed electrode and each displacement electrode may be configured of a common electrode. That is, at least two of the respective displacement electrodes of the first to fourth capacitive elements may be configured of the common electrode, or at least two of the respective fixed electrodes of the first to fourth capacitive elements may be configured of the common electrode.

Preferably, the area of one of the displacement electrode and the fixed electrode of each of the first to fourth capacitive elements is set to be larger than the area of the other electrode such that each effective opposing area of each pair of electrodes forming the first to fourth capacitive elements does not change even when a relative position of the displacement electrode with respect to the fixed electrode changes as a result of action of the torque around the Z axis.

In this case, the effective opposing area of each pair of electrodes forming the first and second capacitive elements does not change even when the torque around the Z axis acts, and thus, it is possible to improve accuracy in torque detection and accuracy in determination on whether the torque sensor functions normally.

In addition, it is preferable that the second supporting body be connected to the annular deformation body in two regions where the annular deformation body meets the YZ plane. In this case, the deformation of the annular deformation body caused by the acting torque is symmetric with respect to an origin O, and thus, it is easy to measure the torque.

Preferably, when a V axis and a W axis passing through the origin O and forming an angle of 45° with respect to the X axis and the Y axis, respectively, are defined on the XY plane, the first capacitive element is arranged on a positive V axis, the second capacitive element is arranged on a positive W axis, the third capacitive element is arranged on a negative V axis, and the fourth capacitive element is arranged on a negative W axis, as viewed from the Z axis direction.

In this case, the first and fourth capacitive elements exhibit behavior opposite to each other, and the second and third capacitive elements exhibit behavior opposite to each other regarding the change in the capacitance value of each capacitive element. Thus, it is easy to measure the torque based on the change in the capacitance value of each capacitive element and to perform a process for the malfunction diagnosis of the torque sensor.

The first and second deformation portions of the first detection portion having a relatively large spring constant and the first and second deformation portions of the second detection portion having a relatively small spring constant can be configured in various modes in each of the above torque sensors. For example, the first and second deformation portions of the second and third detection portions can be configured to be narrower than the first and second deformation portions of the first and fourth detection portions in the radial direction of the annular deformation body. Alternatively, the first and second deformation portions of the second and third detection portions can be configured to be thinner than the first and second deformation portions of the first and fourth detection portions in the Z axis direction.

Alternatively, the present invention provides a torque sensor that detects a torque around a Z axis in an XYZ three-dimensional coordinate system, the torque sensor including: an annular deformation body made of a material elastically deformable by action of a torque to be detected and having a through opening through which the Z axis passes; a first supporting body connected to the annular deformation body at two first portions where the annular deformation body meets an XZ plane; a second supporting body connected to the annular deformation body at two second portions where the annular deformation body includes the Z axis and meets a plane different from the XZ plane, the second supporting body being rotatable around the Z axis with respect to the first supporting body; a displacement electrode that is arranged at a predetermined position of the annular deformation body and causes displacement by elastic deformation of the annular deformation body; a fixed electrode arranged at a position opposing the displacement electrode in the first supporting body; and a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode in which, the annular deformation body includes first to eighth detection portions positioned at eight detection points defined on the annular deformation body, and a connection portion connected to both ends of the first to eighth detection portions, each of the first to eighth detection portions includes a first deformation portion elastically deformable by action of the torque to be detected, a second deformation portion elastically deformable by action of the torque to be detected, and a displacement portion causing displacement by elastic deformation of the first deformation portion and the second deformation portion, an outer end of the first deformation portion is connected to the connection portion adjacent thereto, an inner end of the first deformation portion is connected to the displacement portion, an outer end of the second deformation portion is connected to the connection portion adjacent thereto, an inner end of the second deformation portion is connected to the displacement portion, the first and second deformation portions of the first, third, fifth and seventh detection portions have a spring constant larger than a spring constant of the first and second deformation portions of the second, fourth, sixth and eighth detection portions, the capacitive element includes a first capacitive element, a second capacitive element, a third capacitive element, a fourth capacitive element, a fifth capacitive element, a sixth capacitive element, a seventh capacitive element, an eighth capacitive element, each of the capacitive elements is configured of the displacement electrode and the fixed electrode which are arranged at positions, respectively, corresponding to the displacement portions of the first to eighth detection portions, and the detection circuit outputs a first electric signal corresponding to a "difference between a sum of a capacitance value of the first capacitive element and a capacitance value of the fifth capacitive element and a sum of a capacitance value of the third capacitive element and a capacitance value of the seventh capacitive element" and a second electric signal corresponding to a "difference between a sum of a capacitance value of the second capacitive element and a capacitance value of the sixth capacitive element and a sum of a capacitance value of the fourth capacitive element and a capacitance value of the eighth capacitive element" as electric signals indicating the acting torque, and determines whether the torque sensor functions normally based on a ratio between the first electric signal and the second electric signal.

According to the present invention, the metal fatigue is caused in the first and second deformation portions of the second detection portion first and the spring constant thereof decreases as compared to the first and second deformation portions of the first detection portion, and thus, the change occurs in the ratio between the first electric signal and the second electric signal by use for a long period of time. When the malfunction diagnosis is performed focusing on this fact, it is possible to provide the torque sensor capable of detecting that the metal fatigue occurs in the elastic body before breakage of the elastic body forming the torque detection portion and diagnosing the malfunction of the torque detection portion. In addition, the first and second electric signals are provided by each of the four capacitive elements, and thus, it is possible to perform the highly accurate difference detection in the present invention. Thus, it is possible to detect the torque with higher accuracy.

The respective fixed electrodes and displacement electrodes forming the first to eighth capacitive elements can be individually formed for each capacitive element. Alternatively, one of each fixed electrode and each displacement electrode may be configured of a common electrode. That is, at least two of the respective displacement electrodes of the first to eighth capacitive elements can be configured of the common electrode, or at least two of the respective fixed electrodes of the first to eighth capacitive elements may be configured of the common electrode.

Preferably, the area of one of the displacement electrode and the fixed electrode of each of the first to fourth capacitive elements is set to be larger than the area of the other electrode such that each effective opposing area of each pair of electrodes forming the first to fourth capacitive elements does not change even when a relative position of the displacement electrode with respect to the fixed electrode changes as a result of action of the torque around the Z axis.

In this case, the effective opposing area of each pair of electrodes forming the first to eighth capacitive elements does not change even when the torque around the Z axis acts, and thus, it is possible to improve accuracy in torque detection and accuracy in determination on whether the torque sensor functions normally.

In addition, it is preferable that the second supporting body is connected to the annular deformation body in two regions where the annular deformation body meets the YZ plane. In this case, the deformation of the annular deformation body caused by the acting torque is symmetric with respect to an origin O, and thus, it is easy to measure the torque.

Preferably, the first capacitive element is arranged on a straight line passing through the origin O and forming an angle of 30° with respect to the positive X axis, the second capacitive element is arranged on a straight line passing through the origin O and forming an angle of 60° with respect to the positive X axis, the third capacitive element is arranged on a straight line passing through the origin O and forming an angle of 120° with respect to the positive X axis, the fourth capacitive element is arranged on a straight line passing through the origin O and forming an angle of 150° with respect to the positive X axis, the fifth capacitive element is arranged on a straight line passing through the origin O and forming an angle of 210° with respect to the positive X axis, the sixth capacitive element is arranged on a straight line passing through the origin O and forming an angle of 240° with respect to the positive X axis, the seventh capacitive element is arranged on a straight line passing through the origin O and forming an angle of 300° with respect to the positive X axis, and the eighth capacitive element is arranged on a straight line passing through the origin O and forming an angle of 330° with respect to the positive X axis, as viewed in the Z axis direction.

In this case, the first and fifth capacitive elements exhibit the same behavior with each other, the third and seventh capacitive elements exhibit the same behavior with each other, the second and sixth capacitive elements exhibit the same behavior with each other, and the fourth and eighth capacitive elements exhibit the same behavior with each other regarding the change in the capacitance value of each capacitive element. Thus, it is easy to measure the torque based on the change in the capacitance value of each capacitive element and to perform a process for the malfunction diagnosis of the torque sensor.

The first and second deformation portions of the first detection portion having a relatively large spring constant and the first and second deformation portions of the second detection portion having a relatively small spring constant can be configured in various modes in each of the above torque sensors. For example, the first and second deformation portions of the second, fourth, sixth, and eighth detection portions can be configured to be narrower than the first and second deformation portions of the first, third, fifth, and seventh detection portions in the radial direction of the annular deformation body. Alternatively, the first and second deformation portions of the second, fourth, sixth, and eighth detection portions can be configured to be thinner than the first and second deformation portions of the first, third, fifth, and seventh detection portions in the Z axis direction.

Preferably, the detection circuit includes a storage unit that stores the ratio between the first electric signal and the second electric signal in a state where the torque sensor functions normally as a reference ratio, and determines whether the torque sensor functions normally by determining whether a difference between the ratio between the first electric signal and the second electric signal and the reference ratio falls within a predetermined range.

In this case, the ratio between the first electric signal and the second electric signal is compared with the reference ratio, and thus, it is possible to reliably detect the occurrence of the metal fatigue in the annular deformation body.

In the above torque sensor, the acting torque can be measured based on the first electric signal. In this case, the metal fatigue is developed in the first and second deformation portions of the detection portion having the relatively large spring constant more slowly than in the first and second deformation portions of the detection portion having the relatively small spring constant, and thus, it is possible to stably provide the first electric signal even when the load repeatedly acts on the annular deformation body.

Alternatively, the acting torque may be measured based on the second electric signal. In this case, the first and second deformation portions of the detection portion corresponding to the capacitive element that provides the second electric signal have the relatively small spring constant, and thus, are subjected to relatively large displacement (have a high sensitivity) with respect to the acting torque, thereby enabling the torque measurement with an excellent S/N.

In addition, the following modes are possible as arrangement of the annular deformation body, the first supporting body, and the second supporting body. That is, the first supporting body is arranged on one side of the Z axis of the annular deformation body, the second supporting body is arranged on the other side of the Z axis of the annular deformation body, and the annular deformation body is connected to the first supporting body via first connection members and is connected to the second supporting body via second connection members.

Alternatively, the first supporting body is arranged on an inner side of an inner peripheral face of the annular deformation body, the second supporting body is arranged on an outer side of an outer peripheral face of the annular deformation body, and the annular deformation body is connected to the first supporting body via first connection members and is connected to the second supporting body via a second connection member.

It is possible to configure a diameter of the torque sensor to be smaller in the former case, and it is possible to configure a thickness (dimension in the Z axis direction) of the torque sensor to be smaller in the latter case. These arrangements can be selected appropriately according to a space where the torque sensor is installed.

It is a matter of course that these types of arrangement may be combined as another example. That is, the first supporting body is arranged on the inner side of the inner peripheral face or the outer side of the outer peripheral face of the annular deformation body, the second supporting body is arranged on one side of the Z axis of the annular deformation body, and the annular deformation body is connected to the first supporting body via the first connection members and is connected to the second supporting body via the second connection members.

Alternatively, the first supporting body is arranged on one side of the Z axis of the annular deformation body, the second supporting body is arranged on the inner side of the inner peripheral face or the outer side of the outer peripheral face of the annular deformation body, and the annular deformation body is connected to the first supporting body via first connection members and is connected to the second supporting body via second connection members.

DESCRIPTION OF EMBODIMENTS

Since own principle of torque detection used in a torque sensor according to the present invention is common to the conventional torque sensor, firstly, a structure of the conventional torque sensor and the principle of torque detection will be described in § 1 to § 3. In addition, an embodiment of a torque sensor according to the present invention will be described in § 4 to § 6 based on this description. In addition, a structure of a torque sensor adopting a detection portion of a waveform and a torque detection principle thereof will be described in § 7 and § 8 as another example, and the embodiment of the torque sensor according to the present invention adopting a detection portion of a waveform will be described in § 9 to § 11. The torque sensor adopting the waveform detection portion described in § 7 and § 8 is proposed in International Patent Application PCT/JP2015/052783 filed by the present applicant. In addition, a modified example applicable to any embodiment will be described in § 12 and § 13.

<<<§ 1. Basic Structural Part of Conventional Torque Sensor>>>

Figure 1:
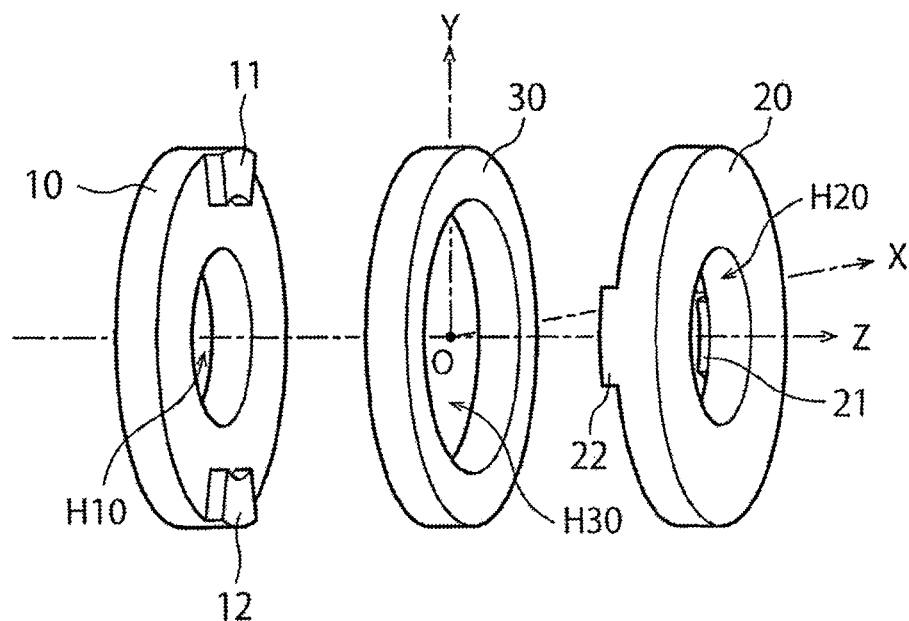
FIG. 1 is an exploded perspective view of a basic structural part of a conventional torque sensor.

FIG. 1 is an exploded perspective view of a basic structural part of the conventional torque sensor. As illustrated, this basic structural part is configured by arranging an annular deformation body 30 between a left side supporting body 10 and a right side supporting body 20 and joining these three constituent elements to each other. Here, the following description will be given defining an XYZ three-dimensional coordinate system, as illustrated, for the sake of convenience. Here, a Z axis drawn in the horizontal direction in FIG. 1 corresponds to a rotation axis of a torque, which is an object to be detected, and this torque sensor serves a function to detect the torque around this rotation axis (around the Z axis).

The annular deformation body 30 arranged at the center of FIG. 1 is made of a material elastically deformable by action of a torque which is an object to be detected, and a through opening H30 through which a rotation axis (Z axis) passes is formed inside the annular deformation body 30. On the other hand, the left side supporting body 10 arranged on the left side of FIG. 1 is a member that supports a left side face of the annular deformation body 30, and the right side supporting body 20 arranged on the right side of FIG. 1 is a member that supports a right side face of the annular deformation body 30. In the example illustrated herein, the left side supporting body 10 is an annular member formed with a through opening H10 through which the rotation axis (Z axis) passes, and the right side supporting body 20 is an annular member formed with a through opening H20 through which the rotation axis (Z axis) passes.

Incidentally, a concept of the right side and the left side is generally a concept that is meaningful only as viewed from a specific observation direction. Here, as viewed from a reference observation direction (an observation direction in which a right direction is a positive direction of the Z axis) such that the rotation axis (Z axis) forms a horizontal line extending to the right and left as illustrated in FIG. 1, a supporting body arranged at a position adjacent to the left side of the annular deformation body 30 is referred to as the left side supporting body 10, and a supporting body arranged at a position adjacent to the right side of the annular deformation body 30 is referred to as the right side supporting body 20 for convenience of description.

Here, an origin O of the XYZ three-dimensional coordinate system is defined at a center position of the annular deformation body 30, and all of the left side supporting body 10, the annular deformation body 30, and the right side supporting body 20 are configured of the annular members having the Z axis as a central axis thereof. More specifically, the annular deformation body 30 is formed of the annular member obtained by forming the through opening H30 having a concentric disc shape with a smaller diameter at a central portion of a disc arranged with the Z axis (rotation axis) as a central axis. Similarly, the left side supporting body 10 and the right side supporting body 20 are also formed of the annular members obtained by forming the through openings H10 and H20 each of which has a concentric disk shape with a smaller diameter at the central portion of the disc arranged with the Z axis (rotation axis) as the central axis. It is a matter of course that the through openings H10 and H20 are not necessarily provided, and the left side supporting body 10 and the right side supporting body 20 may be disks.

On the other hand, two fan-shaped convex portions 11 and 12 projecting to the right are provided on a right side face of the left side supporting body 10, and top faces of the convex portions 11 and 12 are joined to the left side face of the annular deformation body 30. As illustrated in the drawing, the convex portion 11 is joined to an upper portion (portion positioned in a positive Y axis direction) of the annular deformation body 30, and the convex portion 12 is joined to a lower portion (portion positioned in a negative Y axis direction) of the annular deformation body 30. Similarly, two fan-shaped convex portions 21 and 22 projecting to the left are provided on a left side face of the right side supporting body 20, and top faces of the convex portions 21 and 22 are joined to the right side face of the annular deformation body 30. As illustrated in the drawing, the convex portion 21 is joined to a deep portion (portion positioned in a positive X axis direction) of the annular deformation body 30, and the convex portion 22 is joined to a front portion (portion positioned in a negative X axis direction) of the annular deformation body 30.

Figure 2:
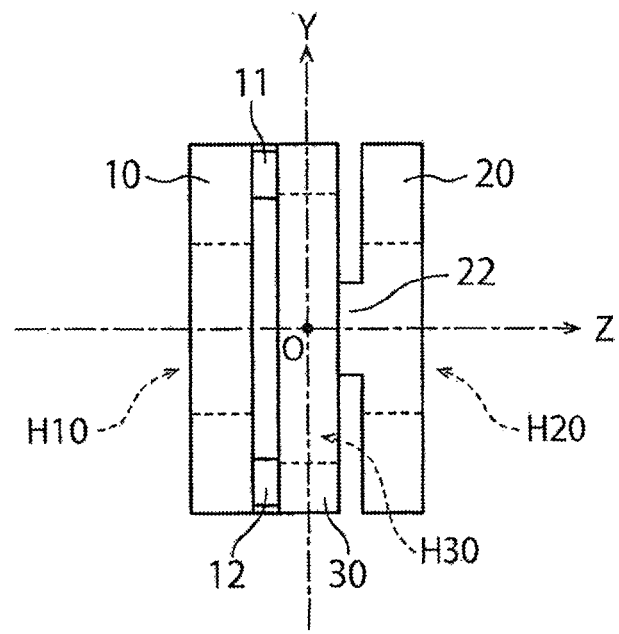
FIG. 2 is a side view of a basic structural part of a torque sensor obtained by joining three constituent elements illustrated in FIG. 1 to each other.
Figure 3:
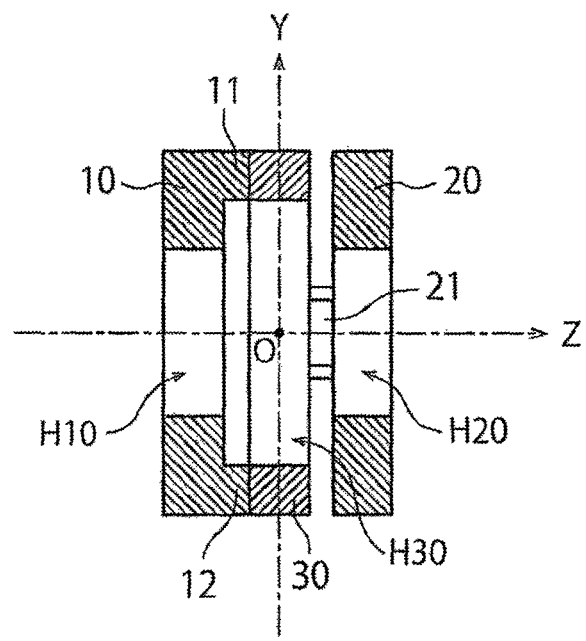
FIG. 3 is a side sectional view of the basic structural part illustrated in FIG. 2 cut along a YZ plane.

FIG. 2 is a side view of a basic structural part of a torque sensor obtained by joining the three constituent elements illustrated in FIG. 1 to each other, and FIG. 3 is a side sectional view of this basic structural part cut along a YZ plane. In the example illustrated herein, the convex portions 11 and 12 are structural bodies integrated with the left side supporting body 10, and the top faces thereof are joined to the left side face of the annular deformation body 30 as illustrated in FIG. 3. Similarly, the convex portions 21 and 22 are structural bodies integrated with the right side supporting body 20, and the top faces thereof are joined to the right side face of the annular deformation body 30.

Eventually, the convex portions 11 and 12 function as left side connection members that connect a left side connection point on the left side face of the annular deformation body 30 opposing the left side supporting body 10 to the left side supporting body 10, and the convex portions 21 and 22 function as right side connection members that connect a right side connection point on the right side face of the annular deformation body 30 opposing the right side supporting body 20 to the right side supporting body 20.

Figure 4:
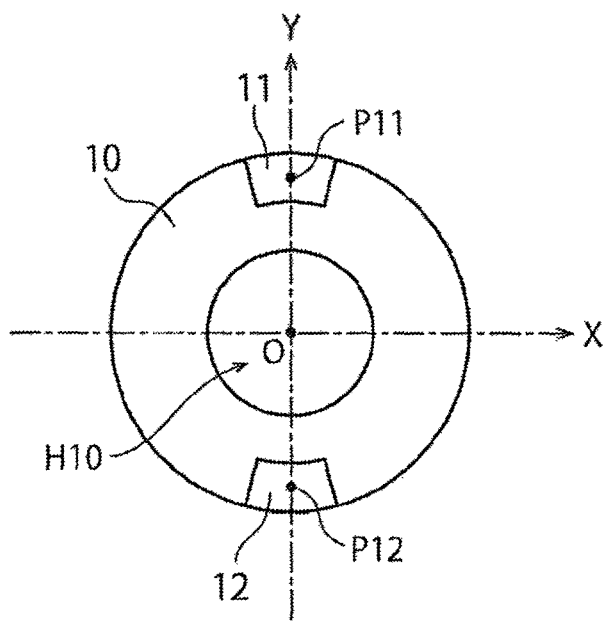
FIG. 4 is a front view of a left side supporting body and a convex portion illustrated in FIG. 1 as viewed from a right direction of FIG. 1.
Figure 5:
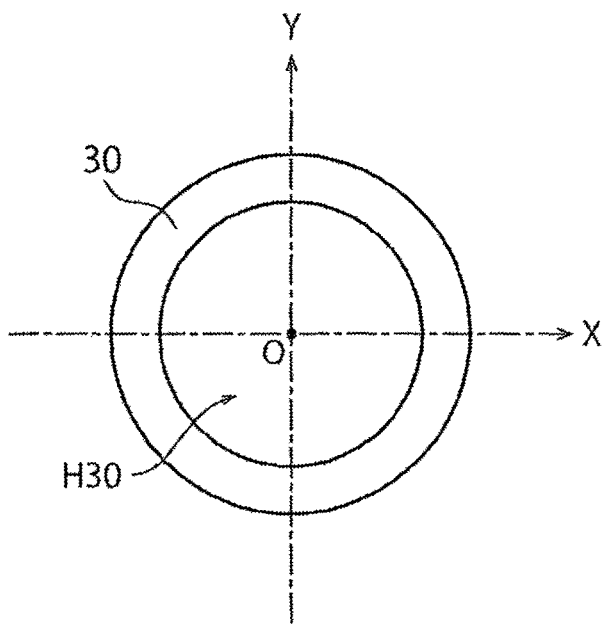
FIG. 5 is a front view of an annular deformation body illustrated in FIG. 1 as viewed from the right direction of FIG. 1.
Figure 6:
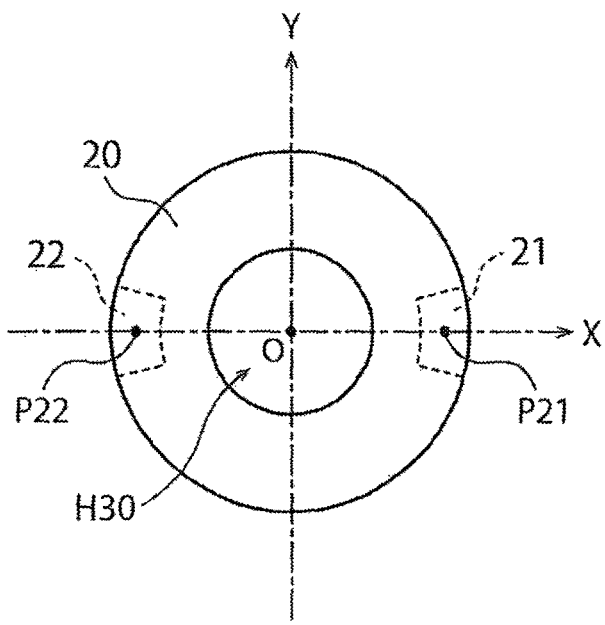
FIG. 6 is a front view of a right side supporting body and the convex portion illustrated in FIG. 1 as viewed from the right direction of FIG. 1.

FIG. 4 is a front view of the left side supporting body 10 and the convex portions 11 and 12 as viewed from the right direction of FIG. 1, FIG. 5 is a front view of the annular deformation body 30 as viewed from the right direction of FIG. 1, FIG. 6 is a front view of the right side supporting body 20 and the convex portions 21 and 22 as viewed from the right direction of FIG. 1. In FIG. 4, points P11 and P12 illustrated at center positions of the convex portions 11 and 12 are the left side connection points, and are used to describe connection positions with respect to the annular deformation body 30 in § 2. Similarly, in FIG. 6, points P21 and P22 illustrated at center positions of the convex portions 21 and 22 are the right side connection points, and are also used to describe the connection positions with respect to the annular deformation body 30 in § 2.

In practice, it is preferable to configure the parts (the left side supporting body 10 and the convex portions 11 and 12) illustrated in FIG. 4 and the parts (the right side supporting body 20 and the convex portions 21 and 22) illustrated in FIG. 6 to be completely the same. In this case, when the parts illustrated in FIG. 4 are turned over by being rotated by 180° about the Y axis as a rotation axis and further rotated by 90° about the Z axis as a rotation axis, the rotated parts completely match the parts illustrated in FIG. 6. Accordingly, it is possible to configure the basic structural part illustrated in FIG. 2, in practice, by preparing two sets of the parts illustrated in FIG. 4 and preparing one set of the parts illustrated in FIG. 5.

As illustrated in FIG. 5, the circular through opening H30 is provided in the annular deformation body 30, which is configured to cause elastic deformation that is necessary for detection. As will be described later, the annular deformation body 30 needs to be deformed into an elliptical shape when the torque to be detected acts on this basic structural part. The easiness of such elastic deformation of the annular deformation body 30 is a parameter which determines a detection sensitivity of the sensor. When the annular deformation body 30 which is liable to be elastically deformed is used, it is possible to realize a highly sensitive sensor capable of detecting even a minute torque, but a maximum value of a detectable torque is suppressed. Conversely, when the annular deformation body 30 which is hardly elastically deformed is used, it is possible to increase the maximum value of the detectable torque, but the sensitivity is lowered so that it is difficult to detect the minute torque.

The ease of elastic deformation of the annular deformation body 30 is determined depending on the thickness in the Z axis direction (likely to be elastically deformed as the thickness becomes thinner) and the diameter of the through opening H30 (likely to be elastically deformed as the diameter becomes larger), and further determined depending on its material. Accordingly, a dimension and a material of each part of the annular deformation body 30 may be appropriately selected according to an application of the torque sensor in practical use.

On the other hand, the left side supporting body 10 and the right side supporting body 20 do not need to be members that cause elastic deformation in terms of the detection principle of the present invention. Rather, it is preferable that the left side supporting body 10 and the right side supporting body 20 be completely rigid bodies in order to make the acting torque contribute 100% to the deformation of the annular deformation body 30. In the illustrated example, a reason for using the annular structural bodies having the through openings H10 and H20 at the central portions thereof as the left side supporting body 10 and the right side supporting body 20 is not for facilitating the elastic deformation, but for securing an insertion hole penetrating the through openings H10, H30 and H20 of the left side supporting body 10, the annular deformation body 30, and the right side supporting body 20 along the rotation axis (Z axis).

As is apparent from the side sectional view of FIG. 3, this basic structural part adopts a structure whose interior is hollow. When the torque sensor having such a hollow portion is used in the state of being incorporated in a joint portion of a robot arm, it is possible to arrange a decelerator or the like in this hollow portion, which allows designing the robot arm that is space saving on the whole. This is one of advantages which are hardly realized with the conventional torque sensor that uses torsion of a torsion bar having a solid round bar shape.

In this manner, it is necessary to configure the annular deformation body 30 using the material elastically deformable to the extent necessary for torque detection, but the left side supporting body 10 and the right side supporting body 20 do not need to cause elastic deformation, and rather, are preferably configured of the material with high rigidity in the torque sensor according to the present invention. In practical use, as the materials of the left side supporting body 10, the right side supporting body 20, and the annular deformation body 30, it is sufficient to use a synthetic resin such as plastic as long as an insulating material is used, and it is sufficient to use metal such as stainless steel and aluminum as long as a conductive material is used (in this case, it is necessary to insulate a necessary part such that an electrode is not short-circuited). It is a matter of course that the insulating material and the conductive material may be used in combination.

All the left side supporting body 10, the right side supporting body 20, and the annular deformation body 30 can be configured of a flat structural body having a small thickness in an axial direction, and thus, it is possible to set an axial length of the entire sensor to be short. In addition, it is necessary to use the material elastically deformable for the annular deformation body 30 since the torque detection is performed using displacement of the shape of the annular deformation body 30, but highly accurate detection is possible even if a material having relatively high rigidity is used.

<<<§ 2. Torque Detection Principle in Present Invention>>>

Figure 7:
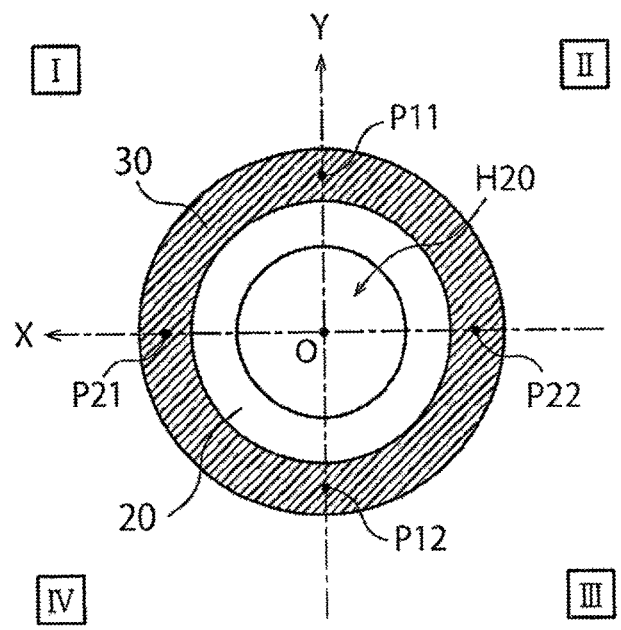
FIG. 7 is a cross-sectional view of the basic structural part illustrated in FIG. 2 cut along an XY plane and viewed from a left direction of FIG. 2.

Next, it is considered how each part deforms when a torque acts on the basic structural part described in § 1 herein. FIG. 7 is a cross-sectional view of the basic structural part illustrated in FIG. 2 cut along an XY plane and viewed from a left direction of FIG. 2. Incidentally, a XY coordinate system illustrated in FIG. 7 is obtained by viewing a general XY coordinate system from the back side (the positive X axis direction is the left direction in the drawing). Accordingly, an upper left region is the first quadrant, an upper right region is the second quadrant, a lower right region is the third quadrant, and a lower left region is the fourth quadrant in this XY coordinate system. In the drawing, I to IV indicate the respective quadrants of this coordinate system. The sectional part with hatching in FIG. 7 corresponds to the part of the annular deformation body 30, and the right side supporting body 20 is visible at the back thereof. The points P11 to P22 in FIG. 7 are orthogonal projection images of the connection points P11 to P22 illustrated in FIGS. 4 and 6 on the XY plane.

That is, in FIG. 7, the points P11 and P12 arranged on the Y axis indicate joint positions (center points of joint faces) of the convex portions 11 and 12 of the left side supporting body 10, and the points P21 and P22 arranged on the X axis indicate joint positions (center points of joint faces) of the convex portions 21 and 22 of the right side supporting body 20. Eventually, the left side face of the annular deformation body 30 is joined to the left side supporting body 10 at the two connection points P11 and P12 along the Y axis, and the right side face of the annular deformation body 30 is joined to the right side supporting body 20 at the two connection points P21 and P22 along the X axis.

In this manner, when the two upper and lower portions of the annular deformation body 30 are joined to the left side supporting body 10 and the two right and left portions thereof are joined to the right side supporting body 20 such that the connection points are shifted by 90° from each other, the annular deformation body 30 can be efficiently deformed by action of the torque.

In the example illustrated in FIG. 7, when the orthogonal projection images are obtained by projecting both side faces of the annular deformation body 30 on the XY plane, a projection image of the first right side connection point P21 is arranged on the positive X axis, a projection image of the second right side connection point P22 is arranged on the negative X axis, a projection image of the first left side connection point P11 is arranged on the positive Y axis, and a projection image of the second left side connection point P12 is arranged on the negative Y axis. The annular deformation body 30 can be deformed into an axially symmetric ellipse by performing such arrangement, and thus, it is possible to obtain a detection value having axial symmetry.

In the basic structural part illustrated in FIG. 2, the torque sensor according to the present invention is configured to detect the torque (rotational moment) relatively applied between the left side supporting body 10 and the right side supporting body 20, and the detection value indicates a force that relatively acts between the supporting bodies 10 and 20. Herein, it is assumed that a rotational moment applied to the left side supporting body 10 in a state where a load is applied to the right side supporting body 20 is considered as the torque to be detected (as a matter of course, it is equivalent even if a rotational moment applied to the right side supporting body 20 in a state where a load is applied to the left side supporting body 10 is considered as the torque to be detected) for convenience of description.

For example, it is considered an example in which a drive source such as a motor is attached to the left side supporting body 10, and a robot hand is attached to the right side supporting body 20 as an example of using such a torque sensor in the joint portion of the robot arm. If a rotational driving force is applied to the left side supporting body 10 from the drive source in a state where a heavy object is gripped by the robot hand, this rotational drive force is transmitted to the robot hand side via the basic structural part forming the joint portion. In this case, a torque to rotationally drive the right side supporting body 20 acts, and this torque corresponds to the rotational moment applied to the left side supporting body 10 in a state where the right side supporting body 20 is fixed.

Meanwhile, it is considered any change that is caused in the structural body illustrated in FIG. 7 by such a rotational moment. When the right side supporting body 20 is fixed, the positions of the connection points P21 and P22 on the X axis illustrated in FIG. 7 are in a fixed state. On the other hand, if a rotational moment is applied to the left side supporting body 10, for example, in a clockwise direction in FIG. 7, the connection points P11 and P12 on the Y axis move clockwise. Then, inevitably, a portion of an arc P21-P11 positioned in the first quadrant I shrinks in an inward direction, a portion of an arc P11-P22 positioned in the second quadrant II bulges outward, a portion of an arc P22-P12 positioned in the third quadrant III shrinks in the inward direction, and a portion of an arc P12-P21 positioned in the fourth quadrant IV bulges outward.

Figure 8:
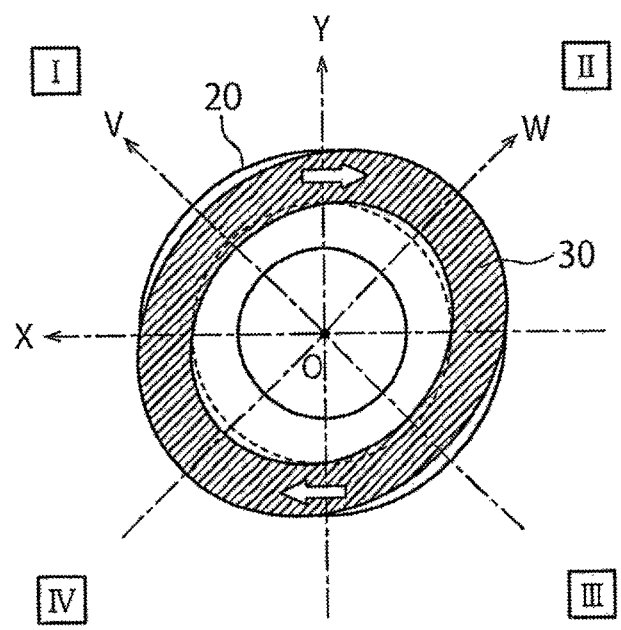
FIG. 8 is a cross-sectional view cut along the XY plane illustrating a deformed state when a positive torque around a Z axis acts on the basic structural part illustrated in FIG. 2 (a cross-sectional view of the basic structural part illustrated in FIG. 2 cut along the XY plane and viewed from the left direction of FIG. 2, and a broken line indicates a state before deformation).

FIG. 8 is a cross-sectional view illustrating a state where such deformation occurs in the structural body illustrated in FIG. 7. That is, FIG. 8 is the cross-sectional view of the basic structural part cut along the XY plane and viewed from the left direction in FIG. 2 when a positive torque in the Z axis acts on the basic structural part illustrated in FIG. 2. Incidentally, with respect to an arbitrary coordinate axis, a rotation direction for advancing a right screw in a positive direction of the coordinate axis is defined as the positive direction, and a rotation direction for advancing the right screw in a negative direction of the coordinate axis is defined as the negative direction in the present application. Accordingly, the positive torque around the Z axis is the torque acting in the clockwise direction as indicated by the hollow arrow in FIG. 8.

The dashed line drawn in FIG. 8 indicates a state of the annular deformation body 30 before deformation (the state of FIG. 7). Referring to this broken line, it is possible to easily grasp that the annular deformation body 30 is deformed into an elliptical shape due to the action of the positive torque around the Z axis. Herein, a V axis and a W axis, which pass through the origin O and form 45° with respect to the X axis and the Y axis, respectively, are defined on the XY plane for convenience of description. The V axis is a coordinate axis with the first quadrant I as the positive direction and the W axis is a coordinate axis with the second quadrant II as the positive direction. As illustrated in the drawing, the annular deformation body 30 is deformed into the ellipse with the V axis as a short-axis direction and the W axis as a long-axis direction, and has axial symmetry with respect to the V axis and the W axis. Such axial symmetry is convenient in the case of obtaining a torque detection value using a method to be described in § 3.

In the illustrated embodiment, the deformation with axial symmetry occurs because the annular deformation body 30 is a perfect circle when there is no load (when no torque acts), and the projection image of the first right side connection point P21 is arranged on the positive X axis, the projection image of the second right side connection point P22 is arranged on the negative X axis, the projection image of the first left side connection point P11 is arranged on the positive Y axis, and the projection image of the second left side connection point P12 is arranged on the negative Y axis in the case of obtaining the orthogonal projection images by projecting both the side faces of the annular deformation body 30 on the XY plane, as illustrated in FIG. 7.

The annular deformation body 30 is deformed into a more flattened ellipse as the acting torque becomes greater. Accordingly, it is possible to obtain the magnitude of the acting torque if it is possible to measure a distance of a portion of the annular deformation body 30 positioned on the V axis from the origin O, or a distance of a portion of the annular deformation body 30 positioned on the W axis from the origin O (these distances serve as information indicating a displacement amount from a position before deformation indicated by the broken line) in FIG. 8. In other words, it is enough if displacement in the radial direction of the inner peripheral face or the outer peripheral face of the annular deformation body 30 is measured.

On the other hand, when a torque acts in the opposite direction, that is, when a negative torque around the Z axis acts, a rotational force in a counterclockwise direction acts with respect to (the connection points P11 and P12 of) the annular deformation body 30 so that the annular deformation body 30 deforms into an ellipse with the V axis as the long-axis direction and the W axis as the short-axis direction, which is opposite to the example illustrated in FIG. 8. Accordingly, a displacement direction of a portion positioned on the V axis or a portion positioned on the W axis of the annular deformation body 30 is opposite to the direction of the example illustrated in FIG. 8.

Eventually, it is possible to detect both the direction and the magnitude of the acting torque by measuring the displacement of the portion positioned on the V axis or the portion positioned on the W axis of the annular deformation body 30. For example, when a position of an intersection point between the inner circumferential surface of the annular deformation body 30 and the V-axis is monitored, it is possible to determine that the positive torque around the Z axis is applied in the case of displacement in the inward direction from a reference position indicated by the broken line and that the negative torque around the Z axis is applied in the case of displacement in the outward direction. Alternatively, when the position of the intersection point between the inner circumferential surface of the annular deformation body 30 and the W axis is monitored, it is possible to determine that the positive torque around the Z axis is applied in the case of displacement in the outward direction from the reference position indicated by the broken line and that the negative torque around the Z axis is applied in the case of displacement in the inward direction. It is a matter of course that an absolute value of the displacement amount indicates the magnitude of the acting torque.

The displacement of the annular deformation body 30 in the radial direction occurring in the torque sensor according to the present invention is relatively great depending on a diameter of the annular deformation body even if a torsion angle generated in the annular deformation body 30 is small. Thus, it is possible to perform the torque detection with a sufficient sensitivity even if the annular deformation body 30 having relatively high rigidity is used The torque detection principle according to the present invention has been described as above. In the present invention, a capacitive element and a detection circuit are further added to the basic structural part described above in order to perform torque detection based on such a principle.

<<<§ 3. Capacitive Element and Detection Circuit>>>

The torque sensor is configured by further adding the capacitive element and the detection circuit to the basic structural part illustrated in FIG. 3. As illustrated in FIG. 8, the annular deformation body 30 is deformed into the ellipse by action of the torque. Since a portion causing the largest displacement through such displacement is the portion positioned on the V axis or the portion positioned on the W axis, to measure the displacement of the portion positioned on the V axis or the portion positioned on the W axis is the most efficient in measurement of the displacement amount (magnitude of the acting torque) of the annular deformation body 30 based on the displacement of a specific portion of the annular deformation body 30.

Figure 9:
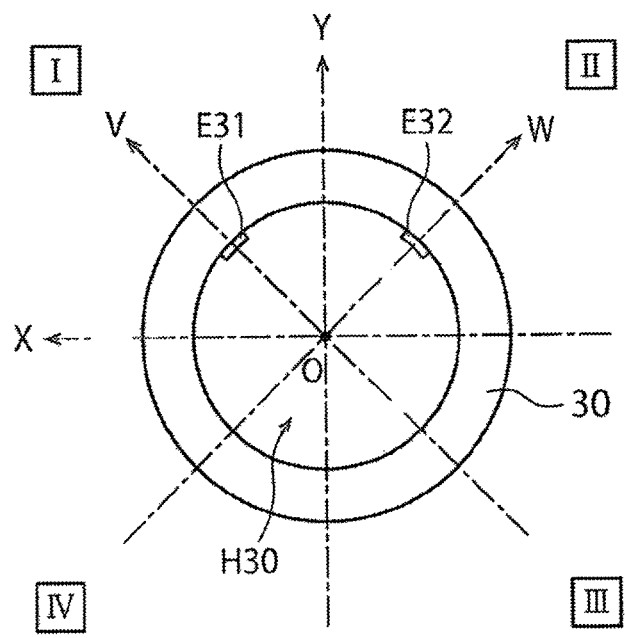
FIG. 9 is a plan view of the annular deformation body in a state where a displacement electrode is formed on an inner circumferential surface thereof as viewed from the left direction of FIG. 2.

Thus, a displacement electrode is formed in a region positioned on the V axis and a region positioned on the W axis of the inner peripheral face of the annular deformation body 30 in the embodiment described herein. FIG. 9 is a plan view of the annular deformation body 30 in a state where displacement electrodes E31 and E32 are formed on the inner circumferential surface thereof as viewed from the left direction of FIG. 2. For convenience of description, the X, Y, V and W axes are drawn in an overlapping manner. The displacement electrode E31 is an electrode formed in an intersection region between a positive region of the V axis and the inner peripheral face of the annular deformation body 30, and the displacement electrode E32 is an electrode formed in an intersection region between a positive region of the W axis and the inner peripheral face of the annular deformation body 30. A depth dimension (dimension in a direction perpendicular to the sheet plane of FIG. 9) of these displacement electrodes E31 is equal to a depth dimension of the annular deformation body 30. In this example, the displacement electrodes E31 and E32 are configured of a conductive layer such as a metal film formed by vapor deposition, plating, or the like on the inner peripheral face of the annular deformation body 30. It is a matter of course that it is necessary to form the displacement electrodes E31 and E32 via an insulating layer since the annular deformation body 30 itself has conductivity when the annular deformation body 30 is made of metal such as aluminum and stainless steel.

Figure 10:
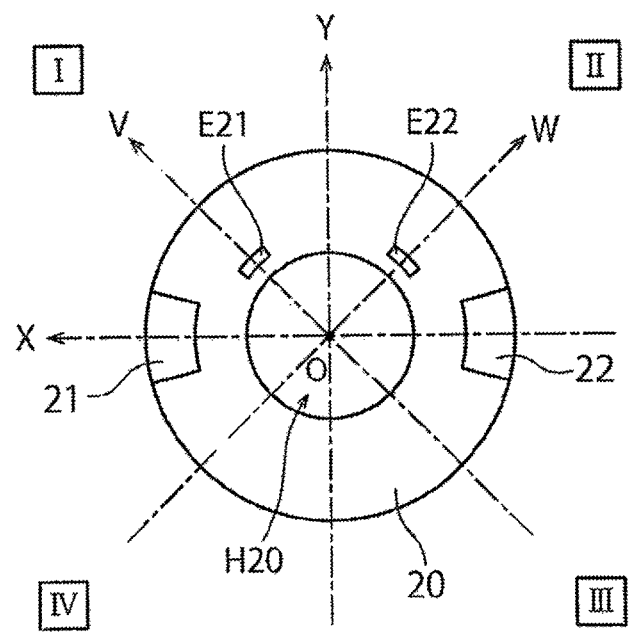
FIG. 10 is a plan view of the right side supporting body in a state where a fixed electrode is attached thereto as viewed from the left direction of FIG. 2.

On the other hand, fixed electrodes E21 and E22 are arranged at positions opposite to the displacement electrodes E31 and E32 and are fixed to the right side supporting body 20. FIG. 10 is a plan view of the right side supporting body 20 in a state where the fixed electrodes E21 and E22 are attached thereto as viewed from the left direction of FIG. 2. Herein, the X, Y, V and W axes are also drawn in an overlapping manner for convenience of description. The fixed electrode E21 is arranged in the positive region of the V axis and opposes the displacement electrode E31. The fixed electrode E22 is arranged in the positive region of the W axis and opposes the displacement electrode E32.

Figure 11:
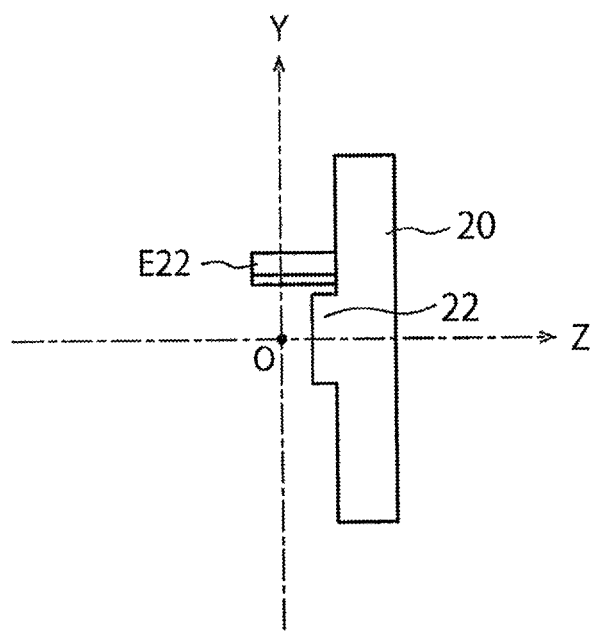
FIG. 11 is a side view of the right side supporting body illustrated in FIG. 10.

FIG. 11 is a side view of the right side supporting body 20 illustrated in FIG. 10. As illustrated in the drawing, the fixed electrode E21 is configured of a conductive plate that projects from the left side face of the right side supporting body 20 in the direction along the rotation axis (the negative Z axis direction). Incidentally, the fixed electrode E21 is hidden behind the fixed electrode E22, and does not appear in FIG. 11.

Figure 12:
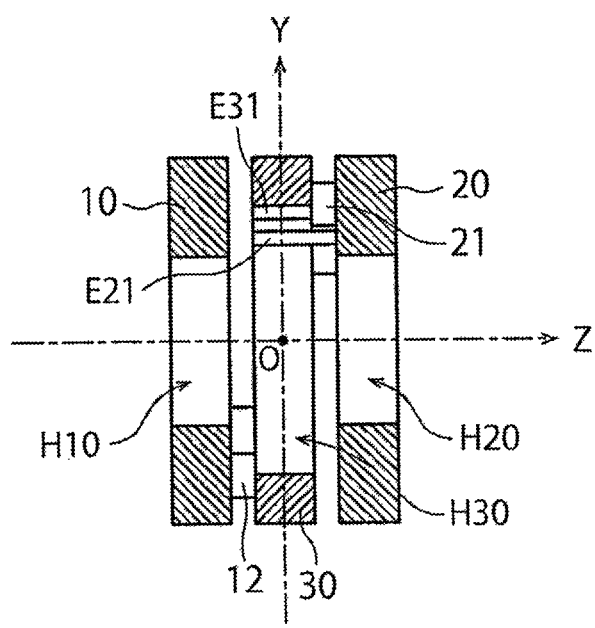
FIG. 12 is a side cross-sectional view of a structural body in which a displacement electrode and a fixed electrode are added to the basic structural part illustrated in FIG. 3 that is cut along a VZ plane (the upper side of FIG. 12 is a V axis direction illustrated in FIGS. 9 and 10).

FIG. 12 is a side cross-sectional view of the structural body in which the displacement electrode and the fixed electrode are added to the basic structural part illustrated in FIG. 3 that is cut along a VZ plane. Since FIG. 12 is the side sectional view cut along the VZ plane while FIG. 3 is the side sectional view cut along the YZ plane, the upper side of FIG. 12 is not the Y axis direction but the V axis direction illustrated in FIGS. 9 and 10. A state where the displacement electrode E31 and the fixed electrode E21 arranged on the V axis oppose each other is clearly illustrated in the side sectional view of FIG. 12. The displacement electrodes E31 and E32 are electrodes fixed to the inner peripheral face of the annular deformation body 30, and thus, are displaced depending on the deformation of the annular deformation body 30. On the other hand, right ends of the fixed electrodes E21 and E22 are fixed to the right side supporting body 20 so that the fixed electrodes E21 and E22 always maintain each constant position regardless of the deformation of the annular deformation body 30.

Eventually, a relative position of the displacement electrode E31 with respect to the fixed electrode E21 and a relative position of the displacement electrode E32 with respect to the fixed electrode E22 change depending on the deformation of the annular deformation body 30. In other words, an inter-electrode distance between the displacement electrode E31 and the fixed electrode E21 and an inter-electrode distance between the displacement electrode E32 and the fixed electrode E22 change depending on the deformation of the annular deformation body 30.

Figure 13:
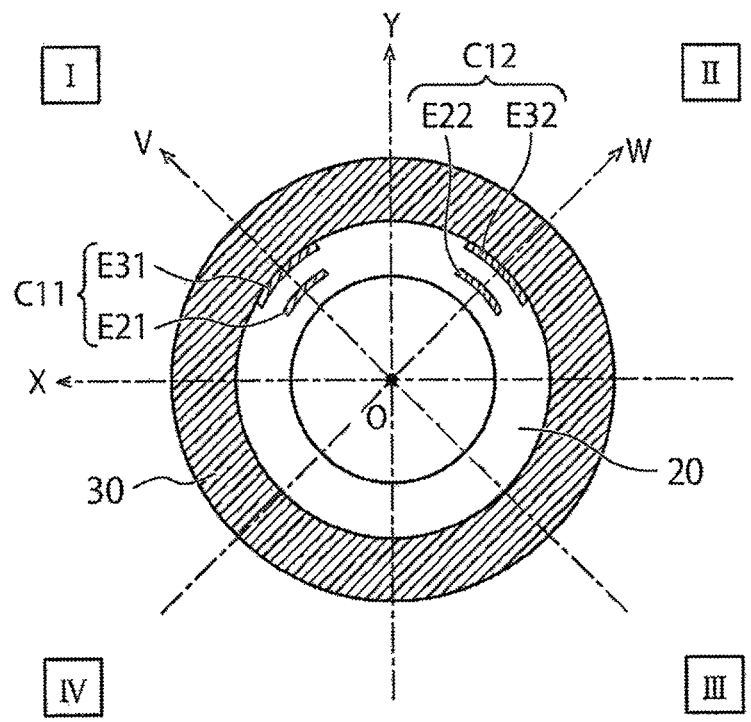
FIG. 13 is a cross-sectional view of the structural body in which the displacement electrode and the fixed electrode described above are added to the basic structural part illustrated in FIG. 2 that is cut along the XY plane and viewed from the left direction of FIG. 2.

FIG. 13 is a cross-sectional view of the structural body in which the displacement electrode and the fixed electrode described above are added to the basic structural part illustrated in FIG. 2 that is cut along the XY plane and viewed from the left direction of FIG. 2. A state where the displacement electrodes E31 and E32 and the fixed electrodes E21 and E22 arranged on the V axis oppose each other is clearly illustrated in this side sectional view.

Since the displacement electrodes E31 and E32 are configured of the conductive layers formed on the inner peripheral face of the annular deformation body 30 in the present embodiment, surfaces thereof become curved surfaces along an inner periphery of the annular deformation body 30. Thus, the fixed electrodes E21 and E22 opposing the displacement electrodes E31 and E32 are also formed as curved electrodes. In other words, the surfaces of the displacement electrodes E31 and E32 and the fixed electrodes E21, E22 are configured by concentric cylindrical surfaces with the Z axis as a central axis thereof. Meanwhile, the surface shape of each electrode may be any shape as long as it is possible to serve the role of forming the capacitive element, and thus, a planar electrode whose surface is planar may be used.

Incidentally, the thicknesses of each displacement electrode and each fixed electrode is drawn ignoring an actual dimension thereof in the drawings of the present application for convenience of illustration. For example, when the displacement electrodes E31 and E32 are configured of a conductive layer (a vapor-deposited layer or a plating layer) formed on the inner peripheral face of the annular deformation body 30, the thickness thereof can be set to about several μm. On the other hand, when the fixed electrodes E21 and E22 are configured of a conductive plate (metal plate) projecting from the left side surface of the right side supporting body 20, it is preferable to secure the thickness thereof to be about several mm in order to secure strength in practical use. Accordingly, the thickness of the displacement electrode and the thickness of the fixed electrode are drawn to have the same dimension in FIG. 13 and the like for the sake of convenience, but the actual thickness dimensions of these electrodes need to be respectively set to appropriate values in consideration of a manufacturing process and the strength in practical use.

Figure 14:
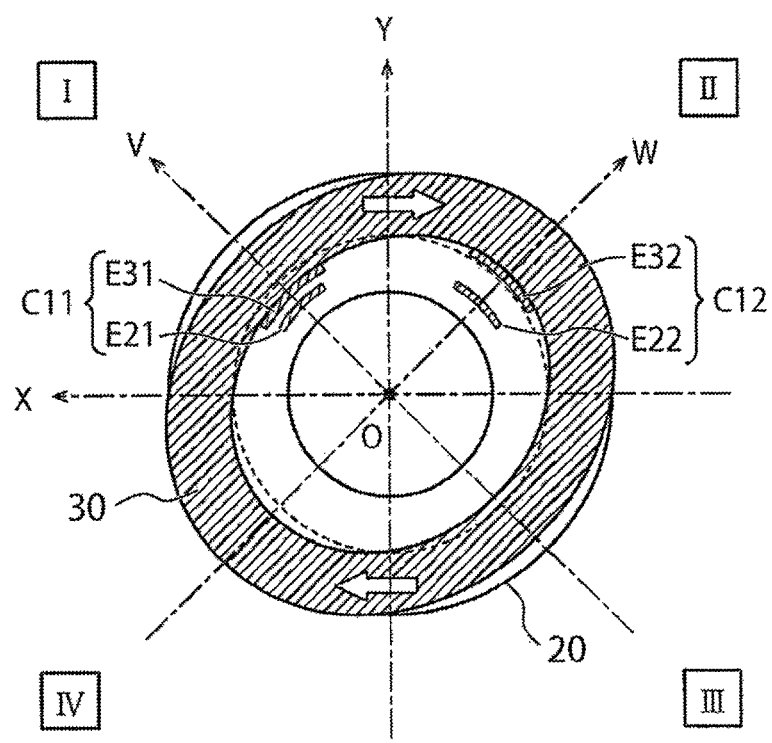
FIG. 14 is a cross-sectional view illustrating a state where a positive torque around the Z axis acts on the basic structural part illustrated in FIG. 3 (the broken line indicates a state before deformation).

FIG. 14 is an XY cross-sectional view illustrating a state where the positive torque around the Z axis acts on the basic structural part illustrated in FIG. 13. As described in § 2, when such a torque acts, the annular deformation body 30 deforms into the elliptical shape, the V axis becomes the short-axis direction of the ellipse, and the W axis becomes the long-axis direction of the ellipse. As a result, an inter-electrode interval between the pair of electrodes E21 and E31 arranged on the V axis is narrowed, and an inter-electrode interval between the pair of electrodes E23 and E33 arranged on the W axis is widened. Then, when a capacitive element C11 is configured of the pair of electrodes E21 and E31 and a capacitive element C12 is configured of the pair of electrodes E22 and E32, it is possible to detect the direction and the magnitude of the acting torqued as a variation amount of capacitance values of the capacitive elements C11 and C12.

For example, when focusing on the variation of the capacitance value of the capacitive element C11 configured of the electrodes E21 and E31 using a no-load state (a state where no torque acts) illustrated in FIG. 13 as a reference, the inter-electrode interval is narrowed when the positive torque around the Z axis acts as illustrated in FIG. 14, and thus, the capacitance value increases. Conversely, the inter-electrode interval is widened when the negative torque around the Z axis acts, and thus, the capacitance value decreases. Accordingly, an incremental variation of the capacitance value indicates the action of the positive torque around the Z axis, and a decremental variation of the capacitance value indicates the action of the negative torque around the Z axis. It is a matter of course that an absolute value of the variation amount indicates the magnitude of the acting torque.

Similarly, when focusing on the variation of the capacitance value of the capacitive element C12 configured of the electrodes E22 and E32, the inter-electrode interval is widened when the positive torque around the Z axis acts as illustrated in FIG. 14, and thus, the capacitance value decreases. Conversely, the inter-electrode interval is narrowed when the negative torque around the Z axis acts, and thus, the capacitance value increases. Accordingly, a decremental variation of the capacitance value indicates the action of the positive torque around the Z axis, and an incremental variation of the capacitance value indicates the action of the negative torque around the Z axis. It is a matter of course that an absolute value of the variation amount indicates the magnitude of the acting torque.

Eventually, it is possible to detect the torque around the Z axis using any of the two capacitive elements C11 and C12, and theoretically, it is enough to use only one of the capacitive elements. In practice, however, it is preferable to perform detection using both of the two capacitive elements C11 and C12. That is, if the capacitive element C11 is provided at a short-axis position (on the V axis) and the capacitive element C12 is provided at a long-axis position (on the W axis) when the annular deformation body 30 is deformed into the ellipse, the inter-electrode interval is widened and the capacitance value decreases at the long-axis position (on the W axis) while the inter-electrode interval is narrowed and the capacitance value increases at the short-axis position (on the V axis) in the case of applying the same torque. Thus, it is possible to detect the acting torque as a difference between the two capacitance values C11 and C12.

<<<§ 4. Example of Two-Electrode Type Torque Sensor According to Present Invention>>>

Next, an example of a two electrode type torque sensor according to the present invention will be described with reference to FIGS. 15 to 19.

Figure 15:
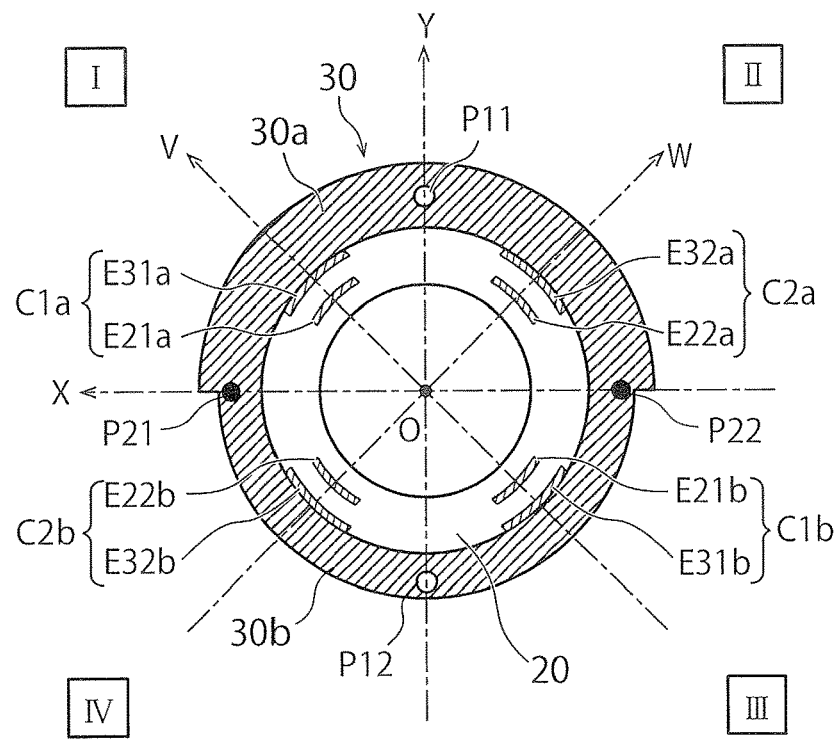
FIG. 15 is an XY-sectional view illustrating a basic structural part of a two electrode type torque sensor according to the present invention.

FIG. 15 is an XY-sectional view illustrating a basic structural part of the two electrode type torque sensor according to the present invention. As illustrated in FIG. 15, the annular deformation body 30 according to the present embodiment includes a high elastic portion 30a and a low elastic portion 30b having a spring constant smaller than a spring constant of the high elastic portion 30a. In the present embodiment, a semicircular ring portion of the annular deformation body 30 arranged in a region where a Y coordinate is positive is configured as the high elastic portion 30a, and the remaining semicircular ring portion arranged in a region where a Y coordinate is negative is configured as the low elastic portion 30b. Although various modes can be conceived as a means for realizing the high elastic portion 30a and the low elastic portion 30b, the spring constant of the high elastic portion 30a is set to be larger than the spring constant of the low elastic portion 30b by making a thickness of the high elastic portion 30a in the radial direction to be larger than a thickness of the low elastic portion 30b in the radial direction herein, as illustrated in the drawing.

It is a matter of course that it is also possible to set the spring constant of the high elastic portion 30a to be larger than the spring constant of the low elastic portion 30b by making a thickness of the high elastic portion 30a in the Z axis direction to be larger than a thickness of the low elastic portion 30b in the Z axis direction, and it is also possible to set the spring constant of the high elastic portion 30a to be larger than the spring constant of the low elastic portion 30b by configuring the high elastic portion 30a and the low elastic portion 30b using different materials.

In addition, the high elastic portion 30a and the low elastic portion 30b are connected such that no step is formed on an inner peripheral face thereof, and the inner peripheral face of the annular deformation body 30 has a circular shape as viewed from the Z axis direction in the example illustrated in FIG. 15. In other words, all distances from the origin O to four portions where the inner peripheral face of the annular deformation body 30 meets the V axis and the W axis are set to be equal. Further, displacement electrodes E31a, E32a, E31b and E32b are arranged at positions corresponding to these four portions, respectively, as illustrated in the drawing. More specifically, the displacement electrode E31a is an electrode formed in a region where the positive region of the V axis meets an inner peripheral face of the high elastic portion 30a of the annular deformation body 30, and the displacement electrode E32a is an electrode formed in a region where the positive region of the W axis meets the inner peripheral face of the high elastic portion 30a of the annular deformation body 30. In addition, the displacement electrode E31b is an electrode formed in a region where the negative region of the V axis meets an inner peripheral face of the low elastic portion 30b of the annular deformation body 30, and the displacement electrode E32b is an electrode formed in a region where the negative region of the W axis meets the inner peripheral face of the low elastic portion 30b of the annular deformation body 30.

Further, fixed electrodes E21a, E22a, E21b and E22b are arranged at positions opposite to the displacement electrodes E31a, E32a, E31b and E32b, respectively, and are fixed to the right side supporting body 20. Since the configurations of the right side supporting body 20 and the left side supporting body 10 are the same as those of the conventional torque sensor described above, the detailed description thereof will be omitted. Herein, the torque sensor in which two capacitive elements are arranged to each of the high elastic portion 30a and the low elastic portion 30b is referred to as the two electrode type torque sensor.

Figure 16:
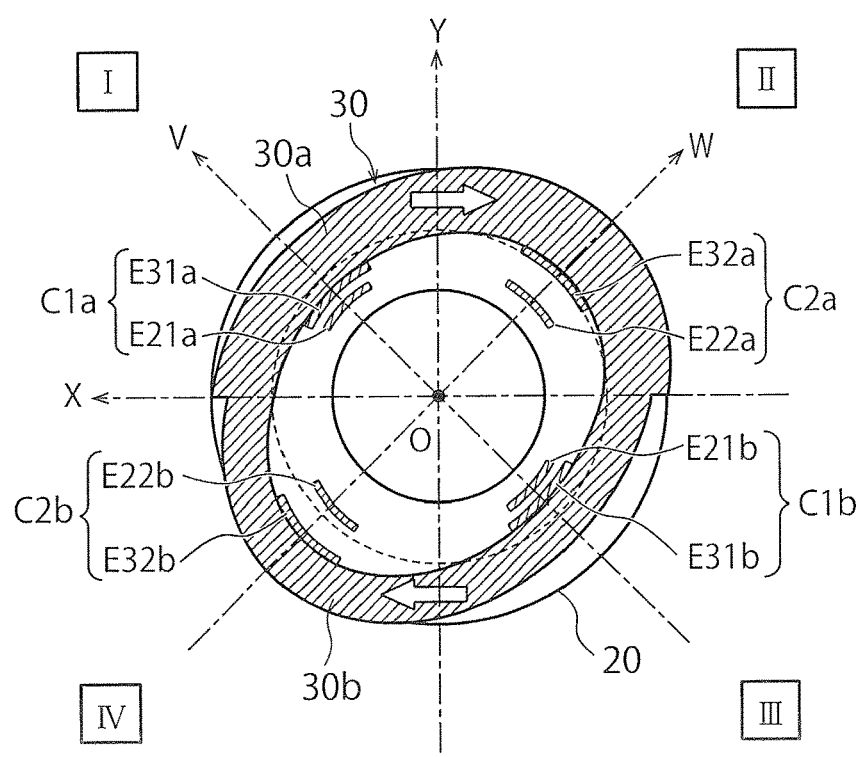
FIG. 16 is a cross-sectional view illustrating a state where a positive torque around the Z axis acts on the basic structural part in FIG. 15 (the broken line indicates a state before deformation).

FIG. 16 is an XY cross-sectional view illustrating a deformed state of the basic structural part of FIG. 15 when a positive torque around the Z axis acts on the torque sensor according to the present embodiment. As described in § 2, when such a torque acts, the annular deformation body 30 deforms into an elliptical shape, the V axis becomes the short-axis direction of the ellipse, and the W axis becomes the long-axis direction of the ellipse. However, the spring constant of the high elastic portion 30a is larger than the spring constant of the low elastic portion 30b in the annular deformation body 30 according to the present embodiment. Thus, a degree of deformation of the low elastic portion 30b is larger than a degree of deformation of the high elastic portion 30a as illustrated in the drawing. As a result, both inter-electrode intervals between the pair of electrodes E21a and E31a and between the pair of electrodes E21b and E31b arranged on the V axis are narrowed, but a narrowing degree thereof is larger in the inter-electrode interval between the pair of electrodes E21b and E31b arranged on the negative V axis. In addition, both inter-electrode intervals between the pair of electrodes E22a and E32a and between the pair of electrodes E22b and E32b arranged on the W axis are widened, but a widening degree thereof is larger in the inter-electrode interval between the pair of electrodes E22b and E32b arranged on the negative W axis.

On the other hand, when a torque acts in the opposite direction, that is, when a negative torque around the Z axis acts, a rotational force in a counterclockwise direction acts with respect to (the connection points P11 and P12 of) the annular deformation body 30 so that the annular deformation body 30 deforms into an ellipse with the V axis as the long-axis direction and the W axis as the short-axis direction, which is opposite to the example illustrated in FIG. 16. Accordingly, each displacement direction of the displacement electrodes E31a, E31b, E32a and E32b positioned on the V axis and the W axis of the annular deformation body 30 is opposite to that in the example illustrated in FIG. 16.

Thus, it is possible to detect the direction and the magnitude of the acting torque based on a first electric signal T1, which corresponds to a difference between a capacitance value of a capacitive element C1a configured of the pair of electrodes E21a and E31a and a capacitance value of a capacitive element C2a configured of the pair of electrodes E22a and E32a, as shown in the following [Expression 1]. Further, it is possible to detect the direction and the magnitude of the acting torque based on a second electric signal T2, which corresponds to a difference between a capacitance value of a capacitive element C1b configured of the pair of electrodes E21b and E31b and a capacitance value of a capacitive element C2b configured of the pair of electrodes E22b and E32b. Incidentally, C1a and C2a, C1b and C2b indicate capacitance values of the capacitive elements C1a and C2a, C1b and C2b, respectively, in the following [Expression 1].

$T1=C1a-C2a$ $T2=C1b-C2b$ [Expression 1]

In the present embodiment, the malfunction diagnosis of the torque sensor is performed by utilizing a fact that a ratio between the first and second electric signals T1 and T2 changes along with accumulation of metal fatigue in the annular deformation body 30. Thus, it is assumed that first and second electric signals in an initial state where the metal fatigue does not occur in the annular deformation body 30 are denoted by T1a and T2a, and first and second electric signals in a state where the metal fatigue occurs (is accumulated) in the annular deformation body 30 are denoted by T1b and T2b to distinguish from each other in the following description.

Figure 17:
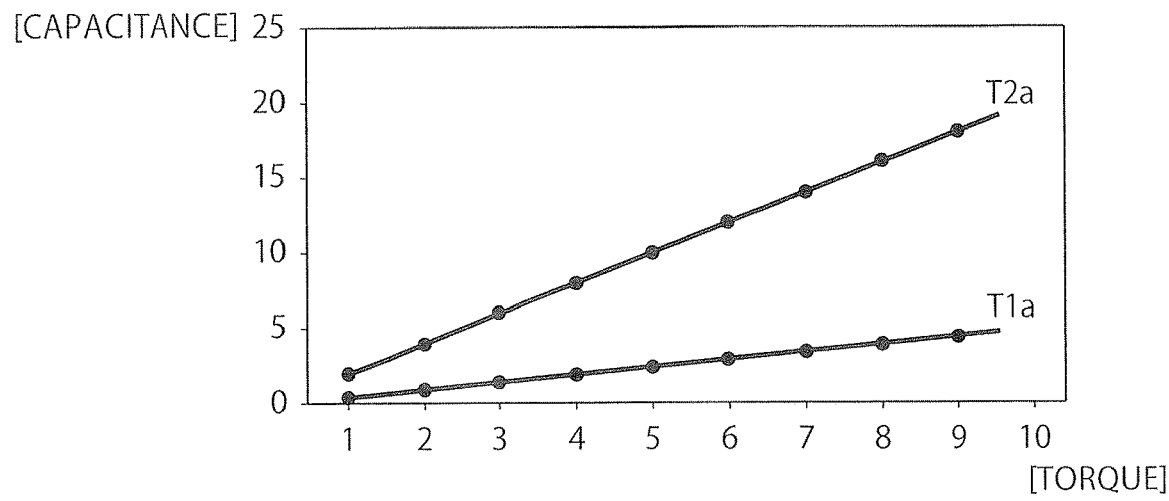
FIG. 17 is a graph illustrating a relationship between a magnitude of the torque acting on the torque sensor and a first electric signal T1$a$ and a second electric signal T2$a$ output from the torque sensor in a case (initial state) where metal fatigue does not occur in an annular deformation body of FIG. 15.
Figure 18:
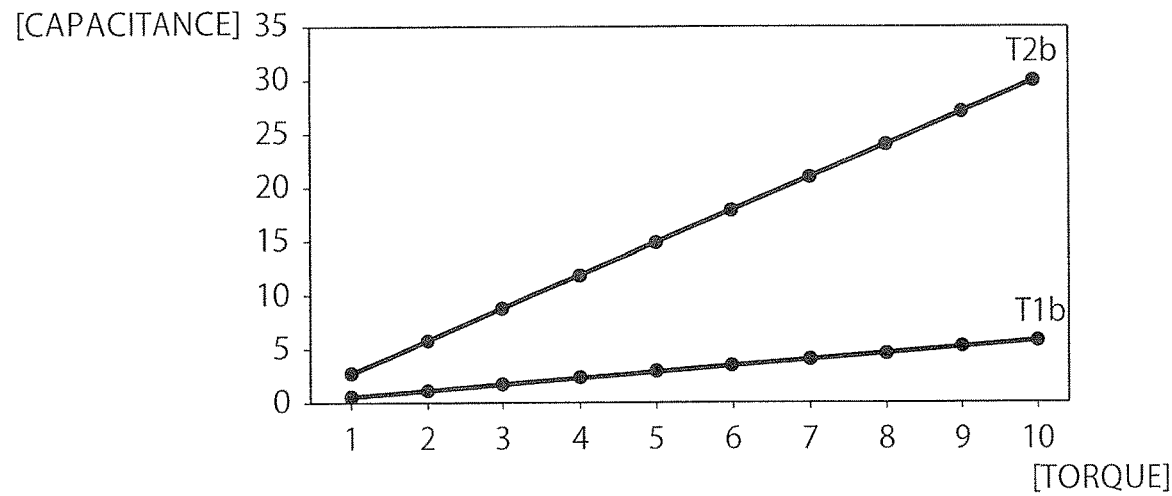
FIG. 18 is a graph illustrating a relationship between a magnitude of the torque acting on the torque sensor and a first electric signal T1$b$ and a second electric signal T2$b$ output from the torque sensor in a case where metal fatigue occurs in the annular deformation body of FIG. 15.

FIG. 17 is a graph illustrating a relationship between the magnitude of the torque acting on the torque sensor and the first electric signal T1a and the second electric signal T2a output from the torque sensor in the state (initial state) where the metal fatigue does not occur in the annular deformation body 30 of FIG. 15. FIG. 18 is a graph illustrating a relationship between the magnitude of the torque acting on the torque sensor and the first electric signal T1b and the second electric signal T2b output from the torque sensor in a state where the metal fatigue occurs (is accumulated) in the annular deformation body 30 of FIG. 15. In each drawing, the horizontal axis represents a torque acting on the torque sensor and the vertical axis represents a magnitude of an electric signal output from the torque sensor according to the torque. Thus, an inclination of a straight line indicating each of the electric signals T1a to T2b represents a detection sensitivity of the torque sensor in each drawing. Eventually, the basic structural part according to the present embodiment is equivalent to a configuration in which the two basic structural parts of the conventional two electrode type described above are arranged with different sensitivities. Incidentally, the inclination of each straight line depends on the spring constants of the corresponding high elastic portion 30a and low elastic portion 301.

Next, a method of determining whether the torque sensor functions normally will be described. When a repeated load acts on the torque sensor according to the present embodiment, the metal fatigue occurs in the annular deformation body 30. The metal fatigue is remarkably developed in the low elastic portion 30b in which the deformation caused by the torque is relatively large. When this metal fatigue is accumulated, strength of the low elastic portion 30b decreases, and finally, the annular deformation body 30 breaks. In general, when metal fatigue is accumulated in a metal material, the metal material is softened so that the spring constant of the low elastic portion 30b decreases. That is, when the metal fatigue is accumulated in the low elastic portion 30b in the annular deformation body 30 according to the present embodiment, the low elastic portion 30b is largely deformed by the torque, and the sensitivity of the low elastic portion 30b with respect to the torque increases as compared with the initial state. This fact can be understood by comparing FIG. 17 and FIG. 18.

Specifically, an inclination (sensitivity) of the straight line indicating the second electric signal T2a corresponding to the low elastic portion 30b is 2.0 in the initial state when referring to FIG. 17. On the other hand, an inclination (sensitivity) of the straight line indicating the second electric signal T2b corresponding to the low elastic portion 30b is 3.0 in the state where the metal fatigue is accumulated, and the sensitivity increases by 50% when referring to FIG. 18.

It is a matter of course that the metal fatigue is also developed in the high elastic portion 30a, but a degree of the development thereof is smaller than a degree of the development of metal fatigue in the low elastic portion 30b. In fact, an inclination (sensitivity) of the straight line indicating the first electric signal T1a corresponding to the high elastic portion 30a is 0.5 in the initial state when referring to FIG. 17. On the other hand, an inclination (sensitivity) of the straight line indicating the first electric signal T1b corresponding to the high elastic portion 30a in the state where the metal fatigue is accumulated is 0.6 when referring to FIG. 18. Accordingly, an increase of the sensitivity is only 20%.

It should be noted here that the degree of the development of metal fatigue differs between the high elastic portion 30a and the low elastic portion 30b. That is, a ratio (T2a/T1a) between the first electric signal T1a and the second electric signal T2a is 4.0 in the initial state, whereas a ratio (T2b/T1b) between the first electric signal T1b and the second electric signal T2b increases to 5.0 in the state where the metal fatigue is accumulated. The present invention utilizes this fact to perform the malfunction diagnosis of the torque sensor.

In other words, the ratio between the first electric signal T1 and the second electric signal T2 gradually changes due to the difference in characteristic of accumulation of metal fatigue between the high elastic portion 30a and the low elastic portion 30b. Further, when a repeated load is further applied to the torque sensor, the annular deformation body 30 finally is broken in the low elastic portion 30b, and it is difficult for the two capacitive elements C1b and C2b arranged on the low elastic portion 30b side to function normally. On the other hand, it is highly probable that the two capacitive elements C1a and C2a arranged on the high elastic portion 30a side function normally at this point in time.

In the above-described manner, it is possible to determine whether the torque sensor functions normally by evaluating whether a difference between the ratio of the first electric signal T1b and the second electric signal T2b and the ratio of the first electric signal T1a and the second electric signal T2a in the initial state falls within a predetermined range while performing the torque measurement using, for example, the capacitive elements C1a and C2a arranged on the elastic portion 30a side.

Figure 19:
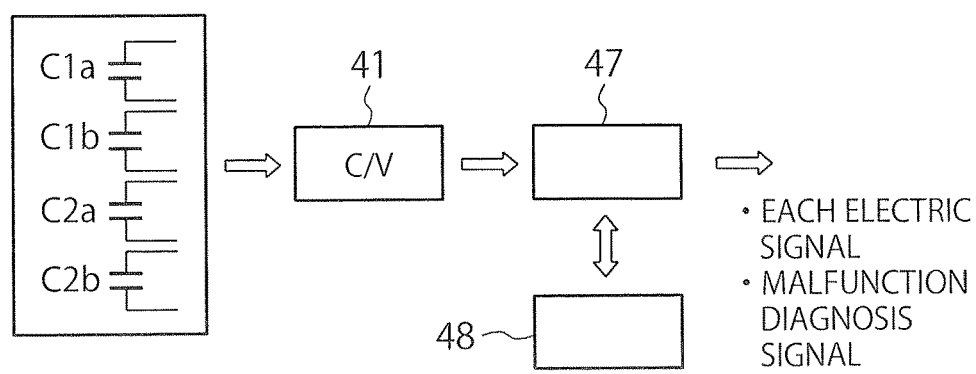
FIG. 19 is a block diagram of a detection circuit adopted in the torque sensor according to the present embodiment.

In order to embody the above determination principle, the torque sensor according to the present embodiment includes a detection circuit illustrated in FIG. 19. FIG. 19 is a block diagram of the detection circuit adopted in the torque sensor according to the present embodiment. This detection circuit includes a C/V converter 41 which converts information on capacitance values of the four capacitive elements provided from the mechanism including the annular deformation body 30 and the capacitive elements C1a and C2a, C1b and C2b into the respective corresponding voltage values, a microcomputer 47 which performs each difference processing of the four voltage values provided from the C/V converter 41 corresponding to [Expression 1], and calculates the torque acting on the torque sensor by calculating the first electric signal T1 and the second electric signal T2 described above, and a storage unit 48 which is connected to the microcomputer 47 and stores the ratio in the initial state between the first electric signal T1a and the second electric signal T2a. The microcomputer 47 has a function of comparing the initial state ratio stored in the storage unit 48 and a current ratio between the first electric signal T1b and the second electric signal T2b and determining whether a comparison result thereof falls within a predetermined range.

When the ratio falls within the predetermined range as a result of the comparison, the microcomputer 47 determines that the torque sensor functions normally and outputs a value of the measured torque. In the present embodiment, the torque is measured using the first electric signals T1a and T1b provided based on the capacitive elements C1a and C2a provided on the high elastic portion 30 side. This is because it is considered that the influence of metal fatigue is small and it is possible to measure the torque with higher accuracy since the metal elastic fatigue is less likely to occur in the high elastic portion 30a than in the low elastic portion 30b as described above. On the other hand, when the ratio does not fall within the predetermined range, the microcomputer 47 determines that the torque sensor does not function normally (malfunctions) and outputs a malfunction diagnosis signal. It is a matter of course that the torque measurement may be performed based on the variation amount of the capacitance values of the capacitive elements C1b and C2b arranged to the low elastic portion 30b. These capacitive elements C1b and C2b greatly change (have the high sensitivities) with respect to the torque compared with the capacitive elements C1a and C2a, and thus, it is possible to perform the torque measurement with an excellent S/N.

Incidentally, the fixed electrodes E21a, E22a, E21b and E22b are fixed to the right side supporting body 20 in the present embodiment, but the fixed electrodes may be fixed to the left side supporting body 10. For example, the fixed electrode E21 is configured of the conductive plate projecting to the left from the left side face of the right side supporting body 20 in the example illustrated in FIG. 12, but the fixed electrode E21 may be configured of a conductive plate projecting to the right from the right side face of the left side supporting body 10. In other words, the fixed electrode E21 may be provided at a fixed position opposing the displacement electrode E31 so as to be maintained regardless of the deformation of the annular deformation body 30.

In addition, the displacement electrodes E31a, E32a, E31b and E32b are fixed to the inner peripheral face of the annular deformation body 30 in the embodiment illustrated herein, but the displacement electrodes may be fixed to the outer peripheral face of the annular deformation body 30. As apparent from FIG. 16, not only the inner peripheral face of the annular deformation body 30 causes displacement when the annular deformation body 30 is deformed into the ellipse, but also the outer peripheral face causes displacement in the same manner. Accordingly, the displacement electrode may be formed on the outer peripheral face of the annular deformation body 30. In this case, the fixed electrode opposing the displacement electrode may be arranged on a further outer side of the displacement electrode. In this case, however, it is possible to arrange the respective electrodes with high symmetry if the high elastic portion 30a and the low elastic portion 30b are smoothly connected to each other so as not to generate a step on the outer peripheral face thereof. In this case, when the low elastic portion 30b is configured to have the thickness in the radial direction of the annular deformation body 30 smaller than the thickness of the high elastic portion 30a in the radial direction, a step is generated at a connection portion between the high elastic portion 30a and the low elastic portion 30b on the inner peripheral face of the annular deformation body 30. Further, the overall size of the sensor increases when adopting a structure in which each electrode is arranged on the outer side of the annular deformation body 30, and thus, it is preferable to provide the displacement electrode on the inner peripheral face of the annular deformation body 30 as in the above-described embodiment, in practical use. However, the size is the same even if the displacement electrode is arranged at the outer side in modified examples illustrated in FIGS. 38 and 39 to be described later.

According to the torque sensor of the present embodiment described above, the ratio between the first electric signal T1 and the second electric signal T2 changes as the low elastic portion 30b undergoes the metal fatigue earlier than the high elastic portion 30a. When the metal fatigue occurring in the annular deformation body 30 is detected before the annular deformation body 30 breaks focusing on this fact, it is possible to provide the torque sensor capable of diagnosing the malfunction of the annular deformation body 30.

<<<§ 5. Example of One Electrode Type Torque Sensor According to Present Invention>>>

In § 4, the torque sensor in which the two capacitive elements are arranged to each of the high elastic portion 30a and the low elastic portion 30b has been described as the two electrode type torque sensor. Since this torque sensor can perform the difference detection using the respective two capacitive elements, it is possible to perform the torque measurement with high accuracy while excluding influence of a change in temperature. However, when the temperature is constant or when temperature compensation is performed, it is possible to perform torque detection and malfunction diagnosis using a single torque sensor even if only one capacitive element is arranged to each of the high elastic portion 30a and the low elastic portion 30b. Herein, the torque sensor in which one capacitive element is arranged to each of the high elastic portion 30a and the low elastic portion 30b is referred to as a one electrode type torque sensor.

Figure 20:
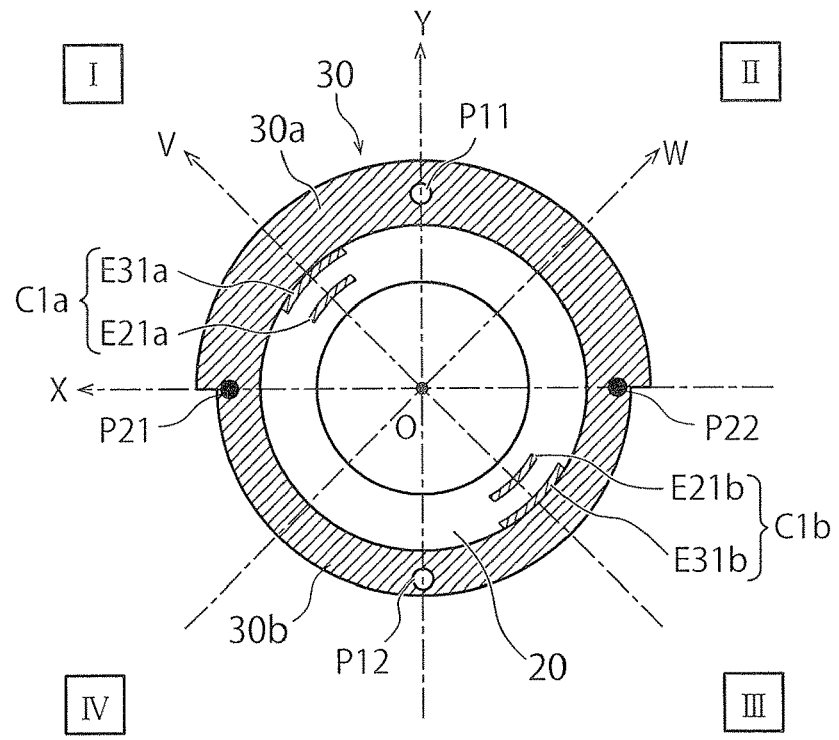
FIG. 20 is an XY-sectional view illustrating a basic structural part of a one electrode type torque sensor according to the present invention.

FIG. 20 is an XY-sectional view illustrating a basic structural part of the one electrode type torque sensor according to the present invention. In FIG. 20, the X, Y, V and W axes are also drawn in an overlapping manner for convenience of description. As illustrated in the drawing, the annular deformation body 30 of the torque sensor according to the present embodiment has the same structure as the annular deformation body 30 of the two electrode type torque sensor described in § 4. In addition, the displacement electrode E31a is arranged in the intersection region between the positive region of the V axis and the inner peripheral face of the high elastic portion 30a of the annular deformation body 30, and the displacement electrode E31b is arranged in the intersection region between the negative region of the V axis and the inner peripheral face of the low elastic portion 30b of the annular deformation body 30.

Further, the fixed electrodes E21a and E21b are arranged at positions opposite to the displacement electrodes E31a and E31b, respectively, and are fixed to the right side supporting body 20. With such a configuration, the capacitive element C1a is configured of the displacement electrode E31a and the fixed electrode E21a, and the capacitive element C1b is configured of the displacement electrode E31b and the fixed electrode E21b. Eventually, the torque sensor according to the present embodiment has a configuration in which the respective electrodes forming the two capacitive elements C2a and C2b arranged on the W axis are removed from the two electrode type torque sensor described in § 4. The other configurations are the same as those of the two electrode type torque sensor described in § 4, and thus, a detailed description thereof will be omitted.

Figure 21:
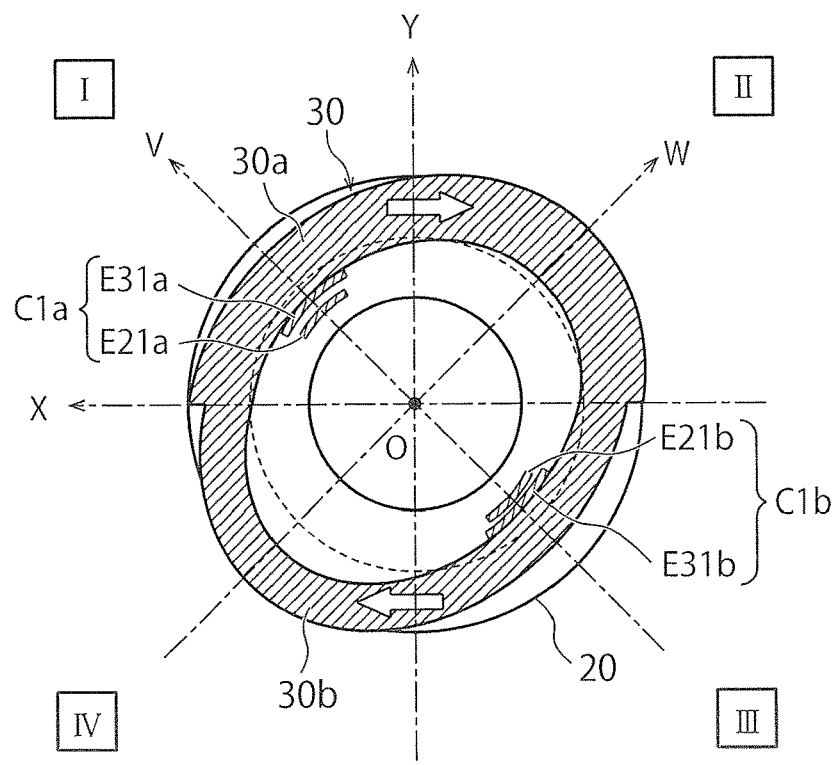
FIG. 21 is a cross-sectional view illustrating a state where a positive torque around the Z axis acts on the basic structural part in FIG. 20 (the broken line indicates a state before deformation).

FIG. 21 is an XY cross-sectional view illustrating a state where a positive torque around the Z axis acts on a basic structural part in FIG. 20 (the broken line indicates a state before deformation). As illustrated in FIG. 21, when the positive torque around the Z axis (clockwise in FIG. 21) acts on the basic structural part of the torque sensor according to the present embodiment, the annular deformation body 30 is deformed into an elliptical shape, the V axis becomes a short-axis direction of the ellipse, and the W axis becomes a long-axis direction of the ellipse as described above. However, a spring constant of the high elastic portion 30a is larger than a spring constant of the low elastic portion 30b in the annular deformation body 30. Thus, a degree of deformation of the low elastic portion 30b is larger than a degree of deformation of the high elastic portion 30a as described in § 4. As a result, both inter-electrode intervals between the pair of electrodes E21a and E31a and between the pair of electrodes E21b and E31b arranged on the V axis are narrowed, but a narrowing degree thereof is larger in the inter-electrode interval between the pair of electrodes E21b and E31b arranged on the negative V axis.

It is a matter of course that a rotational force in a counterclockwise direction acts with respect to (the connection points P11 and P12 of) the annular deformation body 30 when a torque acts in the opposite direction, that is, when a negative torque around the Z axis acts so that the annular deformation body 30 deforms into an ellipse with the V axis as the long-axis direction and the W axis as the short-axis direction, which is opposite to the example illustrated in FIG. 21. Accordingly, a displacement direction of a portion positioned on the V axis of the annular deformation body 30 is opposite to the direction of the example illustrated in FIG. 21.

Thus, it is possible to detect a direction and a magnitude of the acting torque based on the first electric signal T1 which corresponds to a capacitance value of the capacitive element C1a configured of the pair of electrodes E21a and E31a as shown in the following [Expression 2]. Further, it is possible to detect the direction and the magnitude of the acting torque based on the second electric signal T2 which corresponds to a capacitance value of the capacitive element C1b configured of the pair of electrodes E21b and E31b. Incidentally, C1a and C1b indicate the capacitance values of the capacitive elements C1a and C1b, respectively, in the following [Expression 2].

$$T1 = C1a$$

$$T2 = C1b \quad \text{[Expression 2]}$$

Even in the present embodiment, malfunction diagnosis of the torque sensor is performed by utilizing a fact that a ratio between T1 and T2 changes along with accumulation of metal fatigue in the annular deformation body 30. Thus, it is assumed that first and second electric signals in an initial state where the metal fatigue does not occur in the annular deformation body 30 are denoted by T1a and T2a, and first and second electric signals in a state where the metal fatigue occurs (is accumulated) in the annular deformation body 30 are denoted by T1b and T2b to distinguish from each other in the following description, which is similar to § 4. In the present embodiment, a relationship between the magnitude of the torque acting on the torque sensor and the first and second electric signals T1a and T2a in the initial state is the same as that of the graph illustrated in FIG. 17. In addition, a relationship between the magnitude of the torque acting on the torque sensor and the first and second electric signals T1b and T2b in a state where metal fatigue occurs in the annular deformation body 30 is the same as that of the graph illustrated in FIG. 18.

A principle and a method for determination on whether the torque sensor according to the present embodiment described above functions normally are the same as those in § 4. That is, it is possible to understand the principle and the method of the malfunction determination of the torque sensor according to the present embodiment by replacing [Expression 2] with the first electric signal T1 (T1a, T1b) and the second electric signal T2 (T2a, T2b) in § 4. Thus, a detailed description of the principle and method will be omitted herein. However, it is unnecessary for the microcomputer 47 of the detection circuit to perform the difference detection in the present embodiment. Thus, the microcomputer 47 may output two voltage values provided from the C/V converter 41 directly as the first electric signal T1 and the second electric signal T2.

According to the torque sensor of the present embodiment described above, the ratio between the first electric signal T1 and the second electric signal T2 changes as the low elastic portion 30b undergoes the metal fatigue earlier than the high elastic portion 30a When the metal fatigue occurring in the annular deformation body 30 is detected before the annular deformation body 30 breaks focusing on this fact, it is possible to provide the torque sensor capable of diagnosing the malfunction of the annular deformation body 30.

Incidentally, each of the capacitive elements C1a and C1b is arranged on each of the positive V axis and the negative V axis, and no capacitive element is arranged on the W axis in the above description. However, it is possible to provide the same function even in a mode in which the two capacitive elements are arranged on the positive W axis and the negative W axis, respectively, and no capacitive element is arranged on the V axis.

<<<§ 6. Example of Four Electrode Type Torque Sensor According to Present Invention>>>

Figure 22:
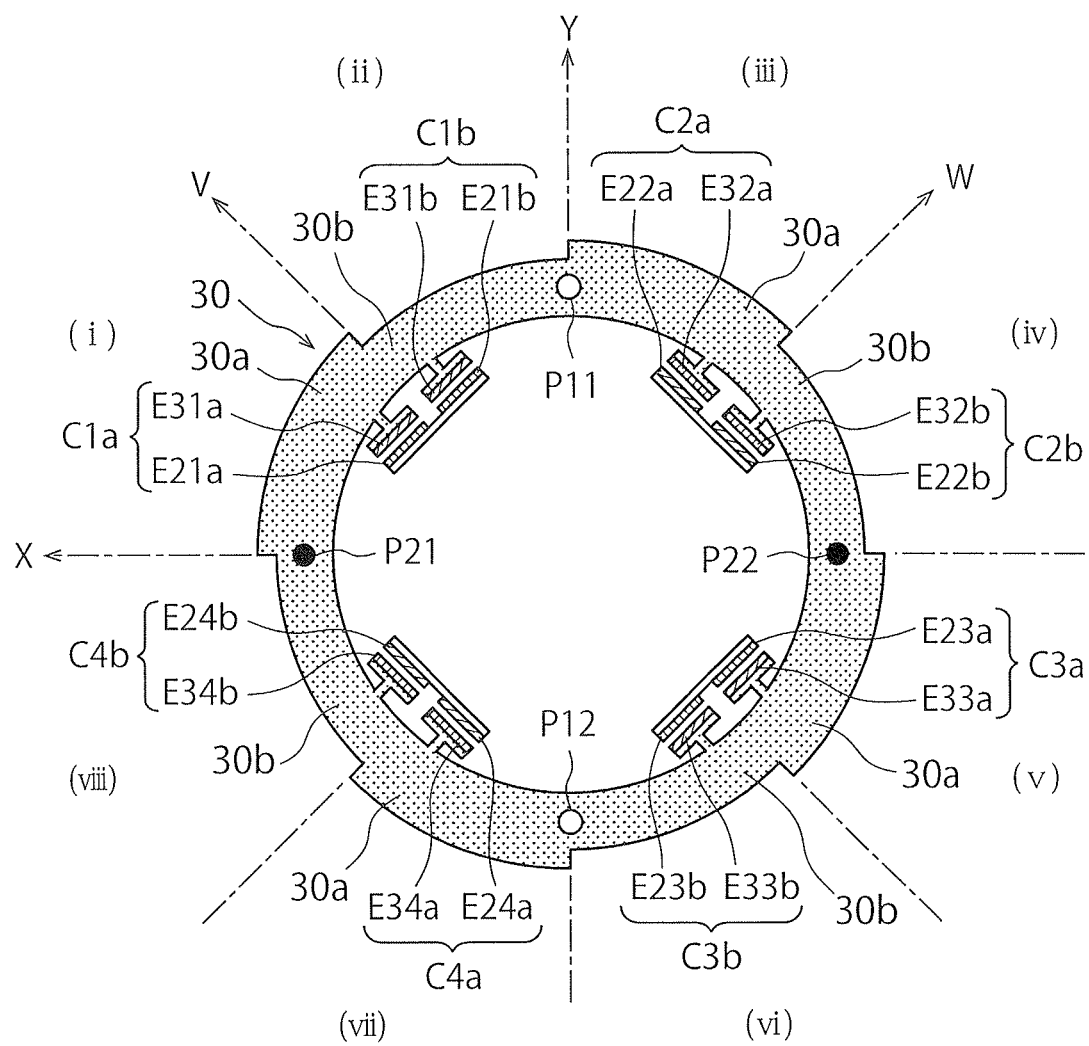
FIG. 22 is an XY-sectional view illustrating a basic structural part of a four electrode type torque sensor according to the present invention.

Next, a four electrode type torque sensor according to the present invention will be described with reference to FIG. 22. FIG. 22 is an XY-sectional view illustrating a basic structural part of the four electrode type torque sensor according to the present invention. In FIG. 22, the X, Y, V and W axes are also drawn in an overlapping manner for convenience of description. The basic structural part according to the present embodiment is configured such that four high elastic portions 30a and four low elastic portions 30b are alternately arranged in a circumferential direction, which is different from the basic structural parts of the two electrode type and one electrode type torque sensors. Specifically, when the V axis and the W axis passing through an origin O and forming 45° with respect to the X axis and the Y axis are defined on the XY plane as illustrated in the drawing, the high elastic portions 30a are arranged in a region (i) partitioned by a positive X axis and a positive V axis, a region (iii) partitioned by a positive Y axis and a positive W axis, a region (v) partitioned by a negative X axis and a negative V axis, and a region (vii) partitioned by a negative Y axis and a negative W axis, respectively, as viewed from the Z axis direction. On the other hand, the low elastic portions 30b are arranged in remaining regions, that is, a region (ii) partitioned by the positive V axis and the positive Y axis, a region (iv) defined by the positive W axis and the negative X axis, a region (vi) partitioned by the negative V axis and the negative Y axis, and a region (viii) partitioned by the negative W axis and the positive X axis, respectively. The four electrode type torque sensor means a torque sensor in which four capacitive elements are arranged to each of the high elastic portion 30a and low elastic portion 30b in this manner.

As illustrated in the drawing, each of the high elastic portions 30a and each of the low elastic portions 30b are connected to each other so as not to generate a step on the inner peripheral face of the annular deformation body 30. Further, eight displacement electrodes E31a to E34b are arranged on the inner peripheral face. The displacement electrode E31a is arranged on an inner peripheral face of the high elastic portion 30a arranged in the region (i) in the vicinity of the positive V axis, and the displacement electrode E31b is arranged on an inner peripheral face of the low elastic portion 30b arranged in the region (ii) in the vicinity of the positive V axis. The displacement electrode E32a is arranged on an inner peripheral face of the high elastic portion 30a arranged in the region (iii) in the vicinity of the positive W axis, and the displacement electrode E32b is arranged on an inner peripheral face of the low elastic portion 30b arranged in the region (iv) in the vicinity of the positive W axis. The displacement electrode E33a is arranged on an inner peripheral face of the high elastic portion 30a arranged in the region (v) in the vicinity of the negative V axis, and the displacement electrode E33b is arranged on an inner peripheral face of the low elastic portion 30b arranged in the region (vi) in the vicinity of the negative W axis. The displacement electrode E34a is arranged on an inner peripheral face of the high elastic portion 30a arranged in the region (vii) in the vicinity of the negative W axis, and the displacement electrode E34b is arranged on an inner peripheral face of the low elastic portion 30b arranged in the region (viii) in the vicinity of the negative W axis.

On the other hand, fixed electrodes E21a to E24b are arranged at positions opposing these displacement electrodes E31a to E34b, respectively, as illustrated in the drawing, and are fixed to a right side supporting body (not illustrated). Further, eight capacitive elements C1a to C4b are configured of eight sets of these electrodes opposing each other.

In the present embodiment, the capacitive element C1a configured of the fixed electrode E21a and the displacement electrode E31a and the capacitive element C1b configured of the fixed electrode E21b and the displacement electrode E31b are arranged to be symmetric with respect to the V axis as viewed from the Z axis direction. In addition, the capacitive element C2a configured of the fixed electrode E22a and the displacement electrode E32a and the capacitive element C2b configured of the fixed electrode E22b and the displacement electrode E32b are arranged to be symmetric with respect to the W axis as viewed from the Z axis direction. The capacitive element C3a configured of the fixed electrode E23a and the displacement electrode E33a and the capacitive element C3b configured of the fixed electrode E23b and the displacement electrode E33b are arranged to be symmetric with respect to the V axis as viewed from the Z axis direction. The capacitive element C4a configured of the fixed electrode E24a and the displacement electrode E34a and the capacitive element C4b configured of the fixed electrode E24b and the displacement electrode E34b are arranged to be symmetric with respect to the W axis as viewed from the Z axis direction. The other configurations are the same as those of the above-described two electrode type and one electrode type torque sensors, and thus, a detailed description thereof will be omitted.

Figure 23:
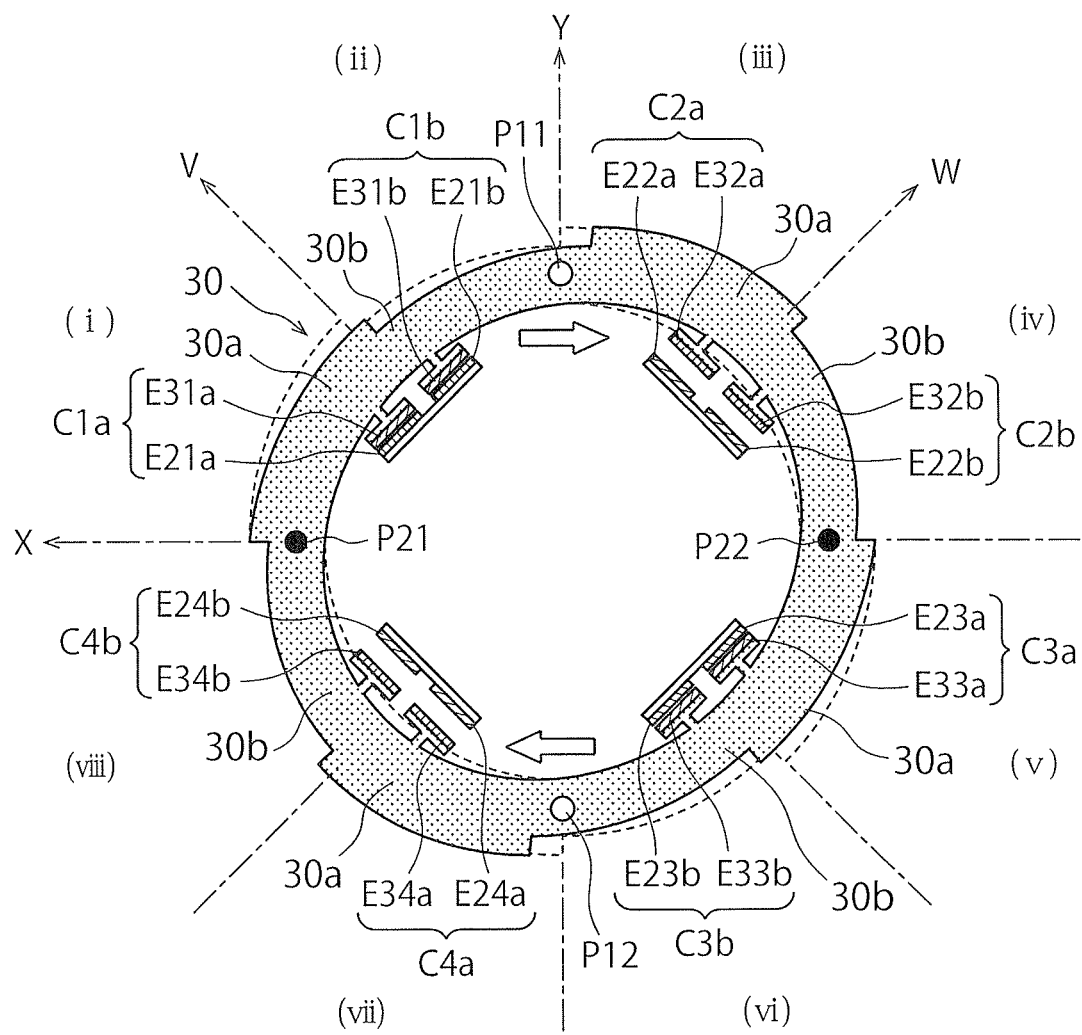
FIG. 23 is a cross-sectional view illustrating a state where a positive torque around the Z axis acts on the basic structural part in FIG. 22 (the broken line indicates a state before deformation).

FIG. 23 is an XY cross-sectional view illustrating a state where the positive torque around the Z axis acts on the basic structural part illustrated in FIG. 22. As described above, when such a torque acts, the annular deformation body 30 deforms into substantially an elliptical shape, the V axis becomes the short-axis direction of the ellipse, and the W axis becomes the long-axis direction of the ellipse. However, the annular deformation body 30 according to the present embodiment is configured by alternately arranging the high elastic portion 30a that is less likely to deform and the low elastic portion 30b that is more likely to deform. Thus, the degree of displacement of the annular deformation body 30 differs between the high elastic portion 30a and the low elastic portion 30b as illustrated in the drawing. Specifically, both the high elastic portion 30a in the region (i) and the low elastic portion 30b in the region (ii) are displaced in the positive V axis direction, but the low elastic portion 30b in the region (ii) is more greatly displaced. Similarly, both the high elastic portion 30a in the region (iii) and the low elastic portion 30b in the region (iv) are displaced in the negative W axis direction, but the low elastic portion 30b in the region (iv) is more greatly displaced. In addition, both the high elastic portion 30a in the region (v) and the low elastic portion 30b in the region (vi) are displaced in the negative V axis direction, but the low elastic portion 30b in the region (vi) is more greatly displaced. Both the high elastic portion 30a in the region (vii) and the low elastic portion 30b in the region (viii) are displaced in the positive W axis direction, but the low elastic portion 30b in the region (viii) is more greatly displaced.

When a torque acts in the opposite direction, that is, when a negative torque around the Z axis acts, a rotational force in a counterclockwise direction acts with respect to (the connection points P11 and P12 of) the annular deformation body 30 so that the annular deformation body 30 deforms into an ellipse with the V axis as the long-axis direction and the W axis as the short-axis direction, which is opposite to the example illustrated in FIG. 23. Accordingly, each displacement of the displacement electrodes E31a to E34b positioned in the vicinity of the V axis and the W axis of the annular deformation body 30 occurs in a direction opposite to that in the example illustrated in FIG. 23.

According to the torque sensor of the present embodiment, it is possible to detect a direction and a magnitude of the acting torque using the first electric signal T1 based on the respective capacitance values of the capacitive elements C1a, C2a, C3a and C4a each of which is configured of the pair of electrodes as shown in the following [Expression 3]. Further, it is also possible to detect the direction and the magnitude of the acting torque using the second electric signal T2 based on the respective capacitance values of the capacitive elements C1b, C2b, C3b and C4b each of which is configured of the pair of electrodes. Incidentally, C1a to C4b indicate the capacitance values of the capacitive elements C1a to C4b, respectively, in the following [Expression 3].

$$T1=(C1a+C3a)-(C2a+C4a)$$

$$T2=(C1b+C3b)-(C2b+C4b) \quad \text{[Expression 3]}$$

Even in the present embodiment, malfunction diagnosis of the torque sensor is performed by utilizing a fact that T1 and T2 change along with accumulation of metal fatigue in the annular deformation body 30. Thus, it is assumed that first and second electric signals in an initial state where the metal fatigue does not occur in the annular deformation body 30 are denoted by T1a and T2a, and first and second electric signals in a state where the metal fatigue occurs (is accumulated) in the annular deformation body 30 are denoted by T1b and T2b to distinguish from each other in the following description, which is similar to § 4. In the present embodiment, a relationship between the magnitude of the torque acting on the torque sensor and the first and second electric signals T1a and T2a in the initial state is the same as that of the graph illustrated in FIG. 17. In addition, a relationship between the magnitude of the torque acting on the torque sensor and the first and second electric signals T1b and T2b in a state where metal fatigue occurs in the annular deformation body 30 is the same as that of the graph illustrated in FIG. 18.

A principle and a method for determination on whether the torque sensor according to the present embodiment described above functions normally are the same as those in § 4. That is, it is possible to understand the principle and the method of the malfunction determination of the torque sensor according to the present embodiment by replacing [Expression 3] with the first electric signal T1 (T1a, T1b) and the second electric signal T2 (T2a, T2b) in § 4. Thus, a detailed description of the principle and method will be omitted herein.

However, highly accurate difference detection is performed using the four capacitive elements provided on each of the high resilience portion 30a side and the low resilience portion 30b side in the present embodiment. Thus, the microcomputer 47 of the detection circuit outputs the first electric signal T1 corresponding to a "difference between a sum of the capacitance values of the two capacitive elements C1a and C3a and a sum of the capacitance values of the two capacitive elements C2a and C4a", and a second electric signal T2 corresponding to a "difference between a sum of the capacitance values of the two capacitive elements C1b and C3b and a sum of the capacitance values of the two capacitive elements C2b and C4b" as an electric signal indicating the acting torque.

According to the torque sensor of the present embodiment described above, the ratio between the first electric signal T1 and the second electric signal T2 changes as the low elastic portion 30b undergoes the metal fatigue earlier than the high elastic portion 30a. When the metal fatigue occurring in the annular deformation body 30 is detected before the annular deformation body 30 breaks focusing on this fact, it is possible to provide the torque sensor capable of diagnosing the malfunction of the annular deformation body 30.

Incidentally, the displacement electrodes E31a to E34b are arranged on the inner peripheral face of the annular deformation body 30 in the present embodiment. However, it is also possible to arrange the displacement electrodes E31a to E34b on the outer peripheral face of the annular deformation body 30 as a modified example. In this case, the fixed electrode opposing the displacement electrode may be arranged on a further outer side of the displacement electrode. In this case, however, it is possible to arrange the respective electrodes with high symmetry if the high elastic portion 30a and the low elastic portion 30b are smoothly connected to each other so as not to generate a step on the outer peripheral face thereof. In this case, when the low elastic portion 30b is configured to have the thickness in the radial direction of the annular deformation body 30 smaller than the thickness of the high elastic portion 30a in the radial direction, a step is generated at a connection portion between the high elastic portion 30a and the low elastic portion 30b on the inner peripheral face of the annular deformation body 30. Further, the overall size of the sensor increases when adopting a structure in which each electrode is arranged on the outer side of the annular deformation body 30, and thus, it is preferable to provide the displacement electrode on the inner peripheral face of the annular deformation body 30 as in the above-described embodiment, in practical use. Even in the present embodiment, however, the size is the same even if the displacement electrode is arranged at the outer side in the modified examples illustrated in FIGS. 38 and 39 to be described later.

In addition, it is possible to accurately measure a torque Tz around the Z axis without being affected by a force Fx in the X axis direction, a force Fy in the Y axis direction, a force Fz in the Z axis direction, a torque Tx around the X axis, and a torque Ty around the Y axis, other than the torque around the Z axis, in the four electrode type torque sensor described in § 6. Details thereof are described in JP 2012-37300 A filed by the present applicant.

<<<§ 7. Basic Structural Part of Torque Sensor Adopting Wave Type Detection Portion Proposed by Present Applicant>>>

<7-1. Overall Configuration of Basic Structural Part>

Figure 24:
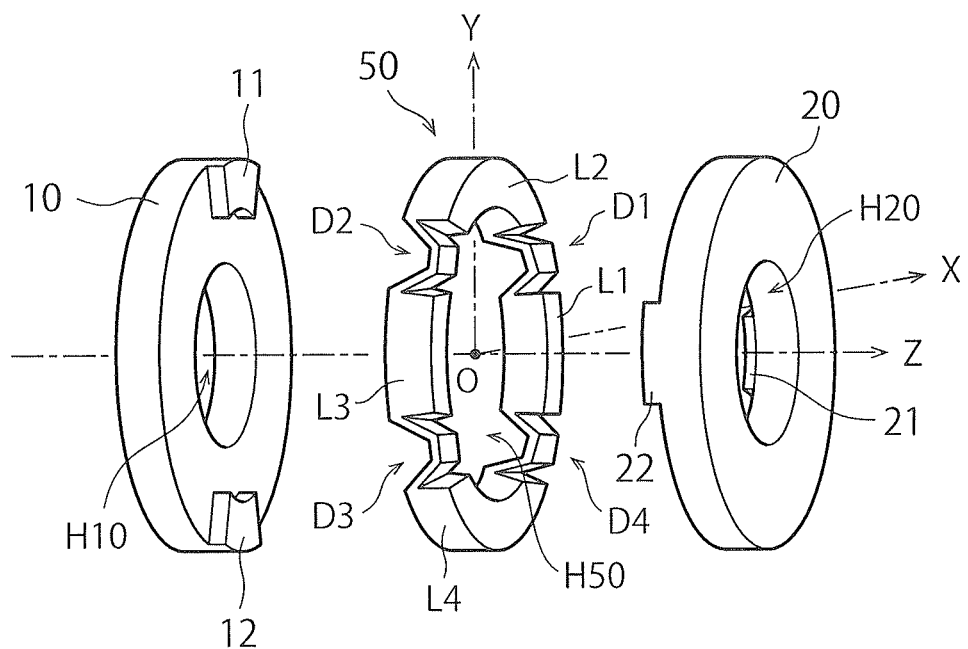
FIG. 24 is an exploded perspective view of a basic structural part of a conventional torque sensor adopting a wave type detection portion.

Next, a description will be given regarding a new torque sensor obtained by providing the malfunction determination function according to the present invention to a torque sensor proposed in International Patent Application No. PCT/JP2015/052783 filed by the present applicant. Prior to this description, first, a basic structural part of the torque sensor proposed in the international patent application will be described with reference to FIGS. 24 to 32. FIG. 24 is an exploded perspective view of the basic structural part of the conventional torque sensor adopting a wave type detection portion. As illustrated, this basic structural part is configured by arranging an annular deformation body 50 between the left side supporting body 10 and the right side supporting body 20 and joining these three constituent elements to each other. Here, the following description will be given also defining an XYZ three-dimensional coordinate system, as illustrated, for the sake of convenience. A Z axis drawn in the horizontal direction in the drawing corresponds to a rotation axis of a torque, which is an object to be detected, and this torque sensor serves a function to detect a torque around this rotation axis (around the Z axis).

A difference between the basic structural part of the torque sensor illustrated in FIG. 1 and the basic structural part of the torque sensor adopting the wave type detection portion illustrated in FIG. 24 is that the annular deformation body 30 of the former is replaced with the annular deformation body 50 in the latter. The annular deformation body 30 illustrated in FIG. 1 is the annular member obtained by forming the through opening H30 having the concentric disc shape with the smaller diameter at the central portion of the disc arranged with the Z axis (rotation axis) as the central axis. On the other hand, the annular deformation body 50 illustrated in FIG. 24 is a member obtained by performing partial material removal processing to the circular annular deformation body 30, and a rotation axis (Z axis) passes through a through opening H50 formed inside the circular annular deformation body 50. Accordingly, the annular deformation body 50 is basically an annular member in which the through opening H50 having a concentric disk shape is formed, and first to fourth detection portions D1 to D4 as illustrated in the drawing are formed by portions that have been subjected to the material removal processing.

Incidentally, the term "material removal processing" is used to describe a shape of the annular deformation body 50, herein. However, it is not always necessary to perform cutting or the like on the annular member at the time of actually fabricating the annular deformation body 50. For example, it is also possible to manufacture the annular deformation body 50 by casting using a cast in the case of configuring the annular deformation body 50 using metal, and to manufacture the annular deformation body 50 by injection molding using a predetermined mold or pressing in the case of configuring the annular deformation body 50 using resin such as plastic.

Here, portions of the annular deformation body 50 other than the first to fourth detection portions D1 to D4 will be referred to as connection portions L1 to L4. As illustrated in the drawing, the annular deformation body 50 has a structure in which four sets of the detection portions D1 to D4 and four sets of the connection portions L1 to L4 are alternately arranged. The four sets of connection portions L1 to L4 are configured of arc-shaped portions of the annular member, and the four sets of detection portions D1 to D4 have a structure in which elastic deformation occurs by action of the torque as will be described later. In the example illustrated in the drawing, the portions of the first to fourth detection portions D1 to D4 of the annular deformation body 50 are configured of a place-shaped piece having a thin thickness, and is elastically deformable by action of the torque to be detected as the plate-shaped piece function as a leaf spring.

Incidentally, the left side supporting body 10 and the right side supporting body 20 illustrated in FIG. 24 are exactly the same constituent elements as the left side supporting body 10 and the right side supporting body 20 illustrated in FIG. 1, and are annular members obtained by forming the through openings H10 and H20 each of which has a concentric disk shape with a smaller diameter at the central portion of the disc arranged with the Z axis (rotation axis) as the central axis. Eventually, the left supporting body 10 and the right supporting body 20 are the annular structural bodies having the through openings H10 and H20 at the center portions thereof even in this basic structural part illustrated in FIG. 24, and an insertion hole penetrating the through openings H10, H50 and H20 of the left side supporting body 10, the annular deformation body 50, and the right side supporting body 20 is secured along the Z axis (rotation axis). Incidentally, to form the through openings H10 and H20 for the respective supporting bodies 10 and 20 is not an indispensable condition for implementation of the present invention, and thus, the through openings H10 and H20 are not necessarily provided.

Even in the basic structural part illustrated in FIG. 24, the left side supporting body 10 is a member that supports a left side face of the annular deformation body 50, and the right side supporting body 20 is a member that supports a right side face of the annular deformation body 50. Herein, an origin O of the XYZ three-dimensional coordinate system is also defined at a center position of the annular deformation body 50, and all of the left side supporting body 10, the annular deformation body 50, and the right side supporting body 20 are arranged to have the Z axis as the central axis thereof.

In addition, two fan-shaped convex portions 11 and 12 (left side connection members) projecting to the right are provided on a right side face of the left side supporting body 10, and top faces of the convex portions 11 and 12 are joined to the left side face of the annular deformation body 50. Similarly, two fan-shaped convex portions 21 and 22 (right side connection members) projecting to the left are provided on a left side face of the right side supporting body 20, and top faces of the convex portions 21 and 22 are joined to the right side face of the annular deformation body 50.

As illustrated in the drawing, the convex portion 11 is joined to an upper portion (the connection portion L2 positioned in a positive Y axis direction) of the annular deformation body 50, and the convex portion 12 is joined to a lower portion (the connection portion L4 positioned in a negative Y axis direction) of the annular deformation body 50. Similarly, the convex portion 21 is joined to a deep portion (the connection portion L1 positioned in a positive X axis direction) of the annular deformation body 50, and the convex portion 22 is joined to a front portion (the connection portion L3 positioned in a negative X axis direction) of the annular deformation body 50. As will be described later, connection positions of these convex portions correspond to positions of connection points Q1 to Q4 of the annular deformation body 50.

Figure 25:
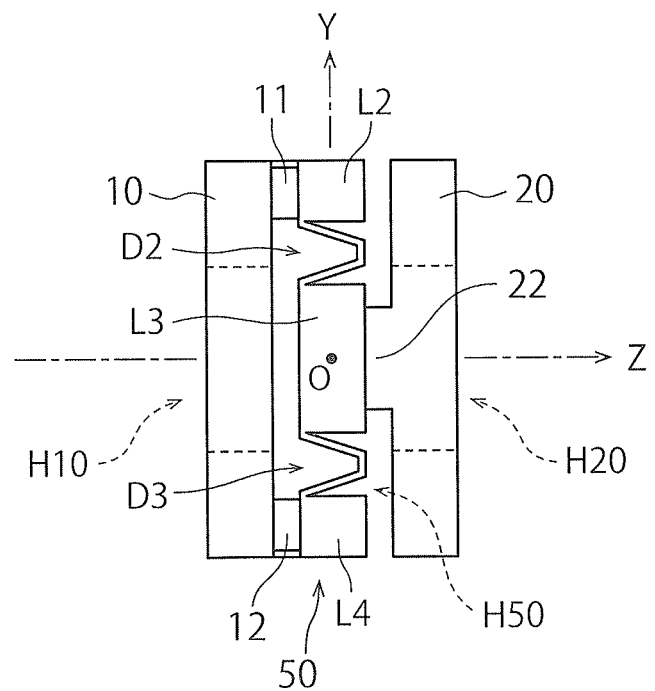
FIG. 25 is a side view of a basic structural part of a torque sensor obtained by joining three constituent elements illustrated in FIG. 24 to each other.

FIG. 25 is a side view of the basic structural part of the torque sensor obtained by joining the three constituent elements illustrated in FIG. 24 to each other (in order to avoid complication of the drawing, only outer peripheral faces of the detection portions D2 and D3 positioned at the front side are illustrated in regard to the detection portion). In the example illustrated herein, the convex portions 11 and 12 are structural bodies integrated with the left side supporting body 10, and the top faces thereof are joined to left side faces of the connection portions L2 and L4 of the annular deformation body 50 as illustrated in FIG. 24. Similarly, the convex portions 21 and 22 are structural bodies integrated with the right side supporting body 20, and the top faces thereof are joined to right side faces of the connection portions L1 and L3 of the annular deformation body 50.

Eventually, the convex portions 11 and 12 function as left side connection members that connects a left side connection point on the left side face of the annular deformation body, 50 opposing the left side supporting body 10, to the left side supporting body 10, and the convex portions 21 and 22 function as right side connection members that connect a right side connection point on the right side face of the annular deformation body 50, opposing the right side supporting body 20, to the right side supporting body 20.

Figure 26:
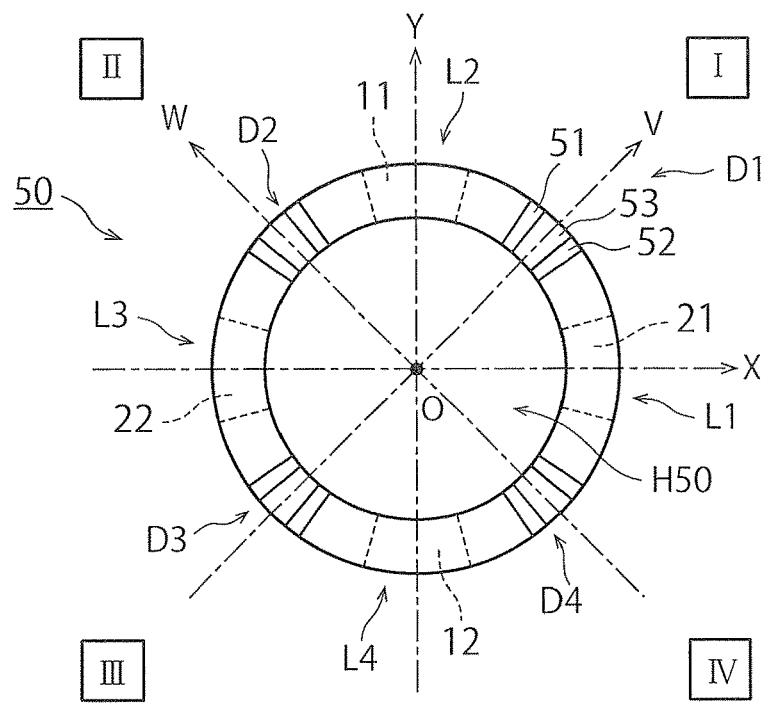
FIG. 26 is a front view of an annular deformation body illustrated in FIG. 24 viewed from a right direction of FIG. 24.

FIG. 26 is a front view of the annular deformation body 50 illustrated in FIG. 24 viewed from the right direction of FIG. 24. Even in this drawing, the V axis and the W axis, which pass through the origin O and form 45° with respect to the X axis and the Y axis, respectively, are defined on the XY plane for convenience of description. The V axis is a coordinate axis obtained by rotating the X axis counterclockwise by 45° using the origin O as a center thereof on the XY plane, and the W axis is a coordinate axis obtained by rotating the Y axis counterclockwise by 45° using the origin O as a center thereof on the XY plane. As illustrated in the drawing, the first detection portion D1, the second detection portion D2, the third detection portion D3, and the fourth detection portion D4 are arranged on the positive V axis (first quadrant I), the positive W axis (second quadrant II), the negative V axis (third quadrant III), and the negative W axis (fourth quadrant IV), respectively.

Herein, each of the detection portions D1 to D4 is configured of three components including a first deformation portion 51, a second deformation portion 52, and a displacement portion 53. In the drawing, reference numerals are given only to components of the detection portion D1, but the same reference numerals are also applied to the detection portions D2 to D4. A three-dimensional shape of these four sets of detection portions D1 to D4 is the same as illustrated in the exploded perspective view of FIG. 24. The four sets of connection portions L1 to L4 have a function of connecting these four sets of detection portions D1 to D4 to each other, and the connection portions L1 to L4 are interposed among the detection portions D1 to D4, respectively.

In FIG. 26, a joint position between the convex portions 11 and 12 (left side connection members) and a joint position between the convex portions 21 and 22 (right side connection members) are indicated by the broken lines.

Figure 27:
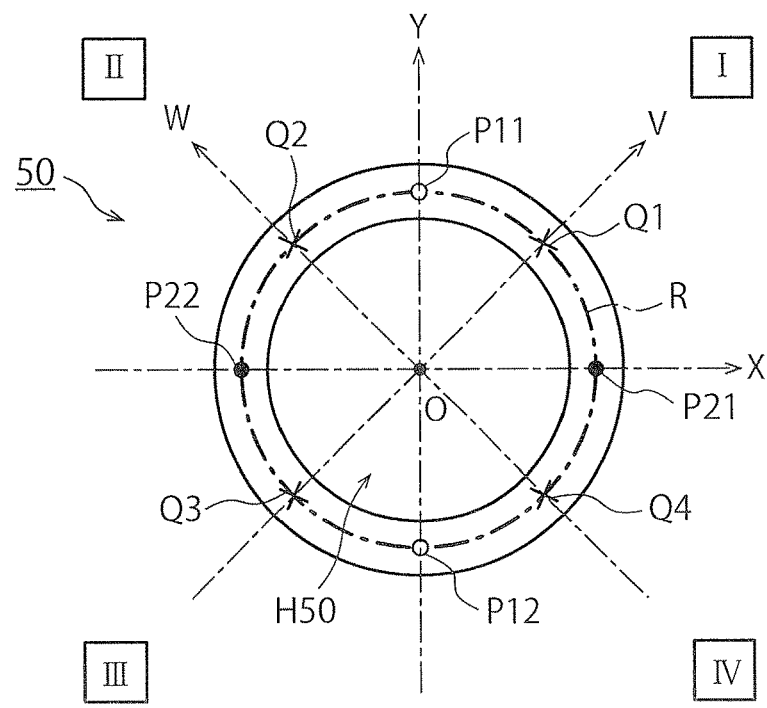
FIG. 27 is a projection view on an XY plane illustrating arrangement of each detection point and each connection point of the annular deformation body illustrated in FIG. 24.

FIG. 27 is a projection view on the XY plane illustrating arrangement of the respective detection points Q1 to Q4 and the respective connection points P11 to P22 of the annular deformation body 50 illustrated in FIG. 24 (a view that is viewed from the right side supporting body 20 side). Only projection images of inner and outer contour circles of the annular deformation body 50 are illustrated. In addition, the thick circle drawn with the one-dot chain line in the drawing is a basic annular route R defined on the XY plane. In the illustrated example, this basic annular route R is a circle on the XY plane that passes through an intermediate position between the inner contour circle and the outer contour circle of the annular deformation body 50, and becomes a center line of an annular thick portion of the annular deformation body 50.

As illustrated in the drawing, the four sets of detection points Q1 to Q4 are defined as points on the basic annular route R. Specifically, the first detection point Q1 is defined at an intersection position between the positive V axis and the basic annular route R, the second detection point Q2 is defined at an intersection position between the positive W axis and the basic annular route R, the third detection point Q3 is defined at an intersection position between the negative V axis and the basic annular route R, and the fourth detection point Q4 is defined at an intersection position between the negative W axis and the basic annular route R. These detection points Q1 to Q4 indicate the arrangement of the detection portions D1 to D4, respectively. That is, when comparing FIG. 26 and FIG. 27, it is understood that the first detection portion D1 is arranged at a position of the first detection point Q1, the second detection portion D2 is arranged at a position of the second detection point Q2, the third detection portion D3 is arranged at a position of the third detection point Q3, and the fourth detection portion D4 is arranged at a position of the fourth detection point Q4.

On the other hand, the points P11 and P12 indicated by the white dots in FIG. 27 are projection images of the left side connection points, and the points P21 and P22 indicated by the black dots in FIG. 27 are projection images of the right side connection points. As described above, the left side connection points P11 and P12 are actually points on the left side face of the annular deformation body 50 and indicate the connection positions of the convex portions 11 and 12 (the left side connection members), and the right side connection points P21 and P22 are actually points on the right side face of the annular deformation body 50 and indicate the connection positions of the convex portions 21 and 22 (right side connection members). In the example illustrated in the drawing, these projection images of the respective connection points P11 to P22 are also positioned on the basic annular route R. That is, the projection images of the left side connection points P11 and P12 are defined at intersection positions between the Y axis and the basic annular route R, and the projection images of the right side connection points P21 and P22 are defined at intersection positions between the X axis and the basic annular route R.

Eventually, the left side connection points P11 and P12 (white dots) indicating the connection positions of the left side connection members 11 and 12 and the right side connection points P21 and P22 (black dots) indicating the connection positions of the right side connection members 21 and 22 are alternately arranged along the basic annular route R in the example illustrated in FIG. 27. Such alternate arrangement is important in order to cause effective deformation of the annular deformation body 50 when the torque to be detected acts as will be described later. In addition, the four sets of detection points Q1 to Q4 are arranged among the connection points P11 to P22, respectively. This arrangement is also important in order to cause effective displacement in each of the detection portions D1 to D4 when the torque to be detected acts.

<7-2. Structure and Function of Detection Portion>

Figure 28A:
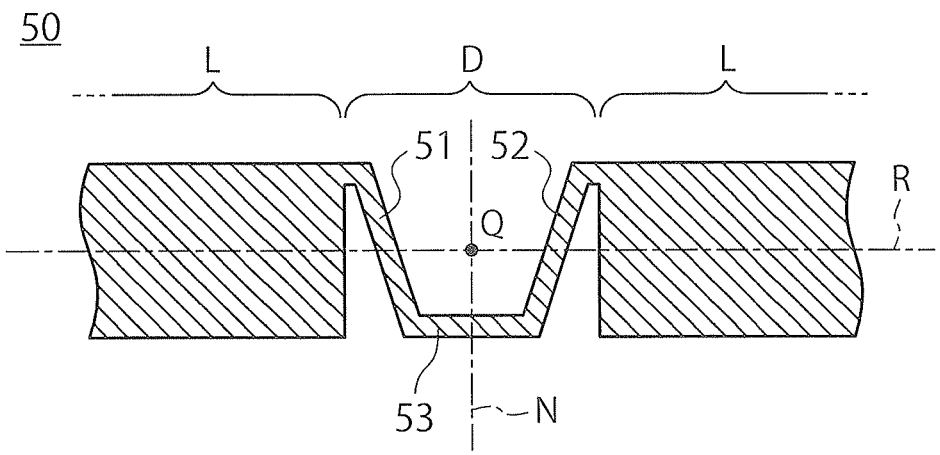
FIG. 28 is a partial cross-sectional view illustrating a detailed structure of the detection portion of the annular deformation body illustrated in FIG. 24.
Figure 28B:
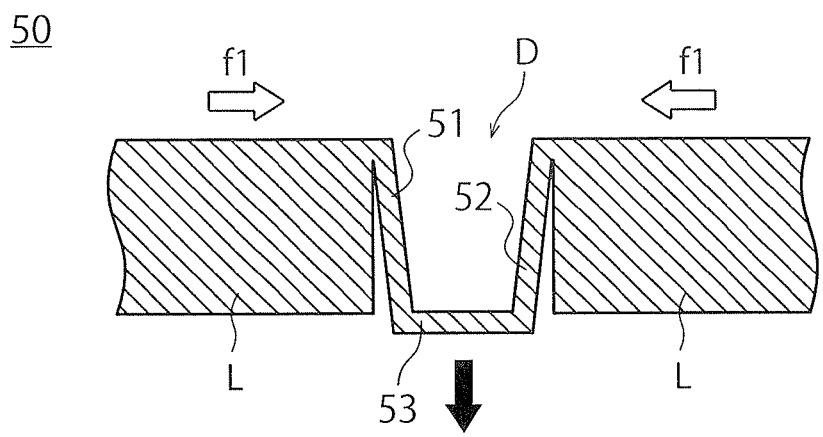
Figure 28C:
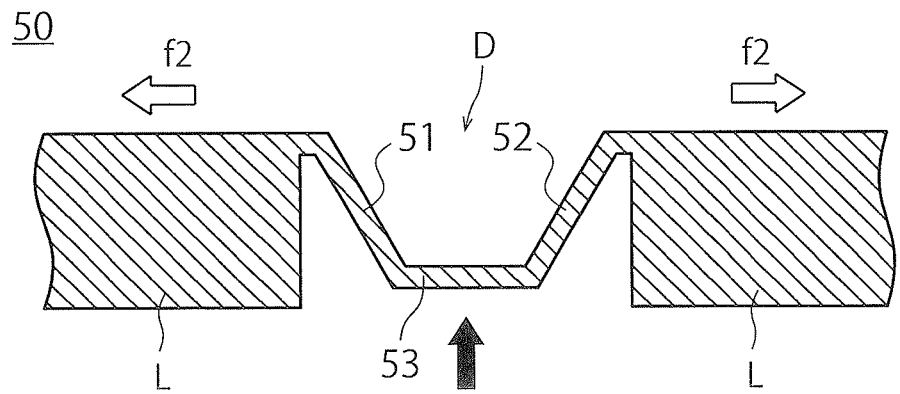

Subsequently, structures and functions of the detection portions D1 to D4 will be described. FIG. 28 is a partial cross-sectional view illustrating the detailed structure of the detection portions D1 to D4 of the annular deformation body 50 illustrated in FIG. 24. All the four sets of detection portions D1 to D4 have the same structure. A detection portion D illustrated in FIG. 28 is a representative of these four sets of detection portions D1 to D4, and illustrates a sectional part obtained when the annular deformation body 50 is cut by a cylindrical plane including the basic annular route R. FIG. 28A illustrates a state where the torque does not act, FIG. 28B illustrates a state where a compressive force f1 is applied to the detection portion D by action of the torque, and FIG. 28C illustrates a state where a stretching force f2 is applied to the detection portion D by action of the torque.

As illustrated in FIG. 28A, connection portions L are positioned on both right and left sides of the detection portion D. The connection portion L corresponds to any of the four sets of connection portions L1 to L4. For example, when the detection portion D illustrated in FIG. 28A is the second detection portion D2 illustrated in FIG. 24, the connection portion L arranged on the right side corresponds to the connection portion L2 illustrated in FIG. 24, and the connection portion L arranged on the left side corresponds to the connection portion L3 illustrated in FIG. 24.

As illustrated in the drawing, the detection portion D includes the first deformation portion 51 elastically deformable by action of the torque to be detected, the second deformation portion 52 elastically deformable by action of the torque to be detected, and the displacement portion 53 which causes displacement by elastic deformation of the first deformation portion 51 and the second deformation portion 52, and is arranged between an end portion of the connection portion L arranged on the left side and an end portion of the connection portion L arranged on the right side.

In the example illustrated herein, the first deformation portion 51 is configured of a first plate-shaped piece having flexibility, the second deformation portion 52 is configured of a second plate-shaped piece having flexibility, and the displacement portion 53 is configured of a third plate-shaped piece. In practice, the annular deformation body 50 is configured of a structural body made of the same material such as metal (stainless steel, aluminum, or the like) and synthetic resin (plastic or the like). Since the first plate-shaped piece 51, the second plate-shaped piece 52, and the displacement portion 53 are the plate-shaped members having a smaller thickness than the connection portion L, and thus, have flexibility.

Incidentally, the displacement portion 53 is also the thin plate-shaped member and thus, has the flexibility in the example illustrated herein. However, the displacement portion 53 is not necessarily a member having flexibility (or may have the flexibility, of course). The role of the displacement portion 53 is to cause the displacement with respect to the opposing right side supporting body 20 when the torque acts, and it is enough if the first deformation portion 51 and the second deformation portion 52 have the flexibility in order to cause such displacement. Accordingly, the displacement portion 53 is not necessarily configured of the thin plate-shaped member, and may be a member having a larger thickness. On the other hand, the connection portion L may have flexibility to some extent, but it is preferable that the connection portion L is not deformed as much as possible in order to cause effective deformation in the first deformation portion 51 and the second deformation portion 52 by the acting torque.

An outer end of the first deformation portion 51 is connected to the adjacent connection portion L, and an inner end of the first deformation portion 51 is connected to the displacement portion 53. In addition, an outer end of the second deformation portion 52 is connected to the adjacent connection portion L, and an inner end of the second deformation portion 52 is connected to the displacement portion 53. In the example illustrated in FIG. 28A, the first deformation portion, the second deformation portion, and the displaced portion are configured of the first plate-shaped piece 51, the second plate-shaped piece 52, and the third plate-shaped piece 53, respectively, the outer end (left end) of the first plate-shaped piece 51 is connected to a right end portion of the connection portion L arranged on the left side, the inner end (right end) of the first plate-shaped piece 51 is connected to a left end of the third plate-shaped piece 53, the outer end (right end) of the second plate-shaped piece 52 is connected to a left end portion of the connection portion L arranged on the right side, and the inner end of the second plate-shaped piece 52 is connected to a right end of the third plate-shaped piece 53.

As described above, the detection portion D is arranged at the position of the detection point Q defined on the basic annular route R. A normal line N illustrated in FIG. 28A is a normal line of the basic plane (XY plane) including the basic annular route R that is set at the position of the detection point Q, and the detection portion D is arranged such that the normal line N is located at the center thereof. In addition, in the cross-sectional view of FIG. 28A, the first plate-shaped piece 51 and the second plate-shaped piece 52 are inclined with respect to the normal line N, and an inclination direction (rightwardly downward) of the first plate-shaped piece 51 and an inclination direction (rightwardly upward) of the second plate-shaped piece 52 are opposite to each other. Particularly, a sectional shape of the detection portion D is line-symmetric with respect to the normal line N, and both upper and lower faces of the third plate-shaped piece 53 form a plane parallel to the XY plane in the example illustrated in the drawing.

In this manner, since the inclination direction of the first plate-shaped piece 51 and the inclination direction of the second plate-shaped piece 52 with respect to the normal line N are opposite to each other regarding the cross section including the basic annular route R, displacement directions of the third plate-shaped piece 53 (displacement portion) are opposite between a case where the compressive force f1 is applied in the direction along the basic annular route R and a case where the stretching force f2 is applied. This is advantageous when performing difference detection using a plurality of capacitive elements as will be described later.

That is, when the compressive force f1 (white arrow in the drawing) is applied to the detection portion D in the direction along the basic annular route R as illustrated in FIG. 28B, stress is applied to the detection portion D in a direction of reducing a lateral width, and thus, postures of the first plate-shaped piece 51 and the second plate-shaped piece 52 change to the state of standing more vertically. As a result, the third plate-shaped piece 53 (displacement portion) is displaced downward as indicated by the black arrow in the drawing. On the other hand, when the stretching force f2 (white arrow in the drawing) is applied to the detection portion D in the direction along the basic annular route R as illustrated in FIG. 28B, stress is applied to the detection portion D in a direction of widening the lateral width, and thus, the postures of the first plate-shaped piece 51 and the second plate-shaped piece 52 change to the state of lying more horizontally. As a result, the third plate-shaped piece 53 (displacement portion) is displaced upward as indicated by the black arrow in the drawing.

The basic principle of the present invention is to detect the direction and the magnitude of the acting torque by utilizing such displacement. That is, the direction of the acting torque can be detected using the displacement direction (upward or downward in FIG. 28) of the displacement portion 53, and the magnitude of the acting torque can be detected using the displacement amount thereof.

<7-3. Configuration of Capacitive Element>

Figure 29:
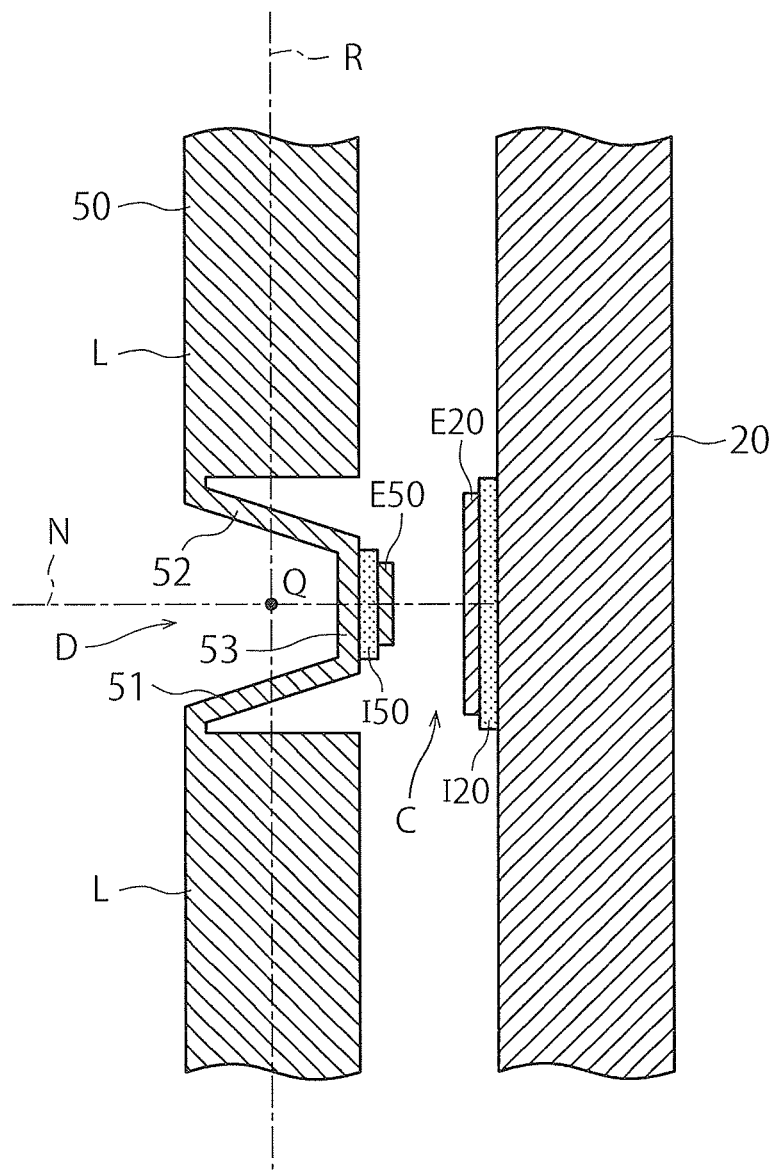
FIG. 29 is a partial cross-sectional view illustrating a detailed structure in which an electrode is provided in a detection portion of the annular deformation body illustrated in FIG. 15 and a predetermined portion of the right side supporting body opposing the detection portion and illustrating each part of the annular deformation body and a right side supporting body illustrated in FIG. 24.

In the present invention, the capacitive element is used to detect the displacement of the displacement portion 53. FIG. 29 is a partial cross-sectional view illustrating a detailed structure in which electrodes are provided the first to fourth detection portions D1 to D4 of the annular deformation body 50 illustrated in FIG. 15 and predetermined portions of the right side supporting body 20 opposing thereto, and illustrating each part of the annular deformation body 50 and the right side supporting body 20 illustrated in FIG. 24. In FIG. 29, the detection portion D is also the representative of the four sets of detection portions D1 to D4, and illustrates the sectional part obtained when the annular deformation body 50 is cut by the cylindrical plane including the basic annular route R. That is, a part of the annular deformation body 50 illustrated on the left side of FIG. 29 corresponds to a part of the annular deformation body 50 illustrated in FIG. 28A.

As described above, both faces of the third plate-shaped piece 53 form a plane parallel to the XY plane including the basic annular route R in the state where the torque does not act. Accordingly, the third plate-shaped piece 53 (displacement portion) and an opposing surface of the right side supporting body 20 are in the state of being parallel to each other as illustrated in the drawing. Moreover, since the sectional shape of the detection portion D is line-symmetric with respect to the normal line N in the example illustrated herein, the third plate-shaped piece 53 (displacement portion) is displaced in the form of performing parallel movement along the normal line N as illustrated in FIGS. 28(b) and 28(c). Eventually, the third plate-shaped piece 53 (displacement portion) and the opposing surface of the right side supporting body 20 are constantly maintained in the state of being parallel to each other.

In order to detect the displacement of the displacement portion, a displacement electrode E50 is fixed at a position opposing the right side supporting body 20 of the third plate-shaped piece 53 (displacement part) with an insulating layer 150 interposed therebetween. In addition, a fixed electrode E20 is fixed to a position opposing the displacement electrode E50 of the right side supporting body 20 with an insulating layer 120 interposed therebetween. Then, it is possible to detect the displacement direction and the displacement amount of the third plate-shaped piece 53 (displacement portion) based on a capacitance value of a capacitive element C configured of the displacement electrode E50 and the fixed electrode E20.

Specifically, a distance between both the electrodes is reduced and the capacitance value of the capacitive element C increases when the compressive force f1 is applied to the detection portion D as illustrated in FIG. 28B, and the distance between both the electrodes is widened and the capacitance value of the capacitive element C decreases when the stretching force f2 is applied to the detection portion D as illustrated in FIG. 28C. Although FIG. 29 illustrates an example in which the capacitive element C is formed for the detection portion D, it is a matter of course that the displacement electrodes E50 and fixed electrodes E20 are provided for each of the four sets of the detection portions D1 to D4 illustrated in FIG. 24, in practice, to form the four sets of capacitive elements C1 to C4. The specific torque detection principle using these four sets of capacitive elements C1 to C4 will be described in detail in the following § 8.

Incidentally, the displacement electrode E50 is fixed to the third plate-shaped piece 53 (displacement portion) with the insulating layer 150 interposed therebetween in the example illustrated in FIG. 29, and this is because the annular deformation body 50 is configured of a conductive material such as metal. Similarly, the fixed electrode E20 is fixed to the right side supporting body 20 with the insulating layer 120 interposed therebetween, and this is because the right side supporting body 20 is configured of a conductive material such as metal. That is, since the left side supporting body 10, the right side supporting body 20, and the annular deformation body 50 are configured of the conductive material such as metal, the displacement electrode E50 is formed on the surface of the displacement portion 53 with the insulating layer 150 interposed therebetween and the fixed electrode E20 is formed on the surface of the right side supporting body 20 with the insulating layer 120 interposed therebetween in the example illustrated herein.

Accordingly, it is unnecessary to provide the insulating layer I50 in a case where the annular deformation body 50 (at least a surface thereof on which the displacement electrode E50 is formed) is configured of an insulating material such as resin. Similarly, it is unnecessary to provide the insulating layer 120 when the right side supporting body 20 (at least a surface thereof on which the fixed electrode E20 is formed) is configured of an insulating material such as resin.

In addition, when the annular deformation body 50 is configured of the conductive material such as metal, a partial region of the surface of the right side face of the annular deformation body 50 can be used as the displacement electrode E50. For example, if the annular deformation body 50 is configured of the conductive material in the example illustrated in FIG. 29, the third plate-shaped piece 53 (displacement portion) becomes a conductive plate, and thus, directly serves the function as the displacement electrode E50. Thus, it is unnecessary to additionally provide the displacement electrode E50. In this case, the entire surface of the annular deformation body 50 has the same potential electrically, and portions which actually functions as the displacement electrode E50 of the four sets of capacitive elements C1 to C4 are only regions opposing the four sets of the fixed electrodes E20 which have been individually provided. Accordingly, each of the four sets of capacitive elements C1 to C4 behaves as a separate capacitive element, which does not cause any problem in principle.

Conversely, when the right side supporting body 20 is configured of the conductive material such as metal, a partial region of the surface of the left side face of the right side supporting body 20 can be also used as the fixed electrode E20. For example, if the right side supporting body 20 is configured of the conductive material, a part of the surface of the left side face serves the function as the fixed electrode E20 in the example illustrated in FIG. 29. Thus, it is unnecessary to additionally provide the fixed electrode E20. In this case, the entire surface of the right side supporting body 20 has the same potential electrically, and portions which actually functions as the fixed electrode E20 of the four sets of capacitive elements C1 to C4 are only regions opposing the four sets of the displacement electrodes E50 which have been individually provided. Accordingly, each of the four sets of capacitive elements C1 to C4 behaves as a separate capacitive element, which does not cause any problem in principle.

In this manner, it is possible to omit the process of providing the individual displacement electrodes E50 or the individual fixed electrode E20 when the annular deformation body 50 is configured of the conductive material such as metal or the right side supporting body 20 is configured of the conductive material such as metal, and thus, it is possible to further improve production efficiency.

Moreover, the entire annular deformation body 50 or the entire right side supporting body 20 becomes the common electrode when adopting such an omitted structure, and stray capacitances are formed at various unintended portions. Thus, a noise component is likely to be mixed in a detection value of the capacitance, and there is a possibility that detection accuracy decreases. Accordingly, it is preferable to provide the individual displacement electrodes E50 and the individual fixed electrodes E20 via the insulating layers, respectively, as in the example illustrated in FIG. 29 in the case of a torque sensor which requires highly accurate detection even when the annular deformation body 50 and the right side supporting body 20 are configured of the conductive material.

Incidentally, the ease of elastic deformation of the detection portion D is a parameter which determines a detection sensitivity of the sensor. When the detection portion D which is liable to be elastically deformed is used, it is possible to realize a highly sensitive sensor capable of detecting even a minute torque, but a maximum value of a detectable torque is suppressed. Conversely, when the detection portion D which is hardly elastically deformed is used, it is possible to increase the maximum value of the detectable torque, but the sensitivity is lowered so that it is difficult to detect the minute torque.

The ease of elastic deformation of the detection portion D is determined depending on each shape of the first deformation portion 51 (the first plate-shaped piece) and the second deformation portion 52 (the second plate-shaped piece), such as a thickness (likely to be elastically deformed as the thickness becomes thinner), a width (likely to be elastically deformed as the width becomes narrower), and a length (likely to be elastically deformed as the length becomes longer), and further determined depending on its material. In addition, it is also possible to design the detection portion D with a structure that elastically deforms the displacement portion 53 (third plate-shaped piece). Accordingly, a dimension and a material of each part of the detection portion D may be appropriately selected according to an application of the torque sensor in practical use.

Incidentally, the actual dimension of each unit is ignored in the drawings of the present application for convenience of illustration as described above. For example, thicknesses of the displacement electrode E50 and the fixed electrode E20 and thicknesses of the insulating layer 150 and the insulating layer 120 are drawn so as to be substantially the same as thicknesses of the respective plate-shaped pieces 51, 52 and 53 in FIG. 29. However, each of these electrodes and insulating layers can be configured by vapor deposition or plating, and its thickness can be set to about several μm. On the other hand, each thickness of the plate-shaped pieces 51, 52 and 53 is preferably designed to be thicker in consideration of practical strength, and is preferably set to about 1 mm, for example, in the case of being configured of metal.

On the other hand, the left side supporting body 10 and the right side supporting body 20 do not need to be members elastically deformable in terms of the principle of detecting the torque. Rather, it is preferable that the left side supporting body 10 and the right side supporting body 20 be completely rigid bodies in order to make the acting torque contribute 100% to the deformation of the annular deformation body 50. In the illustrated example, a reason for using the annular structural bodies having the through openings H10 and H20 at the central portions thereof as the left side supporting body 10 and the right side supporting body 20 is not for facilitating the elastic deformation, but for securing an insertion hole penetrating the through openings H10, H50 and H20 of the left side supporting body 10, the annular deformation body 50, and the right side supporting body 20 along the rotation axis (Z axis). When a structure whose inside is hollow is adopted similarly to the torque sensor of the prior application described in § 1 to § 3, it is possible to arrange various parts in a hollow portion, and practical is improved.

As illustrated in FIG. 24, all the left side supporting body 10, the right side supporting body 20, and the annular deformation body 50 can be configured of a flat structural body having a small thickness in the Z axis direction, and thus, it is possible to set an axial length of the entire sensor to be short. Moreover, it is possible to simplify an electrode structure to form the capacitive element C, and thus, it is possible to expect an effect of improving the production efficiency. This effect can be easily understood by comparing the capacitive element of the torque sensor exemplified in FIG. 12 and the capacitive element of the torque sensor exemplified in FIG. 29.

<<<§ 8. Torque Detection Principle According to Torque Sensor with Waveform Detection Portion>>>

<8-1. Torque Detection Using Capacitive Element>

Figures 30, 31:
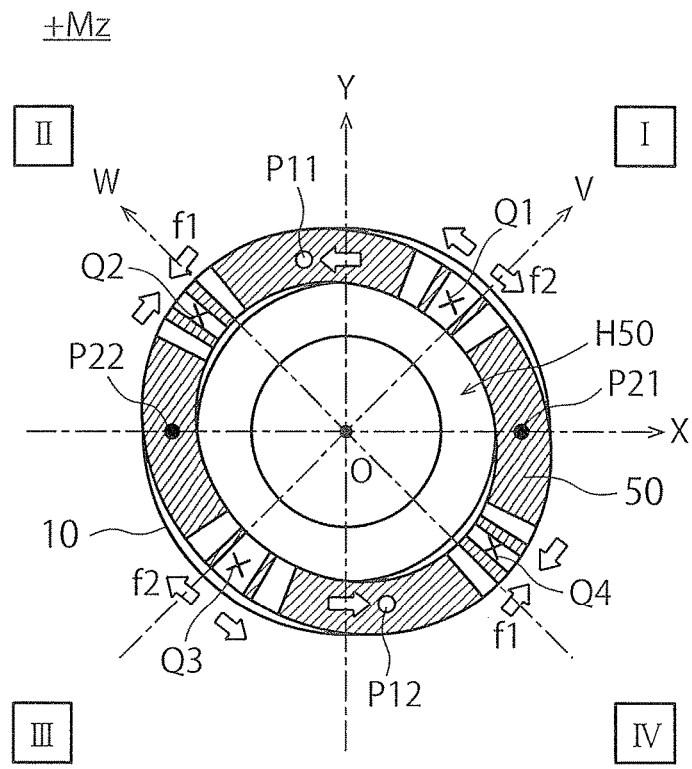
FIG. 30 is a cross-sectional view on the XY plane illustrating a deformed state when a positive torque around the Z axis acts on a left side supporting body in a state where a load is applied to the right side supporting body in the basic structure illustrated in FIG. 24.
FIG. 31 is a table illustrating a behavior of each detection portion when deformation illustrated in FIG. 30 occurs.

Next, the torque detection principle according to the torque sensor described in § 7 will be described. FIG. 30 is a cross-sectional view on an XY plane illustrating a deformed state when a positive torque +Mz around a Z axis acts on the left side supporting body 10 in a state where a load is applied to the right side supporting body 20 in the basic structure illustrated in FIG. 24. In other words, FIG. 30 is the cross-sectional view of the basic structural part illustrated in FIG. 24 cut along an XY plane and viewed from a right direction of FIG. 24. Herein, a V axis and a W axis are also defined as coordinate axes obtained by rotating an X axis and an Y axis counterclockwise by 45° for convenience of description.

The sectional part with hatching in the drawing corresponds to the annular deformation body 50, and the left side supporting body 10 is visible at the back thereof. The points P11 to P22 in the drawing are orthogonal projection images of the connection points P11 to P22 on the XY plane. When the positive torque +Mz around the Z axis acts on the left side supporting body 10, counterclockwise stress indicated by the white arrows is applied to the points P11 and P12 (left side connection points) indicated by the white dots in the drawing. On the other hand, the points P21 and P22 (right side connection points) indicated by the black dots in the drawing tend to remain at fixed positions without any change since the load is applied to the right side supporting body 20.

As a result, the stretching force f2 as indicated by the white arrow in the drawing acts in the vicinity of positions of the first detection point Q1 and the third detection point Q3, and the compressive force f1 as indicated by the white arrow in the drawing acts in the vicinity of positions of the second detection point Q2 and the fourth detection point Q4. Eventually, the annular deformation body 50 is deformed into an elliptical shape having the W axis as a long-axis and the V axis as a short-axis as illustrated in the drawing (the broken line in the drawing indicates a state before deformation).

As described above, the detection portions D1 to D4 are arranged at the positions of the detection points Q1 to Q4, respectively, and the capacitive elements C1 to C4 are formed. Further, the displacement portion 53 of the detection portion D to which the compressive force f1 is applied is displaced so as to approach the right side supporting body 20, and the capacitance value of the capacitive element C increases as illustrated in FIG. 28B, and the displacement portion 53 of the detection portion D to which the stretching force f2 is applied is displaced so as to move away from the right side supporting body 20, and the capacitance value of the capacitive element C decreases as illustrated in FIG. 28C. Accordingly, the respective detection portions D1 to D4 exhibit behavior as shown in the table of FIG. 31 when the positive torque +Mz around the Z axis acts.

That is, when displacement electrodes arranged at the detection portions D1 to D4 are denoted by E501 to E504, and fixed electrodes opposing thereto are denoted by E201 to E204, respectively, the stretching force f2 is applied to the detection points Q1, Q3, the stretching force f2 is applied to the detection points Q1 and Q3 by action of the positive torque +Mz around the Z axis, the displacement electrodes E501 and E503 are displaced so as to move away from the fixed electrodes E201 and E203, and the capacitance values of the capacitive elements C1 and C3 decrease (indicated by "−" in the table). On the other hand, the compressive force f1 is applied to the detection points Q2 and Q4, the displacement electrodes E502 and E504 are displaced so as to approach the fixed electrodes E202 and E204, and the capacitance values of the capacitive elements C2 and C4 increase (indicated by "+" in the table).

Accordingly, if the capacitance values of the capacitive elements C1 to C4 are expressed using the same references signs C1 to C4, it is possible to detect the acting positive torque +Mz around the Z axis by performing calculation based on arithmetic expression "Mz=−C1+C2−C3+C4" as shown in the bottom row of the table. In this case, the obtained calculation value Mz is a positive value, and its absolute value indicates the magnitude of the acting torque.

On the other hand, each behavior of the detection portions D1 to D4 when the counterclockwise torque, that is, a negative torque −Mz around the Z axis is applied become opposite to that in the table of FIG. 31, the compressive force f1 is applied to the detection points Q1 and Q3, and the stretching force f2 is applied to the detection points Q2 and Q4. Accordingly, the capacitance values of the capacitive elements C1 and C3 increase, and the capacitance values of the capacitive elements C2 and C4 decrease.

As a result, the calculation value Mz obtained based on the arithmetic expression "Mz=−C1+C2−C3+C4" becomes a negative value, and its absolute value indicates the magnitude of the acting torque. As a result, a sign of the calculation value Mz obtained by this arithmetic expression indicates the direction of the acting torque, and its absolute value indicates the magnitude thereof.

Incidentally, the rotational moment applied to the left side supporting body 10 in the state where the load is applied to the right side supporting body 20 is considered as the torque to be detected for convenience of description, but, it is a matter of course that completely the same detection principle is applied even if a rotational moment applied to the right side supporting body 20 in a state where a load is applied to the left side supporting body 10 is considered as the torque to be detected.

Figure 32:
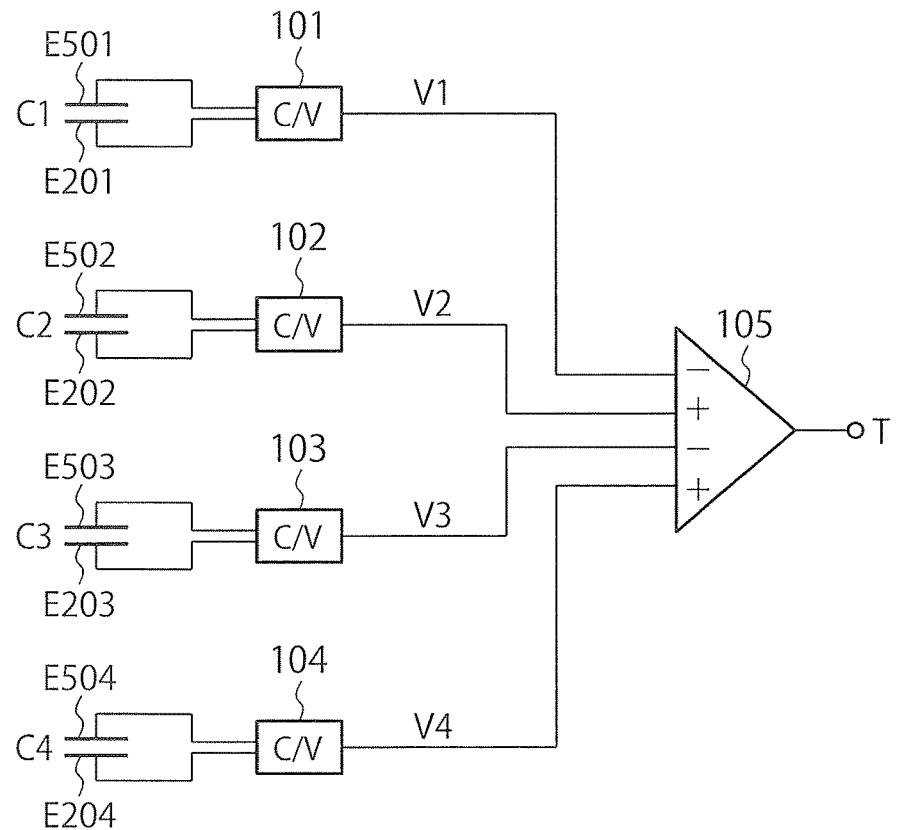
FIG. 32 is a circuit diagram illustrating an example of the detection circuit used in the torque sensor according to a basic embodiment illustrated in FIG. 15.

Accordingly, it is possible to detect the torque around the Z axis if the detection circuit as illustrated in a circuit diagram of FIG. 32 is used in the example described herein. In this circuit diagram, E501 to E504 represent the displacement electrodes provided in the respective detection portions D1 to D4, E201 to E204 are the fixed electrodes opposing these displacement electrodes E501 to E504, and C1 to C4 are the capacitive elements configured of these electrodes. In addition, C/V conversion circuits 101 to 104 are circuits that convert the capacitance values C1 to C4 of the capacitive elements C1 to C4 into voltage values V1 to V4, respectively, and the converted voltage values V1 to V4 become values corresponding to the capacitance values C1 to C4, respectively. A difference arithmetic unit 105 has a function of performing calculation based on the above-described arithmetic expression "Mz=−C1+C2−C3+C4" and outputting a result thereof to an output terminal T.

Incidentally, the direction and the magnitude of the torque are detected using the capacitance values of all the four capacitive elements provided in the four detection portions D1 to D4 in the above description, but it is also possible to detect the direction and the magnitude of the torque using the capacitance values of the two capacitive elements C1 and C2 provided in the detection portions D1 and D2. In this case, it is possible to detect the acting positive torque +Mz around the Z axis by performing calculation based on "Mz=−C1+C2".

Alternatively, when temperature is constant or temperature compensation is performed, it is also possible to detect the direction and the magnitude of the torque using only the capacitance value of the single capacitive element C1 provided in the detection portion D1. In this case, it is possible to detect the acting positive torque +Mz around the Z axis by performing calculation based on "Mz=−C1". It is a matter of course that it is also possible to use only the capacitance value of the single capacitive element C2 provided in the detection portion D2, for example, and calculation based on "Mz=C2" may be performed in this case.

<<<§ 9. Example of One Electrode Type Torque Sensor Adopting Waveform Detection Portion According to Present Invention>>>

Figure 33:
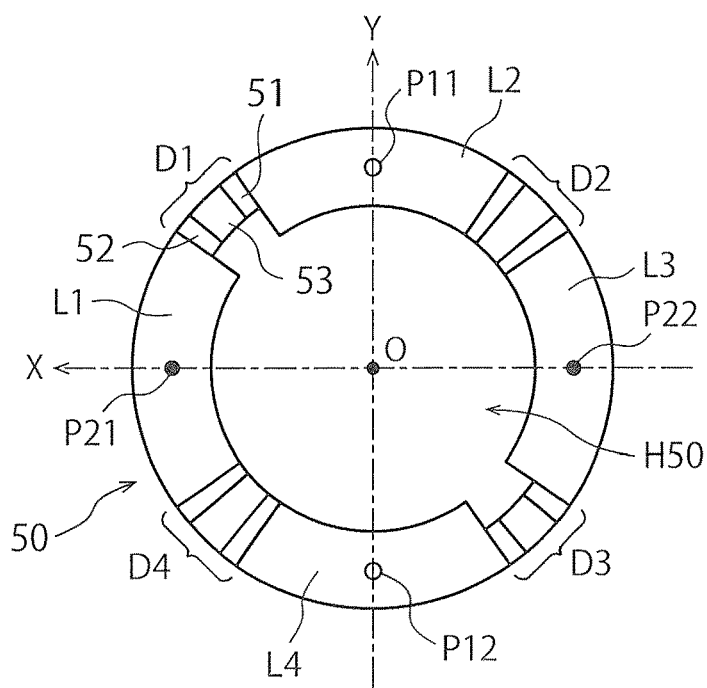
FIG. 33 is a schematic plan view illustrating the basic structural part of the one electrode type torque sensor including a deformation portion of a waveform according to the present invention.

Next, an example of a one electrode type torque sensor including a waveform deformation portion according to the present invention will be described with reference to FIG. 33. FIG. 33 is a schematic plan view illustrating a basic structural part of the torque sensor according to the present embodiment. The basic structural part according to the present embodiment is configured such that the first detection portion D1 and the second detection portion D2 have different spring constants. Specifically, the spring constant of the detection portion D1 is set to be smaller than the spring constant of the detection portion D2 by configuring each thickness of the first deformation portion 51 and the second deformation portion 52 in the first detection portion D1 to be thinner than each thickness of the first deformation portion 51 and the second deformation portion 52 in the second detection portion D2 as illustrated in the drawing. In addition, the third detection portion D3 has the same thickness in the radial direction (that is, the same spring constant) as the first detection portion D1, and the fourth detection portion D4 has the same thickness in the radial direction (that is, the same spring constant) as the second detection portion D2 in the present embodiment. However, the capacitive elements are arranged only at positions corresponding to the first and second detection portions D1 and D2, and are not arranged at positions corresponding to the third and fourth detection portions D3 and D4 in the present embodiment. In addition, all effective opposing areas of the respective fixed electrodes E201 and E202 and the respective displacement electrodes E501 and E502 forming the respective capacitive elements C1 and C2 arranged at the first and second detection portions D1 and D2 are the same. Since other configurations are the same as those of the torque sensor described in § 7 and § 8, a detailed description thereof will be omitted.

When a positive torque around the Z axis is applied to such a torque sensor, the displacement electrode E501 is displaced so as to move away from the right side supporting body 20, and the capacitance value of the capacitive element C1 decreases in the first detection portion D1 as described above. On the other hand, the displacement electrode E502 is displaced so as to approach the right side supporting body, and the capacitance value of the capacitive element C2 increases in the second detection portion D2. However, since the spring constant of the first detection portion D1 is relatively smaller than the spring constant of the second detection portion D2 in the present embodiment, the displacement of the displacement electrode E501 is greater than the displacement of the displacement electrode E502. That is, an absolute value of a variation amount of the capacitance value of the capacitive element C1 is larger than an absolute value of a variation amount of the capacitance value of the capacitive element C2.

When a torque acts in the opposite direction, that is, when a negative torque around the Z axis acts, a rotational force in a counterclockwise direction acts with respect to (the connection points P11 and P12 of) the annular deformation body 50, which is opposite to the above description. Thus, displacement directions of the respective displacement electrodes E501 and E502 become opposite directions.

Thus, it is possible to detect a direction and a magnitude of the acting torque based on the first electric signal T1 which corresponds to a capacitance value of the capacitive element C1 configured of the pair of electrodes E201 and E501 as shown in the following [Expression 4]. Further, it is also possible to detect the direction and the magnitude of the acting torque based on the second electric signal T2 which corresponds to a capacitance value of the capacitive element C2 configured of the pair of electrodes E202 and E502. Incidentally, C1 and C2 indicate the capacitance values of the capacitive elements C1 and C2, respectively, in the following [Expression 4].

$$T1=C1$$

$$T2=C2 \quad \text{[Expression 4]}$$

In the present embodiment, malfunction diagnosis of the torque sensor is performed by utilizing a fact that a ratio between the first and second electric signals T1 and T2 changes along with accumulation of metal fatigue in the annular deformation body 50, particularly in the first detection portion D1. Thus, it is assumed that first and second electric signals in an initial state where the metal fatigue does not occur in the respective detection portions D1 and D2 are denoted by T1$a$ and T2$a$, and first and second electric signals in a state where the metal fatigue occurs (is accumulated) in the respective detection portions D1 and D2 are denoted by T1$b$ and T2$b$ to distinguish from each other in the following description.

Figure 34:
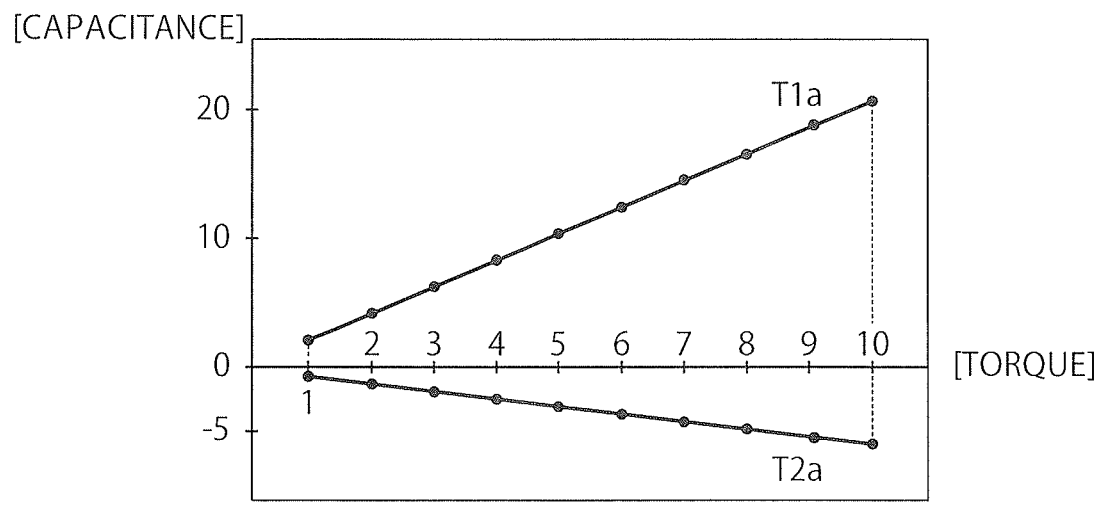
FIG. 34 is a graph illustrating a relationship between a magnitude of the torque acting on the torque sensor and a first electric signal T1$a$ and a second electric signal T2$a$ output from the torque sensor in a case (initial state) where metal fatigue does not occur in an annular deformation body of FIG. 33.
Figure 35:
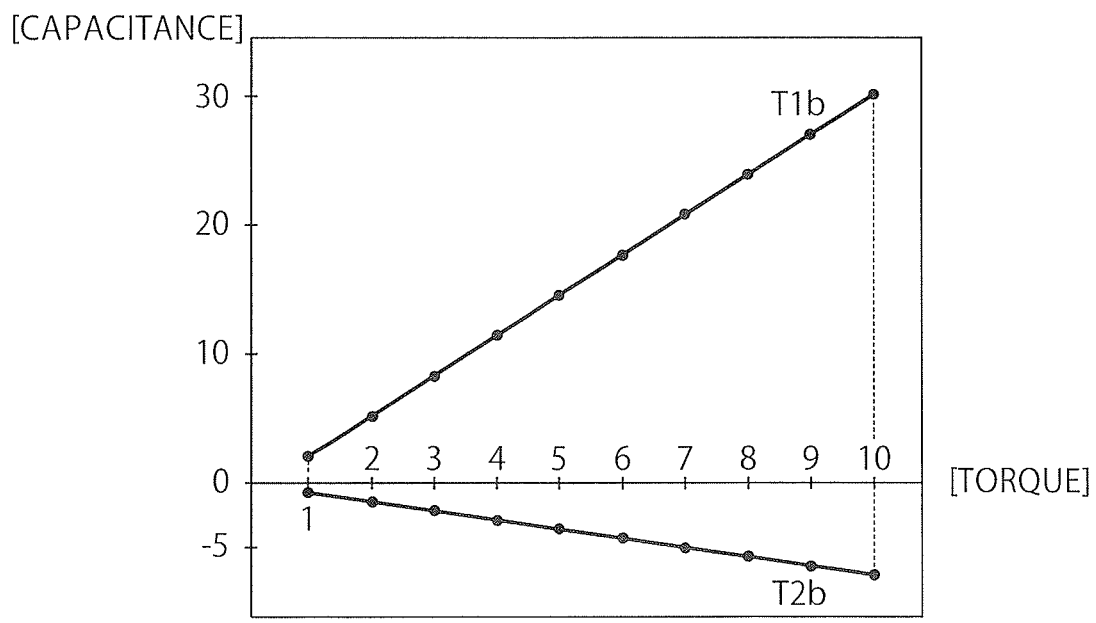
FIG. 35 is a graph illustrating a relationship between a magnitude of the torque acting on the torque sensor and a first electric signal T1$b$ and the second electric signal T2$b$ output from the torque sensor in a case where metal fatigue occurs in an annular deformation body of FIG. 33.

FIG. 34 is a graph illustrating a relationship between the magnitude of the torque acting on the torque sensor and the first electric signal T1$a$ and the second electric signal T2$a$ output from the torque sensor in the state (initial state) where the metal fatigue does not occur in the respective detection portions D1 and D2 of FIG. 33. FIG. 35 is a graph illustrating a relationship between the magnitude of the torque acting on the torque sensor and the first electric signal T1$b$ and the second electric signal T2$b$ output from the torque sensor in a state where the metal fatigue occurs in the respective detection portions D1 and D2 of FIG. 32. In each drawing, the horizontal axis represents a torque acting on the torque sensor and the vertical axis represents a magnitude of an electric signal output from the torque sensor according to the torque. Thus, an inclination of a straight line indicating each of the electric signals T1$a$ to T2$b$ represents a detection sensitivity of the torque sensor in each drawing.

Next, a method of determining whether the torque sensor functions normally will be described. When a repeated load acts on the torque sensor according to the present embodiment, the metal fatigue occurs in the annular deformation body 50. The metal fatigue is remarkably developed in the first detection portion D1 in which the deformation caused by the torque is relatively large as described above. When this metal fatigue is accumulated, each strength of the first deformation portion 51 and the second deformation portion 52 in the first detection portion D1 decreases, and finally, the annular deformation body is broken in the first detection portion D1. When the metal fatigue is accumulated in the first detection portion D1, the first detection portion D1 is greatly deformed by the torque, and the sensitivity of the first detection portion D1 with respect to the torque increases as compared the initial state. This can be understood by comparing FIG. 34 and FIG. 35.

Specifically, an inclination (sensitivity) of the straight line indicating the first electric signal T1$a$ corresponding to the first detection portion D1 is 2.0 in the initial state when referring to FIG. 34. On the other hand, an inclination (sensitivity) of the straight line indicating the first electric signal T1$b$ corresponding to the first detection portion D1 is 3.0 in the state where the metal fatigue is accumulated, and the sensitivity increases by 50% when referring to FIG. 35.

It is a matter of course that the metal fatigue is also developed in the second detection portion D2, but a degree of the development thereof is smaller than a degree of the development of metal fatigue in the first detection portion D1. In fact, an absolute value (sensitivity) of the straight line indicating the second electric signal T2$a$ corresponding to the second detection portion D2 is 0.5 in the initial state when referring to FIG. 34. On the other hand, an absolute value (sensitivity) of the straight line indicating the second electric signal T2$b$ corresponding to the second detection portion D2 in the state where the metal fatigue is accumulated is 0.6 when referring to FIG. 35. Accordingly, an increase of the sensitivity is only 20%.

It should be noted here that the degree of the development of metal fatigue differs between the high elastic portion 30$a$ and the low elastic portion 30$b$. The present invention utilizes this fact to perform the malfunction diagnosis of the torque sensor. That is, an absolute value of a ratio (T2$a$/T1$a$) between the first electric signal T1$a$ and the second electric signal T2$a$ is 0.25 in the initial state, whereas an absolute value of a ratio (T2$b$/T1$b$) between the first electric signal T1$b$ and the second electric signal T2$b$ decreases to 0.2 in the state where the metal fatigue is accumulated.

In other words, the ratio between the first electric signal T1 and the second electric signal T2 gradually changes due to the difference in characteristic of accumulation of metal fatigue between the first detection portion D1 and the second detection portion D2. Further, when a repeated load is further applied to the torque sensor, the annular deformation body 50 finally is broken in the first detection portion D1, and it is difficult for the capacitive element C1 arranged at the first detection portion D1 to function normally. On the other hand, it is highly probable that the capacitive element C2 arranged at the second detection portion D2 function normally at this point in time.

In the above-described manner, it is possible to determine whether the torque sensor functions normally by evaluating whether a difference between a ratio of the first electric signal T2$b$ and the second electric signal T2$b$ at a certain point in time and the ratio of the first electric signal T1$a$ and the second electric signal T2$a$ in the initial state falls within a predetermined range while performing the torque measurement using the capacitive element C1 arranged at the first detection portion D1 having the relatively large spring constant. It is a matter of course that the torque measurement may be performed based on the variation amount of the capacitance value of the capacitive element C2 arranged at the second detection portion D2 having the relatively small spring constant. The capacitive element C2 greatly changes (has the high sensitivity) with respect to the torque compared with the capacitive element C1, and thus, it is possible to perform the torque measurement with an excellent S/N.

In order to embody the above determination principle, the torque sensor according to the present embodiment also includes the above-described detection circuit illustrated in FIG. 19. A method of diagnosing malfunction using this detection circuit is substantially the same as that in § 4, and thus, a detailed description thereof will be omitted. However, it is unnecessary for the microcomputer 47 of the detection circuit to perform the difference detection in the present embodiment. Thus, the microcomputer 47 may output two voltage values provided from the C/V converter 41 directly as the first electric signal T1 and the second electric signal T2.

According to the torque sensor of the present embodiment described above, the ratio between the first electric signal T1 and the second electric signal T2 changes as the first detection portion D1 undergoes the metal fatigue earlier than the second detection portion D2. When the metal fatigue occurring in the annular deformation body 50 (first detection portion D1) is detected before the annular deformation body 50 breaks focusing on this fact, it is possible to provide the torque sensor capable of diagnosing the malfunction of the annular deformation body 50.

Incidentally, the annular deformation body 50 is provided with the third detection portion D3 and the fourth detection portion D4 in the present embodiment. This is for allowing (the first and the second detection portions D1 and D2) of the annular deformation body 50 to be elastically deformed symmetrically with respect to the rotation axis when the torque acts on the torque sensor so that it is possible to easily measure the direction and the magnitude of the acting torque based on the first electric signal T1 and the second electric signal T2. However, it is also possible not to provide the third detection portion D3 and the fourth detection portion D4, that is, to configure an area of the annular deformation body 50 where a Y coordinate is negative using a uniform elastic body, for example, by performing appropriate signal compensation on the first electric signal T1 and the second electric signal T2.

In addition, the first detection portion D1 and the third detection portion D3 are arranged so as to deviate outward in the radial direction as viewed along a basic annular route of the annular deformation body 50 in the present embodiment. However, the present invention is not limited to such a mode, and for example, the first detection portion D1 and the third detection portion D3 may be arranged so as to deviate inward in the radial direction as viewed along the basic annular route of the annular deformation body 50. However, the arrangement outward in the radial direction, as illustrated in FIG. 33, causes large displacement using the detection portion by the acting torque, and thus, is advantageous since the detection sensitivity of the torque is enhanced.

<<<§ 10. Example of Two Electrode Type Torque Sensor with Waveform Detection Portion According to Present Invention>>>

Figure 36:
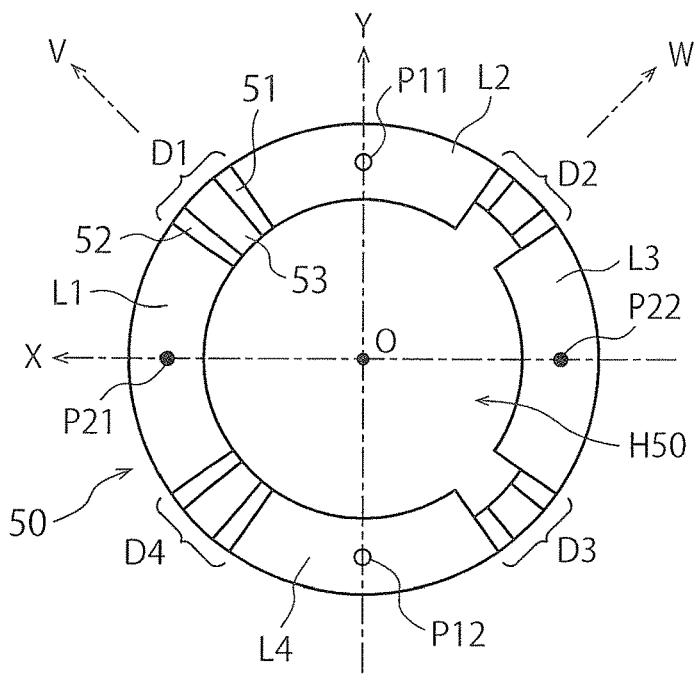
FIG. 36 is a schematic plan view illustrating the basic structural part of the two electrode type torque sensor according to the present invention which includes a waveform detection portion.

Next, a two electrode type torque sensor including a waveform detection portion according to the present invention will be described with reference to FIG. 36. FIG. 36 is a schematic plan view illustrating a basic structural part of the torque sensor according to the present embodiment. In FIG. 36, X, Y, V and W axes are drawn in an overlapping manner for convenience of description. Since the two electrode type torque sensor can perform the difference detection as described in § 4, it is possible to detect the torque with higher accuracy while excluding the influence of temperature change.

The annular deformation body 50 of the torque sensor according to the present embodiment is configured such that the first and fourth detection portions D1 and D4 and the second and third detection portions D2 and D3 have different spring constants. Specifically, each thickness of the detection portions D2 and D3 in a radial direction is formed to be relatively thinner than each thickness of the detection portions D1 and D4 in the radial direction, and accordingly, the spring constants of the second and third detection portions D2 and D3 are set to be smaller than the spring constants of the first and fourth detection portions D1 and D4 as illustrated in the drawing. On the other hand, the thickness in the radial direction (that is, the spring constant) of the second detection portion D2 is the same as the thickness in the radial direction (that is, the spring constant) of the third detection portion D3, and the thickness in the radial direction (that is, the spring constant) of the first detection portion D1 is the same as the thickness in the radial direction (that is, the spring constant) of the fourth detection portion D4. Since other configurations are the same as those of the torque sensor described in § 7 and § 8, a detailed description thereof will be omitted. Incidentally, the above-described two electrode type torque sensor means a torque sensor in which two capacitive elements in which the detection portions D2 and D3 having the relatively small spring constants and the detection portions D1 and D4 having the relatively large spring constants as described above are arranged, respectively.

When a positive torque around the Z axis is applied to such a torque sensor, the displacement electrode E501 is displaced so as to move away from the right side supporting body 20, and capacitance values of the capacitive elements C1 and C3 decrease in the detection portions D1 and D3 as described above. On the other hand, the displacement electrode E502 is displaced so as to approach the right side supporting body, and capacitance values of the capacitive elements C2 and C4 increase in the detection portions D2 and D4.

However, the spring constant of the detection portions D1 and D4 is larger than the spring constant of the detection portions D2 and D3 in the annular deformation body 50 according to the present embodiment. Thus, displacement of the detection portions D2 and D3 is larger than displacement of the detection portions D1 and D4. As a result, an inter-electrode interval between the pair of electrodes E201 and E501 arranged on a positive V axis is narrowed, and an inter-electrode interval between the pair of electrodes E203 and E303 arranged on a negative V axis is further narrowed. Further, an inter-electrode interval between the pair of electrodes E202 and E302 arranged on a positive W axis is widened, and an inter-electrode interval between the pair of electrodes E204 and E304 arranged on a negative W axis is further widened.

When a torque acts in the opposite direction, that is, when a negative torque around the Z axis acts, a rotational force in a counterclockwise direction acts with respect to (the connection points P11 and P12 of) the annular deformation body 50. Thus, displacement directions of the respective displacement electrodes E301 to D304 positioned in the respective detection portions D1 to D4 become opposite directions.

Thus, it is possible to detect the direction and the magnitude of the acting torque based on a first electric signal T1, which corresponds to a difference between capacitance values of a capacitive element C2 configured of the pair of electrodes E202 and E502 and a capacitive element C3 configured of the pair of electrodes E203 and E503, as shown in the following [Expression 5]. Further, it is also possible to detect the direction and the magnitude of the acting torque based on a second electric signal T2, which corresponds to a difference between capacitance values of a capacitive element C4 configured of the pair of electrodes E204 and E504 and a capacitance value of a capacitive element C1 configured of the pair of electrodes E201 and E501. Incidentally, C1 to C4 indicate the capacitance values of the capacitive elements C1 to C4, respectively, in the following [Expression 5].

$$T1=C2-C3$$

$$T2b=C4-C1 \qquad \text{[Expression 5]}$$

Even in the present embodiment, malfunction diagnosis of the torque sensor is performed by utilizing a fact that a ratio between T1 and T2 changes along with accumulation of metal fatigue in the second and third detection portions D2 and D3. Herein, it is also assumed that first and second electric signals in the initial state are denoted by T1$a$ and T2$a$, and first and second electric signals in a state where the metal fatigue occurs (is accumulated) in the respective detection portions D1 to D4 are denoted by T1$b$ and T2$b$ to distinguish from each other in the following description, which is similar to § 9. In the present embodiment, a relationship between the magnitude of the torque acting on the torque sensor and the first and second electric signals T1$a$ and T2$a$ in the initial state is the same as that of the graph illustrated in FIG. 34. In addition, a relationship between the magnitude of the torque acting on the torque sensor and the first and second electric signals T1$b$ and T2$b$ in the state where the metal fatigue occurs in the respective detection portions D1 to D4 is the same as that of the graph illustrated in FIG. 35.

A principle and a method for determination on whether the torque sensor according to the present embodiment described above functions normally are the same as those in § 9. That is, it is possible to understand the principle and the method of the malfunction determination of the torque sensor according to the present embodiment by replacing [Expression 5] with the first electric signal T1 (T1$a$, T1$b$) and the second electric signal T2 (T2$a$, T2$b$) in § 9. Thus, a detailed description of the principle and method will be omitted herein. However, difference detection is performed using each pair of two capacitive elements provided in the first and fourth detection portions D1 and D4 and the second and third detection portions D2 and D3, respectively, in the present embodiment. Thus, the microcomputer 47 of the detection circuit performs difference processing on four voltage values provided from the C/V converter 41 corresponding to [Expression 5].

According to the torque sensor of the present embodiment described above, the ratio between the first electric signal T1 and the second electric signal T2 changes as the detection portions D2 and D3 undergoes the metal fatigue earlier than the detection portions D1 and D4. When the metal fatigue occurring in the annular deformation body 50 is detected before the annular deformation body 50 breaks focusing on this fact, it is possible to provide the torque sensor capable of diagnosing the malfunction of the annular deformation body 50.

<<<§ 11. Example of Four Electrode Type Torque Sensor with Waveform Detection Portion According to Present Invention>>>

Figure 37:
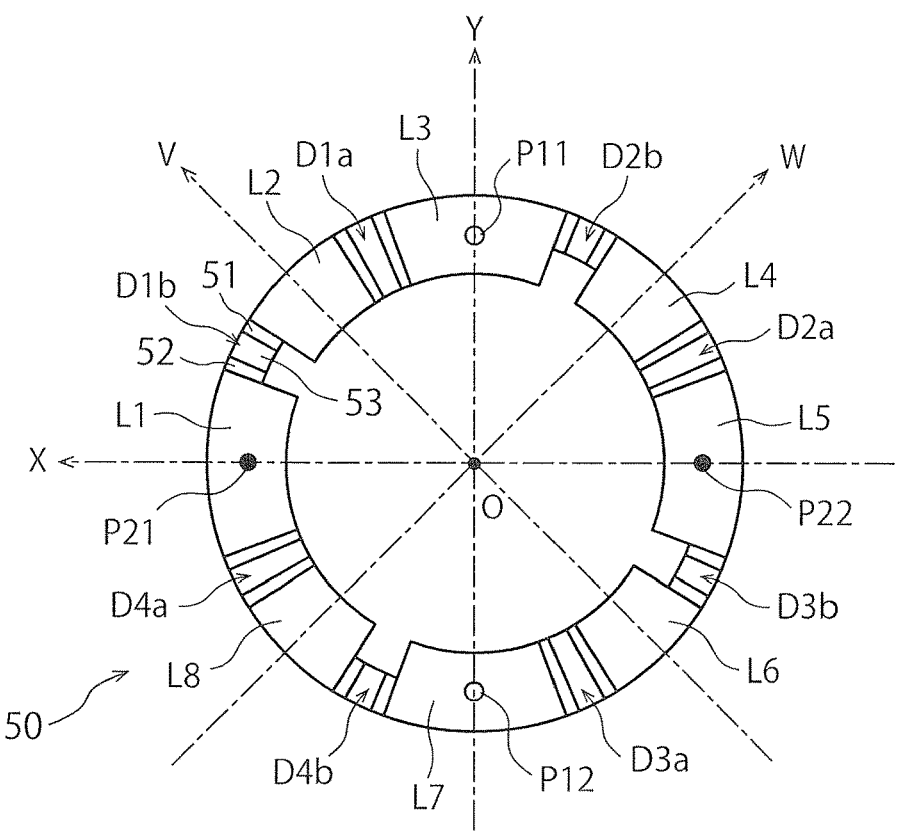
FIG. 37 is a schematic plan view illustrating the basic structural part of the four electrode type torque sensor according to the present invention which includes the waveform detection portion.

Next, a four electrode type torque sensor including a waveform detection portion according to the present invention will be described with reference to FIG. 37. FIG. 37 is a schematic plan view illustrating a basic structural part of the torque sensor according to the present embodiment. In FIG. 37, X, Y, V and W axes are also drawn in an overlapping manner for convenience of description. The four electrode type torque sensor can perform the highly accurate difference detection as described in § 6. The basic structural part according to the present embodiment is different from the basic structural parts of the two electrode type and one electrode type torque sensors in that four detection portions D1$b$ to D4$b$ having relatively small spring constants and four detection portions D1$a$ to D4$a$ having relatively large spring constants are arranged alternately in a circumferential direction via connection portions L1 to L8.

Specifically, each thickness of the detection portions D1$b$ to D4$b$ in a radial direction is formed to be relatively thinner than each thickness of the detection portions D1$a$ to D4$a$ in the radial direction, and accordingly, the spring constants of the detection portions D1$b$ to D4$b$ are set to be smaller than the spring constants of the detection portions D1$a$ to D4$a$ as illustrated in the drawing. In addition, the detection portions D1$a$ to D4$a$ have the same thickness in the radial direction (that is, the same spring constant) with each other, and the detection portions D1$b$ to D4$b$ have the same thickness in the radial direction (that is, the same spring constant) with each other.

Regarding the specific arrangement of the detection portions D1$a$ to D4$b$, the detection portions D1$b$ to D4$b$ having the relatively small spring constant are arranged in the region (i) partitioned by a positive X axis and a positive V axis, the region (iii) partitioned by a positive Y axis and a positive W axis, the region (v) partitioned by a negative X axis and a negative V axis, and the region (vii) partitioned by a negative Y axis and a negative W axis, respectively, and the detection portions D1$a$ to D4$a$ having the relatively large spring constant are arranged in the region (ii) partitioned by the positive V axis and the positive Y axis, the region (iv) defined by the positive W axis and the negative X axis, the region (vi) partitioned by the negative V axis and the negative Y axis, and the region (viii) partitioned by the negative W axis and the positive X axis, respectively, as viewed from a Z axis direction.

More specifically, as viewed from the Z axis direction, the detection portion D1$b$ is arranged on a straight line passing through an origin O and forming an angle of 30° with respect to the positive X axis, the detection portion D1$a$ is arranged on a straight line passing through the origin O and forming an angle of 60° with respect to the positive X axis, the detection portion D2$b$ is arranged on a straight line passing through the origin O and forming an angle of 120° with respect to the positive X axis, the detection portion D2$a$ is arranged on a straight line passing through the origin O and forming an angle of 150° with respect to the positive X axis, the detection portion D3$b$ is arranged on a straight line passing through the origin O and forming an angle of 210° with respect to the positive X axis, the detection portion D3$a$ is arranged on a straight line passing through the origin O and forming an angle of 240° with respect to the positive X axis, the detection portion D4$b$ is arranged on a straight line passing through the origin O and forming an angle of 300° with respect to the positive X axis, and the detection portion D4$a$ is arranged on a straight line passing through the origin O and forming an angle of 330° with respect to the positive X axis.

Further, displacement electrodes E501$a$ to 504$b$ are arranged at the detection portions D1$a$ to D4$b$, respectively. In addition, fixed electrodes E201$a$ to E204$b$ are arranged at positions opposing the displacement electrodes E501$a$ to 504b, and are fixed to a right side supporting body (not illustrated). Further, capacitive elements C1a to C4b are configured by the displacement electrodes E501a to 504b and the fixed electrodes E201a to E204b. Specifically, the capacitive element C1a is configured of the displacement element E501a and the fixed electrode E201a, the capacitive element C2a is configured of the displacement electrode E502a and the fixed electrode E202a, the capacitive element C3a is configured of the displacement element E503a and the fixed electrode E203a, and the capacitive element C4a is configured of the displacement electrode E504a and the fixed electrode E204a. Further, the capacitive element C1b is configured of the displacement element E501b and the fixed electrode E201b, the capacitive element C2b is configured of the displacement electrode E502b and the fixed electrode E202b, the capacitive element C3b is configured of the displacement element E503b and the fixed electrode E203b, and the capacitive element C4b is configured of the displacement element E504b and the fixed electrode E204b. Even in the present embodiment, effective opposing areas of the fixed electrodes E201a to E204b and the displacement electrodes E501a to E504b forming the respective capacitive elements are equal to each other. Since other configurations are the same as those of the torque sensor described in § 7 and § 8, a detailed description thereof will be omitted.

When a positive torque around the Z axis acts on the torque sensor according to the present embodiment, the annular deformation body 50 deforms into substantially an elliptical shape, the V axis becomes the short-axis direction of the ellipse, and the W axis becomes the long-axis direction of the ellipse. Specifically, both the detection portion D1b in the region (i) and the detection portion D1a in the region (ii) are displaced in the positive V axis direction, but the detection portion D1b in the region (i) with the small spring constant is more greatly displaced. Similarly, both the detection portion D2b in the region (iii) and the detection portion D2a in the region (iv) are displaced in the negative W axis direction, but the detection portion D2b in the region (iii) is more greatly displaced. In addition, both the detection portion D3b in the region (v) and the detection portion D3a in the region (vi) are displaced in the negative V axis direction, but the detection portion D3b in the region (v) is more greatly displaced. Both the detection portion D4b in the region (vii) and the detection portion D4a in the region (viii) are displaced in the positive W axis direction, but the detection portion D4b in the region (vii) is more greatly displaced.

When a torque acts in the opposite direction, that is, when a negative torque around the Z axis acts, a rotational force in a counterclockwise direction acts with respect to (the connection points P11 and P12 of) the annular deformation body 50, which is opposite to the above description. Thus, displacement directions of the respective displacement electrodes E501a to E504b positioned in the vicinity of the V axis and the W axis of the annular deformation body 50 are become opposite directions.

Thus, it is possible to detect a direction and a magnitude of the acting torque using the first electric signal T1 based on the respective capacitance values of the capacitive elements C1b, C2b, C3b and C4b each of which is configured of the pair of electrodes as shown in the following [Expression 6]. Further, it is also possible to detect the direction and the magnitude of the acting torque using the second electric signal T2 based on the respective capacitance values of the capacitive elements C1a, C2a, C3a and C4a each of which is configured of the pair of electrodes. Incidentally, C1a to C4b indicate the capacitance values of the capacitive elements C1a to C4b, respectively, in the following [Expression 6].

$$T1=(C1b+C3b)-(C2b+C4b)$$

$$T2=(C1a+C3a)-(C2a+C4a) \qquad \text{[Expression 6]}$$

That is, a detection circuit adopted in the torque sensor in the present embodiment is configured to output a first electric signal T1 corresponding to a "difference between a sum of the capacitance values of the two capacitive elements C1b and C3b and a sum of the capacitance values of the two capacitive elements C2b and C4b", and a second electric signal T2 corresponding to a "difference between a sum of the capacitance values of the two capacitive elements C1a and C3a and a sum of the capacitance values of the two capacitive elements C2a and C4a" as an electric signal indicating the acting torque.

Even in the present embodiment, malfunction diagnosis of the torque sensor is performed by utilizing a fact that a ratio between T1 and T2 changes along with accumulation of metal fatigue particularly in the respective detection portions D1a to D4b. Thus, herein, it is also assumed that first and second electric signals in the initial state are denoted by T1a and T2a, and first and second electric signals in a state where the metal fatigue occurs (is accumulated) in the respective detection portions D1a to D4b are denoted by T1b and T2b to distinguish from each other, which is similar to § 9. In the present embodiment, a relationship between the magnitude of the torque acting on the torque sensor and the first and second electric signals T1a and T2a in the initial state is the same as that of the graph illustrated in FIG. 34. In addition, a relationship between the magnitude of the torque acting on the torque sensor and the first and second electric signals T1b and T2b in the state where the metal fatigue occurs in the respective detection portions D1a to D4b is the same as that of the graph illustrated in FIG. 35.

A principle and a method for determination on whether the torque sensor according to the present embodiment described above functions normally are the same as those in § 9. That is, it is possible to understand the principle and the method of the malfunction determination of the torque sensor according to the present embodiment by replacing [Expression 6] with the first electric signal T1 (T1a, T1b) and the second electric signal T2 (T2a, T2b) in § 9. Thus, a detailed description of the principle and method will be omitted herein.

However, highly accurate difference detection is performed using the four capacitive elements provided on each of the high resilience portion 30a side and the low resilience portion 30b side in the present embodiment. Thus, the microcomputer 47 of the detection circuit outputs a first electric signal T1 corresponding to the "difference between the sum of the capacitance values of the two capacitive elements C1a and C3a and the sum of the capacitance values of the two capacitive elements C2a and C4a", and a second electric signal T2 corresponding to the "difference between the sum of the capacitance values of the two capacitive elements C1b and C3b and the sum of the capacitance values of the two capacitive elements C2b and C4b" as electric signals indicating the acting torque.

According to the torque sensor of the present embodiment described above, the ratio between the first electric signal T2a and the second electric signal T2b changes as the detection portions D1b to D4b having the relatively smaller spring constant undergoes the metal fatigue earlier than the detection portions D1a to D4a having the relatively larger spring constant. When the metal fatigue occurring in the annular deformation body 50 (detection portion D1a to D4b) is detected before the annular deformation body 50 breaks focusing on this fact, it is possible to provide the torque sensor capable of diagnosing the malfunction of the annular deformation body 50.

<<<§ 12. Modified Example of Basic Structural Part of Torque Sensor>>>

The torque sensors described above has the basic structural part in which the annular deformation body 30 is arranged between the left side supporting body 10 and the right side supporting body 20, for example, as illustrated in FIG. 1. However, the present invention is not limited to such a mode.

Figure 38:
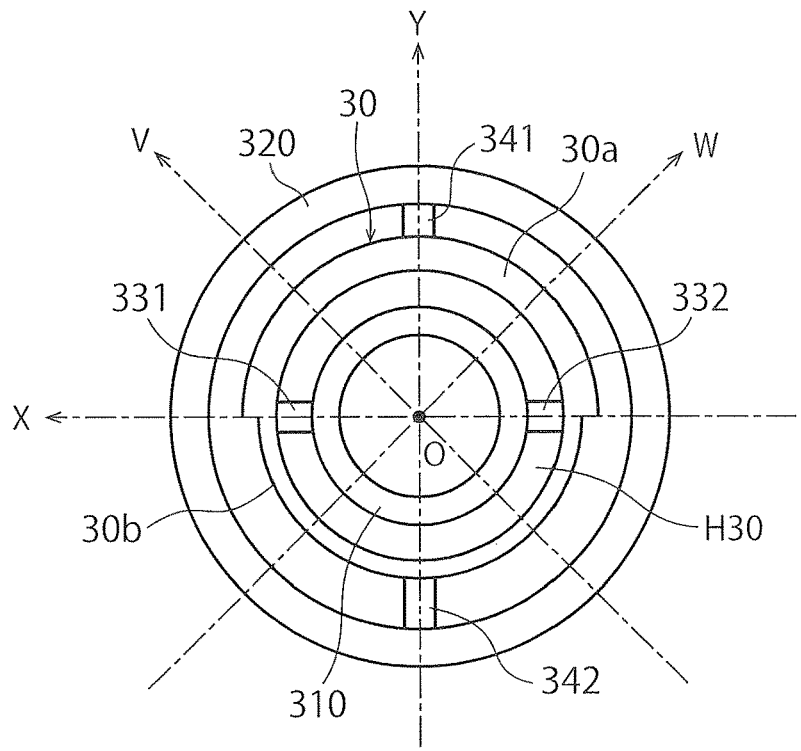
FIG. 38 is a schematic front view illustrating a modified example of the basic structural part that can be adopted in the torque sensor of the present invention.

FIG. 38 is a schematic front view illustrating the modified example of the basic structural part that can be adopted in the torque sensor of the present invention. As illustrated in FIG. 38, the basic structural part according to this modified example includes the annular deformation body 30, an annular inner supporting body 310 arranged inside the through opening H30 of the annular deformation body 30, and an annular outer supporting body 320 which is arranged to surround an outer peripheral face of the annular deformation body 30. As illustrated in the drawing, the annular deformation body 30, the inner supporting body 310, and the outer supporting body 320 are concentric with each other.

In addition, first and second inner connection members 331 and 332 are provided symmetrically with respect to an origin O between the inner supporting body 310 and the annular deformation body 30 on an X axis illustrated in FIG. 38, and an outer peripheral face of the inner supporting body 310 and an inner peripheral face of the annular deformation body 30 are connected by the first and second inner connection members 331 and 332. Further, first and second outer connection members 341 and 342 are provided symmetrically with respect to the origin O between the annular deformation body 30 and the outer supporting body 320 on a Y axis, and the outer peripheral face of the annular deformation body 30 and an inner peripheral face of the outer supporting body 320 are connected by the first and second outer connection members 341 and 342. Accordingly, the torque sensor adopting the basic structural part according to the present modified example has a thinner structure than the above-described torque sensor illustrated in FIG. 2 since all the annular deformation body 30, the inner supporting body 310, and the outer supporting body 320 are arranged on an XY plane.

Figure 39:
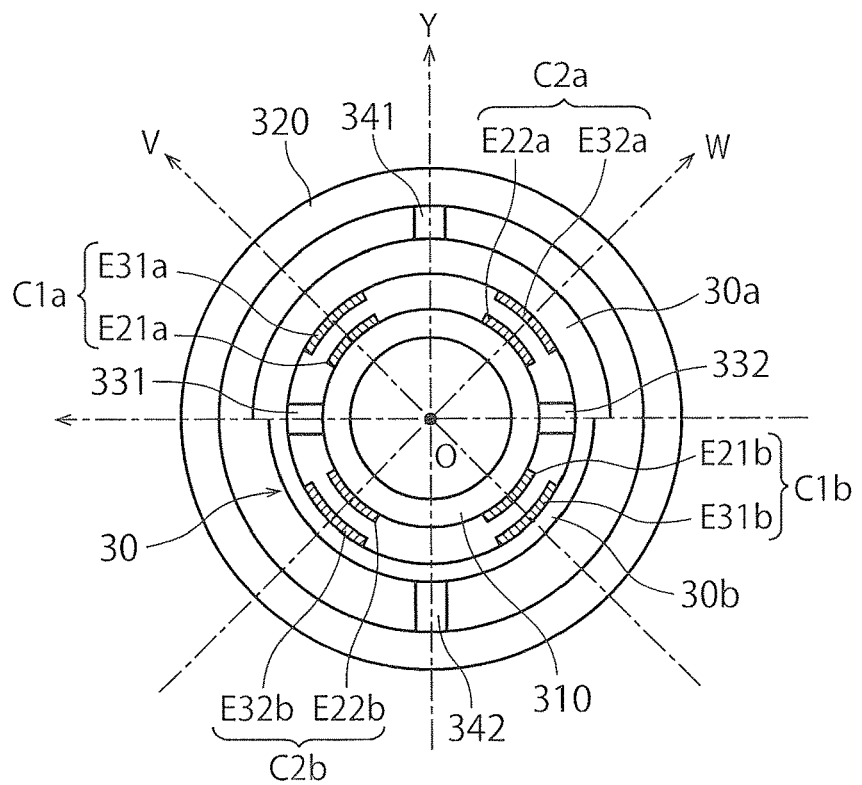
FIG. 39 is a view illustrating arrangement of a fixed electrode and a displacement electrode in a case where a capacitive element is configured between an annular deformation body and an inner supporting body.

The arrangement of a fixed electrode and a displacement electrode regarding such a basic structural part will be described with reference to FIG. 39. FIG. 39 is a view illustrating the arrangement of the fixed electrode and the displacement electrode in a case where a capacitive element is formed between the annular deformation body 30 and the inner supporting body 310 in the two electrode type torque sensor. A region where the Y axis is positive is the high elastic portion 30a, and a region where the Y axis is negative is the low elastic portion 30b in the annular deformation body 30, which is similar to the example illustrated in FIG. 15.

In FIG. 39, four capacitive elements are provided in the basic structural part. Specifically, when a V axis and a W axis passing through the origin O and forming 45° with respect to the X axis and the Y axis, respectively, are defined on the XY plane for convenience of description, the displacement electrode E31a is arranged on a positive V axis, the displacement electrode E32a is arranged on a positive W axis, the displacement electrode E31b is arranged on a negative V axis, the displacement electrode E32b is arranged on a negative W axis on the inner peripheral face of the annular deformation body 30.

Further, the fixed electrode E21a is arranged at a position opposing the displacement electrode E31a, the fixed electrode E22a is arranged at a position opposing the displacement electrode E32a, the fixed electrode E21b is arranged at a position opposing the displacement electrode E31b, and the fixed electrode E22b is arranged at a position opposing the displacement electrode E32b on the outer circumferential surface of the inner supporting body 310. In other words, the fixed electrode E21a is arranged on the positive V axis, the fixed electrode E22a is arranged on the positive W axis, the fixed electrode E21b is arranged on the negative V axis, and the fourth fixed electrode E22b is arranged symmetrically with respect to the W axis on the negative W axis on the outer peripheral face of the inner supporting body 310.

Since the torque sensor having such a configuration provides the same function as the torque sensor that has been already described with reference to FIGS. 15 to 19, a detailed description thereof will be omitted. It is a matter of course that each capacitive element may be configured between the annular deformation body 30 and the outer supporting body 320 although not illustrated. That is, the displacement electrodes E31a to E32b may be arranged on the outer peripheral face of the annular deformation body 30, and the fixed electrodes E21a to E22b may be arranged on the inner peripheral face of the outer supporting body 320.

In addition, the above-described structure can be adopted also for the one electrode type or four electrode type torque sensor, and can be adopted also for the torque sensors having the waveform detection portion described in § 7 to § 11.

In addition, the case where both the inner supporting body 310 and the outer supporting body 320 have the annular shape has been exemplified herein, but the present invention is not limited to such a form. For example, other forms such as a rod shape and a semicircle shape may be adopted as long as it is also possible to transmit the torque to the annular deformation body 30.

Alternatively, it is also possible to combine the structure illustrated in FIG. 1 and the structure illustrated in FIG. 39 as another modified example. That is, examples of such a structure may include a structure in which the outer supporting body 320 and the annular deformation body 30 illustrated in FIG. 39 are connected via the first and second outer connection members 341 and 342, and further, the annular deformation body 30 is connected to the right side supporting body 20 in FIG. 1 via the convex portions 21 and 22 although not illustrated. It is a matter of course that it is also possible to adopt the inner supporting body 310 instead of the outer supporting body 320, and to adopt the left side supporting body 10 instead of the right side supporting body 20.

<<<§ 14. Modified Example in which Effective Opposing Area Between Fixed Electrode and Displacement Electrode is Made Constant>>>

Incidentally, when a torque around a Z axis acts, positions of the respective detection points Q1 to Q4 are slightly displaced in a direction along a circumference of the annular deformation body 30 in accordance with deformation of the annular deformation body 30, for example, as illustrated in FIG. 30. Specifically, the positions of the respective detection points Q1 to Q4 move to positions slightly shifted in the clockwise direction from a V axis or a W axis in the example illustrated in the drawing. Accordingly, the detection point Q illustrated in FIG. 29 also moves up and down in the drawing when the torque acts, and the displacement portion 53

(displacement electrode E50) is not only displaced in a lateral direction of the drawing but also displaced in a vertical direction of the drawing.

However, a size (a planar size, that is, an occupied area) of the fixed electrode E20 is set to be larger than a size (a planar size, that is, an occupied area) of the displacement electrode E50 in the example illustrated in FIG. 29, and thus, there is no change in an opposing area of the displacement electrode E50 with respect to the fixed electrode E20 even if the displacement electrode E50 is displaced in the vertical direction of the drawing or a direction perpendicular to the sheet plane of the drawing. Accordingly, an effective area of the capacitive element C is always maintained to be constant.

Figure 40A:
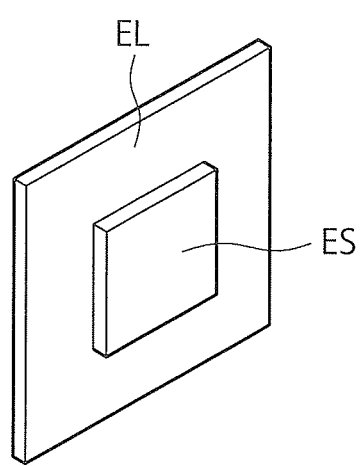
FIG. 40 is a view illustrating a principle for maintaining an effective area of the capacitive element constant even when a relative position of the displacement electrode with respect to the fixed electrode changes.

FIG. 40 is a view illustrating a principle for maintaining the effective area of the capacitive element C constant even when a relative position of the displacement electrode E50 with respect to the fixed electrode E20 changes in this manner. Here, it is considered a case where a pair of electrodes EL and ES are arranged so as to oppose each other as illustrated in FIG. 40A. Both the electrodes EL and ES are arranged so as to be parallel to each other at a predetermined interval, and form a capacitive element. However, an area of the electrode EL is larger than an area of the electrode ES, and a projection image of the electrode ES is completely contained inside a surface of the electrode EL when a contour of the electrode ES is projected on the surface of the electrode EL to form an orthogonal projection image. In this case, an effective area as the capacitive element is the area of the electrode ES.

Figure 40B:
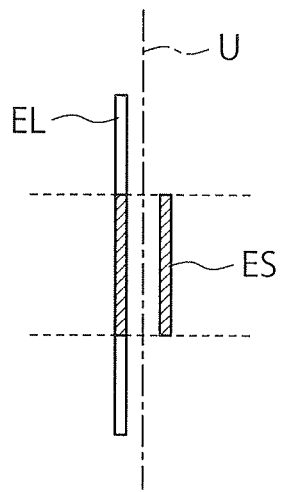

FIG. 40B is a side view of the pair of electrodes ES and EL illustrated in FIG. 40A. The region with hatching in the drawing is a portion that functions as a substantial capacitive element, and the effective area as the capacitive element is an area of the hatched electrode (that is, the area of the electrode ES).

Here, a vertical plane U as indicated by the one-dot chain line in the drawing is considered. Both the electrodes ES and EL are arranged so as to be parallel to the vertical plane U. Here, when assuming that the electrode ES is moved vertically upward along the vertical plane U, an opposing portion on the electrode EL side moves upward, but the area of the opposing portion does not change. Even if the electrode ES is moved downward or moved in a depth direction or a front direction of the sheet plane, the area of the opposing portion on the electrode EL side does not change.

In short, when the contour of the electrode ES having the smaller area is projected onto the surface of the electrode EL having the larger area to form the orthogonal projection image, the effective area of the capacitive element configured of both the electrodes is equal to the area of the electrode ES and is always constant as long as the projection image of the electrode ES is completely contained inside the surface of the electrode EL.

Accordingly, when a relationship between the displacement electrode E50 and the fixed electrode E20 illustrated in FIG. 29 is in the same relationship as a relationship between the electrode ES and the electrode EL illustrated in FIG. 40, the effective opposing area of the pair of electrodes forming the capacitive element is constant even if the displacement electrode E50 is displaced in any direction by action of the torque as long as the displacement electrode E50 and the fixed electrode E20 are secured to be parallel with each other. This means that the capacitance value of the capacitive element C changes exclusively depending on the distance between the displacement electrode E50 and the fixed electrode E20. In other words, this means that the change of the capacitance value of the capacitive element C depends only on the displacement of the displacement portion 53 in the direction along the normal line N and does not depend on the displacement thereof in a direction orthogonal to the normal line N. This is important in order to accurately detect the acting torque based on the principle described above.

Eventually, it is preferable to set the area of one of the fixed electrode E20 and the displacement electrode E50 to be larger than the area of the other electrode such that the effective opposing area of the pair of electrodes forming the capacitive element C does not change even when the relative position of the displacement electrode E50 with respect to the fixed electrode E20 changes as the result of action of the torque in a predetermined rotation direction, in order to implement the present invention.

Incidentally, FIG. 40 illustrates an example in which a rectangular electrode is used as the two electrodes EL and ES. However, each shape of the displacement electrode E50 and the fixed electrode E20 used in the torque sensor according to the present invention is arbitrary, and for example, a circular electrode may be used. In addition, the annular deformation body 50 may be configured of the conductive material such as metal and the partial region of the surface thereof may be used as the displacement electrode E50, or the right side supporting body 20 may be configured of the conductive material such as metal and the partial region of the surface thereof may be used as the fixed electrode E20 as described in § 4-3.

It is a matter of course that such a structure can be also applied to the respective torque sensors of the two electrode type, the one electrode type, and the four electrode type that have been described in § 4 to § 6, and can be applied to the torque sensors including the waveform detection portion of the two electrode type and the four electrode type that have been described in § 10 and § 11.

The invention claimed is:
1. A torque sensor detecting a torque around a Z axis in an XYZ three-dimensional coordinate system, the torque sensor comprising:
an annular deformation body made of a material elastically deformable by action of a torque to be detected and having a through opening through which the Z axis passes;
a first supporting body connected to the annular deformation body at two first portions where the annular deformation body meets an XZ plane;
a second supporting body connected to the annular deformation body at two second portions where the annular deformation body includes the Z axis and meets a plane, different from the XZ plane, the second supporting body being rotatable around the Z axis with respect to the first supporting body;
a displacement electrode arranged to the annular deformation body and causes displacement by elastic deformation of the annular deformation body;
a fixed electrode arranged at a position opposing the displacement electrode in the first supporting body; and
a detection circuit that outputs an electrical signal representing the torque around the Z axis, acting on one of the first supporting body and the second supporting body while a load is applied to the other, based on a variation amount of a capacitance value of a capacitive element consisting of the displacement electrode and the fixed electrode, wherein the annular deformation body includes a high elastic portion and a low elastic portion having a spring constant smaller than a spring constant of the high elastic portion, the capacitive element includes a first capacitive element and a second capacitive element, the first capacitive element is configured of the displacement electrode and the fixed electrode which are arranged at a first position in the high elastic portion where a spacing distance between the annular deformation body and the first supporting body changes when the torque around the Z axis acts, the second capacitive element is configured of the displacement electrode and the fixed electrode which are arranged at a second position in the low elastic portion where the spacing distance between the annular deformation body and the first supporting body changes when the torque around the Z axis acts, and the detection circuit outputs a first electric signal corresponding to a capacitance value of the first capacitive element and a second electric signal corresponding to a capacitance value of the second capacitive element as electric signals indicating the acting torque, and determines whether the torque sensor functions normally based on a ratio between the first electric signal and the second electric signal.

2. The torque sensor according to claim 1, wherein the respective displacement electrodes of the first and second capacitive elements are configured of a common electrode, or the respective fixed electrodes of the first and second capacitive elements are configured of a common electrode.

3. The torque sensor according to claim 1, wherein an area of one of the displacement electrode and the fixed electrode of each of the first and second capacitive elements is set to be larger than an area of the other electrode such that an effective opposing area of each pair of electrodes forming the first and second capacitive elements does not change even when a relative position of the displacement electrode with respect to the fixed electrode changes as a result of action of the torque around the Z axis.

4. The torque sensor according to claim 1, wherein the second supporting body is connected to the annular deformation body in two regions where the annular deformation body meets a YZ plane.

5. The torque sensor according to claim 4, wherein when a V axis and a W axis passing through an origin O and forming an angle of 45° with respect to an X axis and a Y axis, respectively, are defined on the XY plane, both the first capacitive element and the second capacitive element are arranged on the V axis or on the W axis as viewed from a Z axis direction.

6. The torque sensor according to claim 1, wherein the low elastic portion is configured to be narrower than the high elastic portion in a radial direction of the annular deformation body.

7. The torque sensor according to claim 1, wherein the low elastic portion is configured to be thinner than the high elastic portion in the Z axis direction.

8. The torque sensor according to claim 1, wherein the displacement electrode is arranged on a surface of the annular deformation body.

9. The torque sensor according to claim 1, wherein the detection circuit includes a storage unit that stores the ratio between the first electric signal and the second electric signal in a state where the torque sensor normally functions as a reference ratio, and determines whether the torque sensor functions normally by determining whether a difference between the ratio between the electric signal and the second electric signal and the reference ratio falls within a predetermined range.

10. The torque sensor according to claim 1, wherein the acting torque is measured based on the first electric signal or the second electric signal.

11. The torque sensor according to claim 1, wherein the first supporting body is arranged on one side of the Z axis of the annular deformation body, the second supporting body is arranged on the other side of the Z axis of the annular deformation body, and the annular deformation body is connected to the first supporting body via first connection members and is connected to the second supporting body via second connection members.

12. The torque sensor according to claim 1, wherein the first supporting body is arranged on an inner side of an inner peripheral face of the annular deformation body, the second supporting body is arranged on an outer side of an outer peripheral face of the annular deformation body, and the annular deformation body is connected to the first supporting body via first connection members and is connected to the second supporting body via second connection members.

13. The torque sensor according to claim 1, wherein the first supporting body is arranged on an inner side of an inner peripheral face or an outer side of an outer peripheral face of the annular deformation body, the second supporting body is arranged on one side of the Z axis of the annular deformation body, and the annular deformation body is connected to the first supporting body via first connection members and is connected to the second supporting body via second connection members.

14. The torque sensor according to claim 1, wherein the first supporting body is arranged on one side of the Z axis of the annular deformation body, the second supporting body is arranged on an inner side of an inner peripheral face or an outer side of an outer peripheral face of the annular deformation body, and the annular deformation body is connected to the first supporting body via first connection members and is connected to the second supporting body via second connection members.

15. A torque sensor detecting a torque around a Z axis in an XYZ three-dimensional coordinate system, the torque sensor comprising:

an annular deformation body made of a material elastically deformable by action of a torque to be detected and having a through opening through which the Z axis passes;

a first supporting body connected to the annular deformation body at two first portions where the annular deformation body meets an XZ plane;

a second supporting body connected to the annular deformation body at two second portions where the annular deformation body includes the Z axis and meets a plane different from the XZ plane, the second supporting body being rotatable around the Z axis with respect to the first supporting body;

a displacement electrode that is arranged to the annular deformation body and causes displacement by elastic deformation of the annular deformation body;

a fixed electrode arranged at a position opposing the displacement electrode in the first supporting body; and a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode, wherein the annular deformation body includes a high elastic portion and a low elastic portion having a spring constant smaller than a spring constant of the high elastic portion, the capacitive element includes a first capacitive element, a second capacitive element, a third capacitive element, and a fourth capacitive element, the first capacitive element and the second capacitive element are configured of the displacement electrodes and the fixed electrodes which are arranged at two first positions, respectively, in the high elastic portion where a spacing distance between the annular deformation body and the first supporting body changes when the torque around the Z axis acts, the third capacitive element and the fourth capacitive element are configured of the displacement electrodes and the fixed electrodes which are arranged at two second positions, respectively, in the low elastic portion where the spacing distance between the annular deformation body and the first supporting body changes when the torque around the Z axis acts, and the detection circuit outputs a first electric signal corresponding to a difference between a capacitance value of the first capacitive element and a capacitance value of the second capacitive element and a second electric signal corresponding to a difference between a capacitance value of the third capacitive element and a capacitance value of the fourth capacitive element as electric signals indicating the acting torque, and determines whether the torque sensor functions normally based on a ratio between the first electric signal and the second electric signal.

16. The torque sensor according to claim 15, wherein at least two of the respective displacement electrodes of the first to fourth capacitive elements are configured of a common electrode, or at least two of the respective fixed electrodes of the first to fourth capacitive elements are configured of a common electrode.

17. The torque sensor according to claim 15, wherein an area of one of the displacement electrode and the fixed electrode of each of the first to fourth capacitive elements is set to be larger than an area of the other electrode such that an effective opposing area of each pair of electrodes forming the first to fourth capacitive elements does not change even when a relative position of the displacement electrode with respect to the fixed electrode changes as a result of action of the torque around the Z axis.

18. The torque sensor according to claim 15, wherein the second supporting body is connected to the annular deformation body in two regions where the annular deformation body meets a YZ plane.

19. The torque sensor according to claim 18, wherein when a V axis and a W axis passing through an origin O and forming an angle of 45° with respect to an X axis and a Y axis, respectively, are defined on the XY plane, the first capacitive element is arranged on a positive V axis, the second capacitive element is arranged on a positive W axis, the third capacitive element is arranged on a negative V axis, and the fourth capacitive element is arranged on a negative W axis, as viewed from a Z axis direction.

20. A torque sensor detecting a torque around a Z axis in an XYZ three-dimensional coordinate system, the torque sensor comprising:

an annular deformation body made of a material elastically deformable by action of a torque to be detected and having a through opening through which the Z axis passes;

a first supporting body connected to the annular deformation body at two first portions where the annular deformation body meets an XZ plane;

a second supporting body connected to the annular deformation body at two second portions where the annular deformation body includes the Z axis and meets a plane different from the XZ plane, the second supporting body being rotatable around the Z axis with respect to the first supporting body;

a displacement electrode that is arranged to the annular deformation body and causes displacement by elastic deformation of the annular deformation body;

a fixed electrode arranged at a position opposing the displacement electrode in the first supporting body; and a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode, wherein the annular deformation body is configured such that four high elastic portions and four low elastic portions each of which has a spring constant smaller than a spring constant of the high elastic portion are alternately arranged one by one in a circumferential direction, the capacitive element includes a first capacitive element, a second capacitive element, a third capacitive element, a fourth capacitive element, a fifth capacitive element, a sixth capacitive element, a seventh capacitive element, and an eighth capacitive element, each of the first, third, fifth and seventh capacitive elements is configured of the displacement electrode and the fixed electrode which are arranged at a first position in each of the high elastic portions where a spacing distance between the annular deformation body and the first supporting body changes when the torque around the Z axis acts, each of the second, fourth, sixth and eighth capacitive elements is configured of the displacement electrode and the fixed electrode which are arranged at a second position in each of the low elastic portions where the spacing distance between the annular deformation body and the first supporting body changes when the torque around the Z axis acts, and the detection circuit outputs a first electric signal corresponding to a difference between a sum of a capacitance value of the first capacitive element and a capacitance value of the fifth capacitive element and a sum of a capacitance value of the third capacitive element and a capacitance value of the seventh capacitive element and a second electric signal corresponding to a difference between a sum of a capacitance value of the second capacitive element and a capacitance value of the sixth capacitive element and a sum of a capacitance value of the fourth capacitive element and a capacitance value of the eighth capacitive element as electric signals indicating the acting torque, and determines whether the torque sensor functions normally based on a ratio between the first electric signal and the second electric signal.

21. The torque sensor according to claim 20, wherein
at least two of the respective displacement electrodes of the first to eighth capacitive elements are configured of a common electrode, or at least two of the respective fixed electrodes of the first to eighth capacitive elements are configured of a common electrode.

22. The torque sensor according to claim 20, wherein
an area of one of the displacement electrode and the fixed electrode of each of the first to eighth capacitive elements is set to be larger than an area of the other electrode such that an effective opposing area of each pair of electrodes forming the first to eighth capacitive elements does not change even when a relative position of the displacement electrode with respect to the fixed electrode changes as a result of action of the torque around the Z axis.

23. The torque sensor according to claim 20, wherein
the second supporting body is connected to the annular deformation body in two regions where the annular deformation body meets a YZ plane.

24. The torque sensor according to claim 23, wherein
when a V axis and a W axis passing through an origin O and forming an angle of 45° with respect to an X axis and a Y axis, respectively, are defined on the XY plane, the high elastic portions are arranged one by one in a region partitioned by a positive X axis and a positive V axis, a region defined by a positive Y axis and a positive W axis, a region defined by a negative X axis and a negative V axis, and a region defined by a negative Y axis and a negative W axis, and the low elastic portions are arranged one by one in a region defined by the positive V axis and the positive Y axis, a region defined by the positive W axis and the negative X axis, a region defined by the negative V axis and the negative Y axis, and a region defined by the negative W axis and the positive X axis, as viewed from a Z axis direction.

25. The torque sensor according to claim 24, wherein
the first capacitive element and the second capacitive element are arranged symmetrically with respect to the V axis as viewed from the Z axis direction, in vicinity of the positive V axis,
the third capacitive element and the fourth capacitive element are arranged symmetrically with respect to the W axis as viewed from the Z axis direction in vicinity of the positive W axis,
the fifth capacitive element and the sixth capacitive element are arranged symmetrically with respect to the V axis as viewed from the Z axis direction in vicinity of the negative V axis, and
the seventh capacitive element and the eighth capacitive element are arranged symmetrically with respect to the W axis as viewed from the Z axis direction in vicinity of the negative W axis.

26. A torque sensor detecting a torque around a Z axis in an XYZ three-dimensional coordinate system, the torque sensor comprising:
an annular deformation body made of a material elastically deformable by action of a torque to be detected and having a through opening through which the Z axis passes;
a first supporting body connected to the annular deformation body at two first portions where the annular deformation body meets an XZ plane;
a second supporting body connected to the annular deformation body at two second portions where the annular deformation body includes the Z axis and meets a plane different from the XZ plane, the second supporting body being rotatable around the Z axis with respect to the first supporting body;
a displacement electrode that is arranged at a predetermined position of the annular deformation body and causes displacement by elastic deformation of the annular deformation body;
a fixed electrode arranged at a position opposing the displacement electrode in the first supporting body; and
a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode,
wherein the annular deformation body includes first and second detection portions positioned at two detection points defined on the annular deformation body, and a connection portion connected to both ends of the first and second detection portions,
each of the first and second detection portions includes a first deformation portion elastically deformable by action of the torque to be detected, a second deformation portion elastically deformable by action of the torque to be detected, and a displacement portion causing displacement by elastic deformation of the first deformation portion and the second deformation portion,
an outer end of the first deformation portion is connected to the connection portion adjacent thereto,
an inner end of the first deformation portion is connected to the displacement portion,
an outer end of the second deformation portion is connected to the connection portion adjacent thereto,
an inner end of the second deformation portion is connected to the displacement portion,
the first and second deformation portions of the first detection portion have a spring constant larger than a spring constant of the first and second deformation portions of the second detection portion,
the capacitive element includes a first capacitive element and a second capacitive element,
each of the capacitive elements is configured of the displacement electrode and the fixed electrode which are arranged at positions, respectively, corresponding to the displacement portions of the first and second detection portions, and
the detection circuit outputs a first electric signal corresponding to a capacitance value of the first capacitive element and a second electric signal corresponding to a capacitance value of the second capacitive element as electric signals indicating the acting torque, and determines whether the torque sensor functions normally based on a ratio between the first electric signal and the second electric signal.

27. The torque sensor according to claim 26, wherein
the respective displacement electrodes of the first and second capacitive elements are configured of a common electrode, or the respective fixed electrodes of the first and second capacitive elements are configured of a common electrode.

28. The torque sensor according to claim 26, wherein an area of one of the displacement electrode and the fixed electrode of each of the first and second capacitive elements is set to be larger than an area of the other electrode such that an effective opposing area of each pair of electrodes forming the first and second capacitive elements does not change even when a relative position of the displacement electrode with respect to the fixed electrode changes as a result of action of the torque around the Z axis.

29. The torque sensor according to claim 26, wherein the second supporting body is connected to the annular deformation body in two regions where the annular deformation body meets a YZ plane.

30. The torque sensor according to claim 29, wherein when a V axis and a W axis passing through an origin O and forming an angle of 45° with respect to an X axis and a Y axis, respectively, are defined on the XY plane, the first capacitive element is arranged on a positive V axis and the second capacitive element is arranged on a positive W axis as viewed from a Z axis direction.

31. The torque sensor according to claim 26, wherein the first and second deformation portions of the second detection portion are configured to be narrower than the first and second deformation portions of the first detection portion in a radial direction of the annular deformation body.

32. The torque sensor according to claim 26, wherein the first and second deformation portions of the second detection portion are configured to be thinner than the first and second deformation portions of the first detection portion in the Z axis direction.

33. A torque sensor detecting a torque around a Z axis in an XYZ three-dimensional coordinate system, the torque sensor comprising:
an annular deformation body made of a material elastically deformable by action of a torque to be detected and having a through opening through which the Z axis passes;
a first supporting body connected to the annular deformation body at two first portions where the annular deformation body meets an XZ plane;
a second supporting body connected to the annular deformation body at two second portions where the annular deformation body includes the Z axis and meets a plane different from the XZ plane, the second supporting body being rotatable around the Z axis with respect to the first supporting body;
a displacement electrode that is arranged at a predetermined position of the annular deformation body and causes displacement by elastic deformation of the annular deformation body;
a fixed electrode arranged at a position opposing the displacement electrode in the first supporting body; and
a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode,
wherein the annular deformation body includes first to fourth detection portions positioned at four detection points defined on the annular deformation body, and a connection portion connected to both ends of the first to fourth detection portions,
each of the first to fourth detection portions includes a first deformation portion elastically deformable by action of the torque to be detected, a second deformation portion elastically deformable by action of the torque to be detected, and a displacement portion causing displacement by elastic deformation of the first deformation portion and the second deformation portion,
an outer end of the first deformation portion is connected to the connection portion adjacent thereto,
an inner end of the first deformation portion is connected to the displacement portion,
an outer end of the second deformation portion is connected to the connection portion adjacent thereto,
an inner end of the second deformation portion is connected to the displacement portion,
the first and second deformation portions of the first and fourth detection portions have a spring constant larger than a spring constant of the first and second deformation portions of the second and third detection portions,
the capacitive element includes a first capacitive element, a second capacitive element, a third capacitive element, and a fourth capacitive element,
each of the capacitive elements is configured of the displacement electrode and the fixed electrode which are arranged at positions, respectively, corresponding to the displacement portions of the first to fourth detection portions, and
the detection circuit outputs a first electric signal corresponding to a difference between a capacitance value of the first capacitive element and a capacitance value of the fourth capacitive element and a second electric signal corresponding to a difference between a capacitance value of the second capacitive element a capacitance value of the third capacitive element as electric signals indicating the acting torque, and determines whether the torque sensor functions normally based on a ratio between the first electric signal and the second electric signal.

34. The torque sensor according to claim 33, wherein at least two of the respective displacement electrodes of the first to fourth capacitive elements are configured of a common electrode, or at least two of the respective fixed electrodes of the first to fourth capacitive elements are configured of a common electrode.

35. The torque sensor according to claim 33, wherein an area of one of the displacement electrode and the fixed electrode of each of the first to fourth capacitive elements is set to be larger than an area of the other electrode such that an effective opposing area of each pair of electrodes forming the first to fourth capacitive elements does not change even when a relative position of the displacement electrode with respect to the fixed electrode changes as a result of action of the torque around the Z axis.

36. The torque sensor according to claim 33, wherein the second supporting body is connected to the annular deformation body in two regions where the annular deformation body meets a YZ plane.

37. The torque sensor according to claim 36, wherein when a V axis and a W axis passing through an origin O and forming an angle of 45° with respect to an X axis and a Y axis, respectively, are defined on the XY plane, the first capacitive element is arranged on a positive V axis, the second capacitive element is arranged on a positive W axis, the third capacitive element is arranged on a negative V axis, and the fourth capacitive element is arranged on a negative W axis, as viewed from a Z axis direction.

38. The torque sensor according to claim 33, wherein
the first and second deformation portions of the second and third detection portions are configured to be narrower than the first and second deformation portions of the first and fourth detection portions in a radial direction of the annular deformation body.

39. The torque sensor according to claim 33, wherein
the first and second deformation portions of the second and third detection portions are configured to be thinner than the first and second deformation portions of the first and fourth detection portions in the Z axis direction.

40. A torque sensor detecting a torque around a Z axis in an XYZ three-dimensional coordinate system, the torque sensor comprising:
an annular deformation body made of a material elastically deformable by action of a torque to be detected and having a through opening through which the Z axis passes;
a first supporting body connected to the annular deformation body at two first portions where the annular deformation body meets an XZ plane;
a second supporting body connected to the annular deformation body at two second portions where the annular deformation body includes the Z axis and meets a plane different from the XZ plane, the second supporting body being rotatable around the Z axis with respect to the first supporting body;
a displacement electrode that is arranged at a predetermined position of the annular deformation body and causes displacement by elastic deformation of the annular deformation body;
a fixed electrode arranged at a position opposing the displacement electrode in the first supporting body; and
a detection circuit that outputs an electric signal indicating the torque around the Z axis, acting on one of the first supporting body and the second supporting body while a load is applied to the other, based on a variation amount of a capacitance value of a capacitive element consisting of the displacement electrode and the fixed electrode,
wherein the annular deformation body includes first to eighth detection portions positioned at eight detection points defined on the annular deformation body, and a connection portion connected to both ends of the first to eighth detection portions,
each of the first to eighth detection portions includes a first deformation portion elastically deformable by action of the torque to be detected, a second deformation portion elastically deformable by action of the torque to be detected, and a displacement portion causing displacement by elastic deformation of the first deformation portion and the second deformation portion,
an outer end of the first deformation portion is connected to the connection portion adjacent thereto,
an inner end of the first deformation portion is connected to the displacement portion,
an outer end of the second deformation portion is connected to the connection portion adjacent thereto,
an inner end of the second deformation portion is connected to the displacement portion,
the first and second deformation portions of the first, third, fifth and seventh detection portions have a spring constant larger than a spring constant of the first and second deformation portions of the second, fourth, sixth and eighth detection portions,
the capacitive element includes a first capacitive element, a second capacitive element, a third capacitive element, a fourth capacitive element, a fifth capacitive element, a sixth capacitive element, a seventh capacitive element, an eighth capacitive element,
each of the capacitive elements is configured of the displacement electrode and the fixed electrode which are arranged at positions, respectively, corresponding to the displacement portions of the first to eighth detection portions, and
the detection circuit outputs a first electric signal corresponding to a difference between a sum of a capacitance value of the first capacitive element and a capacitance value of the fifth capacitive element and a sum of a capacitance value of the third capacitive element and a capacitance value of the seventh capacitive element and a second electric signal corresponding to a difference between a sum of a capacitance value of the second capacitive element and a capacitance value of the sixth capacitive element and a sum of a capacitance value of the fourth capacitive element and a capacitance value of the eighth capacitive element as electric signals indicating the acting torque, and determines whether the torque sensor functions normally based on a ratio between the first electric signal and the second electric signal.

41. The torque sensor according to claim 40, wherein
at least two of the respective displacement electrodes of the first to eighth capacitive elements are configured of a common electrode, or at least two of the respective fixed electrodes of the first to eighth capacitive elements are configured of a common electrode.

42. The torque sensor according to claim 40, wherein
an area of one of the displacement electrode and the fixed electrode of each of the first to fourth capacitive elements is set to be larger than an area of the other electrode such that an effective opposing area of each pair of electrodes forming the first to fourth capacitive elements does not change even when a relative position of the displacement electrode with respect to the fixed electrode changes as a result of action of the torque around the Z axis.

43. The torque sensor according to claim 40, wherein
the second supporting body is connected to the annular deformation body in two regions where the annular deformation body meets a YZ plane.

44. The torque sensor according to claim 43, wherein
as viewed in a Z axis direction, the first capacitive element is arranged on a straight line passing through an origin O and forming an angle of 30° with respect to a positive X axis, the second capacitive element is arranged on a straight line passing through the origin O and forming an angle of 60° with respect to the positive X axis, the third capacitive element is arranged on a straight line passing through the origin O and forming an angle of 120° with respect to the positive X axis, the fourth capacitive element is arranged on a straight line passing through the origin O and forming an angle of 150° with respect to the positive X axis, the fifth capacitive element is arranged on a straight line passing through the origin O and forming an angle of 210° with respect to the positive X axis, the sixth capacitive element is arranged on a straight line passing through the origin O and forming an angle of 240° with respect to the positive X axis, the seventh capacitive element is arranged on a straight line passing through the origin O and forming an angle of 300° with respect to the positive X axis, and the eighth capacitive element is arranged on a straight line passing through the origin O and forming an angle of 330° with respect to the positive X axis.

45. The torque sensor according to claim 40, wherein the first and second deformation portions of the second, fourth, sixth and eighth detection portions are configured to be narrower than the first and second deformation portions of the first, third, fifth and seventh detection portions in a radial direction of the annular deformation body.

46. The torque sensor according to claim 40, wherein the first and second deformation portions of the second, fourth, sixth and eighth detection portions are configured to be thinner than the first and second deformation portions of the first, third, fifth and seventh detection portions in the Z axis direction.

* * * * *